United States Patent
Phillips et al.

(10) Patent No.: US 9,756,374 B2
(45) Date of Patent: Sep. 5, 2017

(54) ADVERTISEMENT TARGETING SCHEME IN A MULTICAST ABR ENVIRONMENT BASED ON THROTTLED AD CHANNEL STREAMING

(71) Applicant: ERICSSON TELEVISION INC., Duluth, GA (US)

(72) Inventors: Chris Phillips, Hartwell, GA (US); Jennifer Ann Reynolds, Duluth, GA (US); Robert Hammond Forsman, Sugar Hill, GA (US); Carl Furgusson, Eastleigh (GB)

(73) Assignee: ERICSSON AB, Stockholm (SE)

( * ) Notice: Subject to any disclaimer, the term of this patent is extended or adjusted under 35 U.S.C. 154(b) by 59 days.

(21) Appl. No.: 14/573,175

(22) Filed: Dec. 17, 2014

(65) Prior Publication Data

US 2016/0073175 A1 Mar. 10, 2016

Related U.S. Application Data

(60) Provisional application No. 62/048,515, filed on Sep. 10, 2014, provisional application No. 62/048,550, (Continued)

(51) Int. Cl.
G06F 3/0482 (2013.01)
G06Q 30/02 (2012.01)
(Continued)

(52) U.S. Cl.
CPC ......... *H04N 21/2668* (2013.01); *H04L 47/15* (2013.01); *H04L 65/4076* (2013.01); *H04L 65/602* (2013.01); *H04L 65/607* (2013.01); *H04N 21/23106* (2013.01); *H04N 21/23418* (2013.01); *H04N 21/23424* (2013.01); *H04N 21/24* (2013.01); *H04N 21/2402* (2013.01); *H04N 21/25883* (2013.01);
(Continued)

(58) Field of Classification Search
None
See application file for complete search history.

(56) References Cited

U.S. PATENT DOCUMENTS 6,665,705 B1 12/2003 Daniels-Barnes et al.
8,667,527 B2 3/2014 Yan et al.
(Continued)

FOREIGN PATENT DOCUMENTS

WO WO 2006/097825 A2 9/2006
WO WO 2008/122451 A1 10/2008

*Primary Examiner* — Nasser Goodarzi
*Assistant Examiner* — Terrika Peterson

(57) ABSTRACT

A scheme for providing targeted advertisements in a multicast adaptive bitrate (ABR) streaming environment. In one implementation, ads specific to a subscriber's demographic profile and relevant to the genre of a tuned MABR media channel may be downloaded in a gateway (GW) or into a network storage system. In another implementation, multicast ABR streams of ads may be triggered at specific points (e.g., insertion markers in a multicast ABR media channel) that can be selectively joined by a GW node based on demographics and channel genre. In yet another implementation, continuously streaming multicast ad channels may be switched at suitable points in a multicast ABR media channel based on targeting parameters.

15 Claims, 30 Drawing Sheets

Related U.S. Application Data filed on Sep. 10, 2014, provisional application No. 62/048,568, filed on Sep. 10, 2014.

(51) Int. Cl.

| | | |
|---|---|---|
| *H04N 21/2668* | (2011.01) | |
| *H04N 21/234* | (2011.01) | |
| *H04N 21/231* | (2011.01) | |
| *H04N 21/6405* | (2011.01) | |
| *H04N 21/81* | (2011.01) | |
| *H04N 21/44* | (2011.01) | |
| *H04N 21/442* | (2011.01) | |
| *H04N 21/466* | (2011.01) | |
| *H04N 21/63* | (2011.01) | |
| *H04N 21/24* | (2011.01) | |
| *H04L 12/801* | (2013.01) | |
| *H04L 29/06* | (2006.01) | |
| *H04N 21/258* | (2011.01) | |
| *H04N 21/2662* | (2011.01) | |
| *H04N 21/438* | (2011.01) | |
| *H04N 21/433* | (2011.01) | |
| *H04N 21/45* | (2011.01) | |

(52) U.S. Cl.
CPC ..... *H04N 21/2662* (2013.01); *H04N 21/4331* (2013.01); *H04N 21/4383* (2013.01); *H04N 21/44* (2013.01); *H04N 21/442* (2013.01); *H04N 21/44016* (2013.01); *H04N 21/44222* (2013.01); *H04N 21/4532* (2013.01); *H04N 21/466* (2013.01); *H04N 21/63* (2013.01); *H04N 21/6405* (2013.01); *H04N 21/812* (2013.01)

(56) References Cited

U.S. PATENT DOCUMENTS

| | | |
|---|---|---|
| 8,887,214 B1 | 11/2014 | Black et al. |
| 2002/0067730 A1 | 6/2002 | Hinderks et al. |
| 2004/0148421 A1* | 7/2004 | Achtermann ....... H04L 12/1886 709/232 |
| 2004/0210944 A1* | 10/2004 | Brassil ............... H04L 12/1895 725/135 |
| 2004/0244058 A1* | 12/2004 | Carlucci ............... G06F 3/0482 725/135 |
| 2007/0240602 A1 | 10/2007 | Dion et al. |
| 2008/0060002 A1 | 3/2008 | Noll et al. |
| 2008/0098420 A1 | 4/2008 | Khivesara et al. |
| 2008/0235090 A1 | 9/2008 | Lundstrom et al. |
| 2009/0019471 A1 | 1/2009 | Rabinovitch et al. |
| 2010/0058382 A1 | 3/2010 | Yu et al. |
| 2010/0138889 A1 | 6/2010 | Subramanian ..... H04N 21/4331 725/118 |
| 2010/0169916 A1* | 7/2010 | Stettner .................. G06Q 30/02 725/34 |
| 2010/0217885 A1 | 8/2010 | Acharya et al. |
| 2011/0107379 A1* | 5/2011 | Lajoie ................ H04L 65/1016 725/87 |
| 2011/0302320 A1 | 12/2011 | Dunstan et al. |
| 2012/0047542 A1* | 2/2012 | Lewis ............. H04N 21/44016 725/97 |
| 2013/0007226 A1 | 1/2013 | White et al. |
| 2013/0132986 A1 | 5/2013 | Mack |
| 2013/0160047 A1* | 6/2013 | DuBose ................ H04N 7/165 725/32 |
| 2013/0227625 A1 | 8/2013 | Forsman et al. |
| 2014/0020037 A1 | 1/2014 | Hybertson |
| 2014/0052846 A1* | 2/2014 | Scherkus ......... H04N 21/44209 709/224 |
| 2014/0068076 A1 | 3/2014 | Dasher et al. |
| 2014/0143823 A1* | 5/2014 | Manchester ........ H04L 65/4084 725/116 |
| 2014/0157305 A1 | 6/2014 | Del Sordo et al. |
| 2014/0282777 A1* | 9/2014 | Gonder ................ H04L 65/605 725/109 |
| 2014/0282784 A1* | 9/2014 | Pfeffer ............. H04N 21/64322 725/112 |
| 2016/0073146 A1* | 3/2016 | Phillips .............. H04N 21/2402 725/34 |
| 2016/0073175 A1* | 3/2016 | Phillips .............. H04N 21/2402 725/34 |
| 2016/0073176 A1* | 3/2016 | Phillips .............. H04N 21/2402 725/35 |

\* cited by examiner

ADVERTISEMENT TARGETING SCHEME IN A MULTICAST ABR ENVIRONMENT BASED ON THROTTLED AD CHANNEL STREAMING

PRIORITY UNDER 35 U.S.C. §119(E) & 37 C.F.R. §1.78

This nonprovisional application claims priority based upon the following prior United States provisional patent application(s): (i) "SYSTEM AND METHOD FOR PROVIDING TARGETED ADVERTISEMENTS IN A MULTICAST ABR ENVIRONMENT," Application No. 62/048,515, filed Sep. 10, 2014, in the name(s) of Christopher Phillips, et al.; (ii) "SYSTEM AND METHOD FOR PROVIDING TARGETED ADVERTISEMENTS IN A MULTICAST ABR ENVIRONMENT," Application No. 62/048,550 filed Sep. 10, 2014, in the name(s) of Christopher Phillips, et al.; and (iii) "SYSTEM AND METHOD FOR PROVIDING TARGETED ADVERTISEMENTS IN A MULTICAST ABR ENVIRONMENT," Application No. 62/048,568, filed Sep. 10, 2014, in the name(s) of Christopher Phillips, et al.; each of which is hereby incorporated by reference in its entirety.

FIELD OF THE DISCLOSURE

The present disclosure generally relates to communication networks. More particularly, and not by way of any limitation, the present disclosure is directed to a system and method for providing targeted advertisements in a multicast adaptive bitrate (ABR) streaming environment.

BACKGROUND

With the advent of new technology, e.g., home gateways with multiple tuners and Converged Cable Access Platforms (CCAPs), and the like, managed IP video services are now becoming feasible and cost-effective. Multicast streaming of content using ABR techniques is also being exploited for developing an all-IP cloud-based approach to delivering multimedia programming. Content ingest, encoding, packaging and ways to support alternate content and advertisement insertion ("ad insertion") are also being explored.

Within the domain of conventional broadcast radio and television, the process of ad insertion into a particular broadcast is well known. Conventionally, broadcast advertisement content insertion may occur both at national network and local/regional network levels. At the national network level, advertisements are often inserted into the network feed before the broadcast content is transmitted over, for example, a particular national distribution network. At the regional network level, local advertisements may be inserted into a received national feed by, for example, the regional/local radio or TV broadcast station and such advertisements may typically replace some or all of the national network advertisements. Such local advertisements may be targeted to the demographics of the entire service area of the particular broadcast station and may advertise the local businesses, e.g., local grocery stores, restaurants, etc. Although such techniques exist in the traditional content delivery systems, it should be appreciated that there are no known advertising systems that target ads for multicast content at a granularity level as will be described below.

SUMMARY

The present patent disclosure is broadly directed to systems, methods, apparatuses, devices, and associated non-transitory computer-readable media for facilitating delivery of multicast ABR ads that may be targeted based on subscriber demographics, media channel genre and other related indicia. In one aspect, an embodiment of an advertisement targeting method in an MABR streaming network is disclosed. The claimed embodiment comprises determining, at a premises gateway operative to stream one or more MABR channels to a subscriber premises including a plurality of subscriber devices, that a subscriber device has tuned to or is watching a particular MABR channel. Thereafter, advertisements that are obtained based on a subscriber demographic profile of the premises subscriber and genre of the particular MABR channel are downloaded (via managed or unmanaged bandwidth pipe, for instance) into a local cache associated with the premises gateway. Incoming gapped MABR segment stream of the particular MABR channel is monitored for advertisement insertion markers (AIMs) and advertisement endpoint markers (AEMs). In the context of the present patent disclosure, AIM/sAEMs should be understood as any indication(s) or indicium (indicia) relative to a Transport Stream (TS) that provides a reference to a receiving entity that allows for manipulation of the TS flow at one or more specific points, such as, e.g., inserting or splicing of secondary streams, channels or files (for instance, ad files, channels or streams, and the like), as well as terminating such events based on explicit markers or other indications, including based on auto returns to the original stream, as will be described in more detail further below. In one variation, such markers may comprise, e.g., SCTE/ANSI 35 markers, including an auto return option. When an advertisement insertion marker is received in the incoming gapped MABR segment stream of the particular MABR channel, an ad media file from the local cache is multiplexed (or "muxed") into the particular MABR channel at an appropriate splicing timing point for streaming to the subscriber device. In one variation, the method may involve continuing to play additional ad media files from the local cache to the subscriber device until an advertisement endpoint marker or an auto return indication is reached in the incoming gapped MABR segment stream.

In another aspect, an embodiment of a premises gateway operative in an MABR streaming network for targeting advertisements is disclosed. The claimed premises gateway (GW) comprises, inter alia, a streaming processor and segment combiner adapted to manage a plurality of incoming gapped MABR segment streams for generating a corresponding plurality of unsegmented MABR streams (i.e., de-gapped streams) to be provided as MABR channels to a plurality of subscriber devices of a premises served by the GW element. An ad control module having an interface to a managed ABR multicast back office node is provided at the premises gateway node, wherein the ad control module is adapted to generate, when a subscriber device tunes to a particular MABR channel: (i) a request/query to an ABR policy management system to be propagated via the managed ABR multicast back office node, the request/query configured for obtaining subscriber-based advertisement pull policies; and (ii) a request/query to an advertisement campaign management system to be propagated via the managed ABR multicast back office node, the request/query configured for obtaining locations of advertisements based on a subscriber demographic profile of the premises and genre of the particular MABR channel. A processor of the gateway node is operative to control a bandwidth allocation module and further configured to execute program instructions from a persistent memory for downloading advertisements from the locations based on the subscriber demographic profile and genre of the particular MABR channel via, e.g., a bandwidth managed download process. In one variation, such a download process may involve downloading via a progressive download ABR pipe portion using weighted fair queuing. In another variation, the ads may be downloaded via a process without necessarily managing the bandwidth of the pipe. A local cache coupled to the processor is advantageously included for storing the downloaded advertisements. The GW processor is further configured to execute program instructions for: monitoring an incoming gapped MABR segment stream of the particular MABR channel for advertisement insertion markers and advertisement endpoint markers; when an advertisement insertion marker is received in the incoming gapped MABR segment stream of the particular MABR channel, multiplexing an ad media file from the local cache into the particular MABR channel at an appropriate splicing timing point for streaming to the subscriber device; and continuing to play additional ad media files from the local cache to the subscriber device until an advertisement endpoint marker an auto return indication is reached in the incoming gapped MABR segment stream.

In a further aspect, an embodiment of a network node operative in a multicast ABR streaming network for targeting advertisements is disclosed. The claimed network node comprises, inter alia, a multicast streamer and segment combiner adapted to manage a plurality of incoming gapped MABR segment streams for generating a corresponding plurality of unsegmented MABR streams to be provided in a virtual MABR pipe to a downstream premises gateway serving a plurality of subscriber devices of a premises. An ad control module is advantageously included at the network node having an interface to a managed ABR multicast back office node. The ad control module is configured to generate, when a subscriber device tunes to a particular MABR channel: (i) a request/query to an ABR policy management system to be propagated via the managed ABR multicast back office node, the request/query configured for obtaining subscriber-based advertisement pull policies; and (ii) a request/query to an advertisement campaign management system to be propagated via the managed ABR multicast back office node, the request/query configured for obtaining locations of advertisements based on a subscriber demographic profile of the premises and the genre of the particular MABR channel. A processor of the network node is operative to control the advertisement control module in execution of program instructions from a persistent memory for downloading advertisements and associated manifests into a subscriber's network file storage (NFS) system from the locations based on the subscriber demographic profile and genre of the particular MABR channel. The processor is further configured to execute program instructions for: generating a request to a transcoder to transcode the advertisements into appropriate bitrates if the advertisements at the identified locations are not encoded at appropriate bitrates relative to a bitrate of the particular MABR channel; downloading the transcoded advertisements and associated manifests into the NFS system; monitoring an incoming gapped MABR segment stream of the particular MABR channel for advertisement insertion markers and advertisement endpoint markers (e.g., SCTE/ANSI 35 markers); when an advertisement insertion marker is received in the incoming gapped MABR segment stream of the particular MABR channel, obtaining a manifest for an ad media file from the NFS system and multiplexing the ad media file into the particular MABR channel at an appropriate splicing timing point for streaming to the subscriber device; and until an advertisement endpoint marker or an auto return indication is reached in the incoming gapped MABR segment stream, continuing to multiplex additional ad media files based on associated manifests from the NFS system for playout to the subscriber device.

Another group of embodiments of the present patent disclosure relate to triggering multicast ABR streams of ads at specific points (e.g., insertion markers in a multicast ABR media channel) that can be selectively joined by a GW node based on demographics and channel genre. In a further aspect, an embodiment of this group is directed to an advertisement targeting method in an MABR streaming network. The method comprises, inter alia, when a subscriber device of a premises tunes to a particular MABR media channel, obtaining multicast addresses and associated bitrates for a plurality of advertisement channels based on a subscriber demographic profile and genre of the particular MABR media channel. Similar to certain embodiments above, the particular MABR media channel is monitored for advertisement insertion markers and advertisement endpoint markers. When an advertisement insertion marker is reached, the GW node receives a plurality of multicast advertisement channels across multiple bitrates for a group of subscribers that have been triggered to be streamed by an MABR advertisement insertion streamer (MATS). The GW node then effectuates suitable messaging (e.g., IGMP) to switch to a particular multicast advertisement channel at an appropriate bitrate based on the subscriber demographic profile, whereby the particular multicast advertisement channel rather than the particular MABR media channel is delivered to the premises. When an advertisement endpoint marker is reached, the GW node issues similar messaging to switch back to the MABR media channel, accompanied by MAIS node stopping streaming of the multicast advertisement channels responsive to the endpoint marker.

In a still further aspect, an embodiment of an apparatus operative in a multicast ABR streaming network for targeting advertisements is disclosed. The claimed apparatus comprises, inter alia, an ad control module having an interface configured to communicate with a managed ABR multicast back office node for obtaining, when a subscriber device of a premises tunes to a particular MABR media channel, multicast addresses and associated bitrates for a plurality of advertisement channels based on a subscriber demographic profile and genre of the particular MABR media channel. A processor coupled to the advertisement control module and a persistent memory having program instructions thereon, is operative to execute the program instructions for performing: monitoring the particular MABR media channel for advertisement insertion markers and advertisement endpoint markers; when an advertisement insertion marker is reached, (i) receiving a plurality of multicast advertisement channels across multiple bitrates for a group of subscribers that are triggered to be streamed by an MAIS, and (ii) switching to stream a particular multicast advertisement channel at an appropriate bitrate based on the subscriber demographic profile, whereby the particular multicast advertisement channel rather than the particular MABR media channel is delivered to the premises; and when an advertisement endpoint marker is reached, (i) discontinuing streaming of the particular multicast advertisement channel, and (ii) switching to stream the particular MABR media channel to the premises.

In a still further aspect, an embodiment of a network apparatus is disclosed for facilitating initialization of a multicast ABR streaming network for targeting advertisements. The claimed network apparatus comprises, inter alia, an MABR encoder operative to generate segmented MABR representations across multiple bitrates for an incoming media stream. One or more MABR advertisement insertion streamers (MAIS) are coupled to the MABR encoder via an interface operative to communicate advertisement insertion markers and advertisement endpoint markers in the incoming media stream. A configuration module coupled to the MABR encoder and the MAIS is operative to effectuate: when a new media channel is brought up, activating the MAIS to interface with an MABR back office node and associated advertisement media campaign system to identify all applicable advertisement channels relevant to the new media channel; and receiving a plurality of multicast source addresses, multicast destination addresses and streaming bitrates for the identified advertisement channels.

Yet another group of embodiments of the present patent disclosure relate to switching continuously streaming multicast ad channels at suitable points in a multicast ABR media channel deployed in a "switched digital" architecture. An embodiment of an advertisement targeting method belonging to this group comprises, inter alia, when a subscriber device of a premises tunes to a particular MABR media channel, obtaining multicast addresses and associated bitrates for a plurality of advertisement channels based on a subscriber demographic profile and genre of the particular MABR media channel. Similar to certain embodiments above, the particular MABR media channel is monitored for advertisement insertion markers and advertisement endpoint markers. When an advertisement insertion marker is reached, appropriate messaging (e.g., IGMP) is effectuated (e.g., by the GW) to join to a continuously streaming advertisement channel at an appropriate bitrate based on the subscriber demographic profile, whereby the particular multicast advertisement channel rather than the particular MABR media channel is routed to the premises. When an advertisement endpoint marker is reached, the GW node issues similar messaging to the serving router so as to switch back to the MABR media channel. In one example implementation, each of the plurality of the advertisement channels is continuously streamed by an MABR ad channel encoder as gapped MABR ad streams. A related apparatus includes an ad control module to facilitate obtaining the ad channel information and a processor to execute the methodology immediately set forth above.

In a still further related aspect, an embodiment of a switched digital system is disclosed for facilitating targeted advertisements in a multicast ABR streaming network. The claimed embodiment comprises, inter alia, an MABR encoder operative to generate segmented MABR representations across multiple bitrates for an incoming media stream; an MABR ad channel encoder operative to receive a plurality of advertisement channels and process each of the advertisement channels as a plurality of segmented MABR advertisement streams that are continuously streamed across multiple bitrates; and an ad control module coupled to a multicast stream processing and segment combiner functionality for switching from a particular media channel that a subscriber is watching to a particular advertisement channel based on a subscriber demographic profile and genre of the particular MABR media channel when an advertisement insertion marker in the particular MABR media channel is reached and for switching back to the particular MABR media channel from the particular advertisement channel when an advertisement endpoint marker is reached.

In still further aspects, one or more embodiments of a non-transitory computer-readable medium containing computer-executable program instructions or code portions stored thereon are disclosed for performing one or more embodiments of the methods set forth above when executed by a processor entity of a network node, gateway element, and the like. Further features of the various embodiments are as claimed in the dependent claims.

Advantages of the present invention include, but not limited to, the ability to target advertisements, e.g., national, regional, and/or local commercials and such, based on a variety of subscriber-specific demographic data as well as the content type of the programs being watched in a multicast environment. As the targeting can be performed at the level of a subscriber's premises, broadcasters and advertisers can realize a finer-grain discrimination in their ad campaigns than is currently feasible, thereby potentially increasing the ROI of advertisement budgets. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
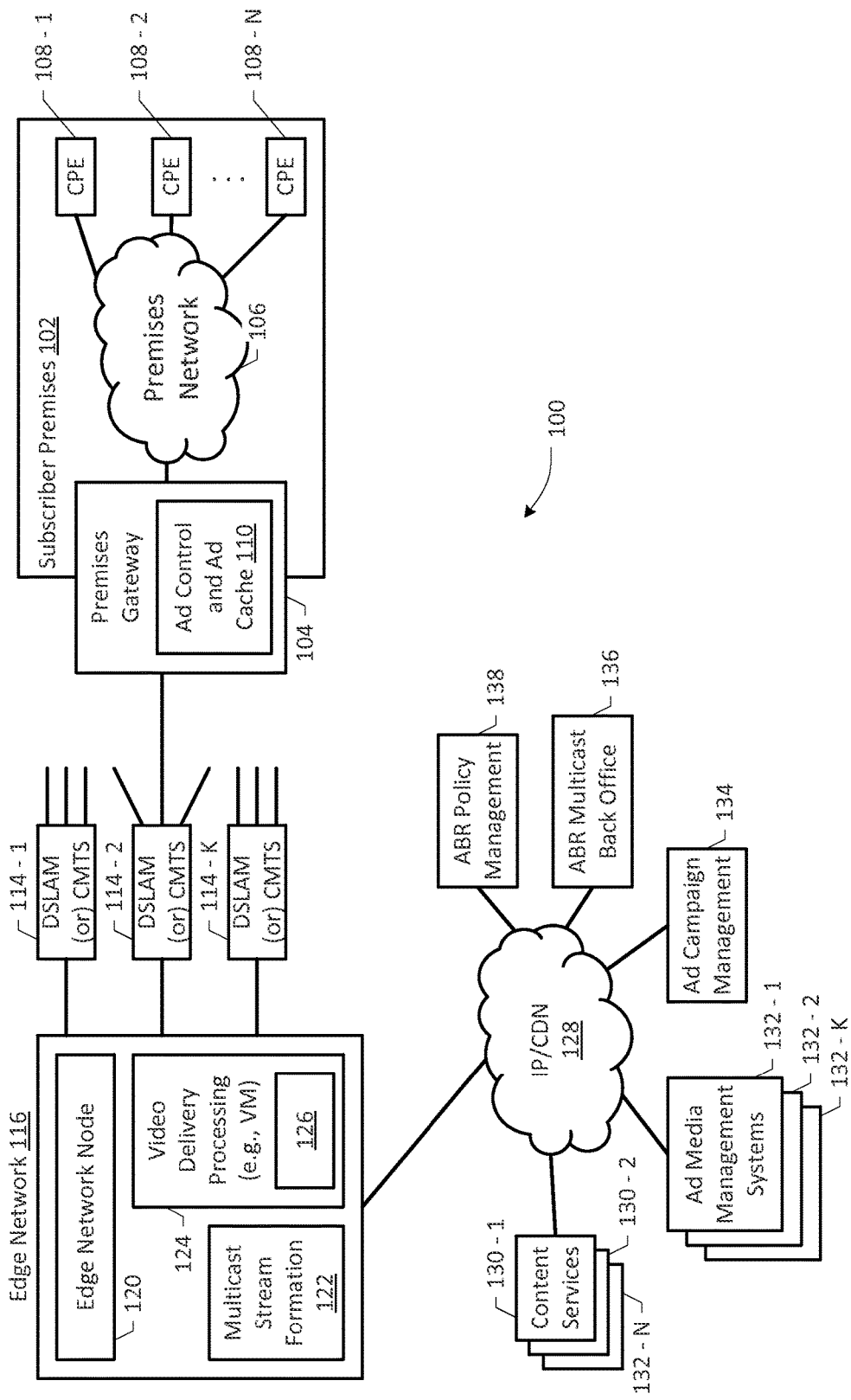
FIG. 1 depicts an example multicast ABR (MABR) streaming network environment wherein advertisements may be targeted to a subscriber premises according to one or more embodiments of the present patent application.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Accordingly, some network elements may comprise "multiple services network elements" that provide support for multiple network-based functions (e.g., A/V media delivery policy management, session control, Quality of Service (QoS) policy enforcement, bandwidth scheduling management, subscriber/device policy and profile management, content provider priority policy management, streaming policy management, advertisement policy management, and the like), in addition to providing support for multiple application services (e.g., data and multimedia applications). Example subscriber end stations or client devices may comprise any device configured to execute, inter alia, a streaming client application (e.g., an ABR streaming client application) for receiving content from one or more content providers, e.g., via a broadband access network. Such client devices may therefore include set-top boxes (STBs), TVs, personal/digital video recorders (PVR/DVRs), networked media projectors, portable laptops, netbooks, palm tops, tablets, smartphones, Voice Over Internet Protocol (VOIP) phones, mobile/wireless user equipment, portable media players, portable gaming systems or consoles (such as the WHO, Play Station 3®, etc.) and the like that may access or consume content/services provided via a suitable high speed broadband connection for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example multicast ABR (MABR) streaming network environment 100 wherein advertisements may be targeted to a subscriber premises, e.g., premises 102, according to one or more embodiments of the present patent application. In the context of the present disclosure, the MABR streaming network environment 100 may implemented as an end-to-end network architecture for delivering MABR media and advertisement content using any delivery infrastructures, e.g., a Digital Subscriber Line (DSL) architecture, a Data Over Cable Service Interface Specification (DOCSIS)-compliant Cable Modem Termination System (CMTS) architecture, a suitable satellite access architecture or a broadband wireless access architecture. By way of example and introduction, ABR streaming delivery is broadly set forth herein that is applicable to both DSL and DOCSIS architectures without being necessarily limited thereto. In a unicast delivery, a subscribing receiver may be provided with a direct and unique two-way path through the delivery network all the way back to a serving media server supplying the required data stream. The main streaming activity is managed on a one-to-one basis between the receiver and the source server. The network between the source server and receiver typically comprises a series of intermediate servers installed at network nodes which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the link between the source server and a given receiver. In general, this method of distribution may be wasteful of network capacity because, at busy times and for popular media streams, many copies can exist in the network simultaneously, thereby potentially contributing to network congestion.

A unicast system can support ABR streaming, which allows some form of rate adaptation. A given service may be encoded at a selection of different bitrates (known as representations), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast delivery makes more efficient use of bandwidth by sharing content streams among several receivers. Intermediate network routers are now more closely involved in the service delivery such that some control and management functions are delegated from the source server. This control is supported by more extensive protocols devised for this type of application such as Protocol Independent Multicast (PIM) and Internet Group Multicast Protocol (IGMP). When a new receiver requests a given media item, the network router system finds an existing stream of that content already in the network and directs a copy of it to that new receiver from an appropriately proximal network node in an edge distribution network. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download ABR clients of the premises that are designed to receive the video in bursts.

Turning back to FIG. 1, subscriber premises 102 may be a home, building, campus, organization, etc., served by a premises gateway (GW) 104 coupled to a plurality of subscriber devices, e.g., customer premises equipment or CPE 108-1 to 108-N, via a premises network 106 that may comprise a wireless and/or wireline communications network operating with suitable protocols (e.g., Ethernet and/or WiFi). By way of illustration, CPE 108-1 to 108-N may comprise any number of STBs, TV/PVR/DVRs, tablets, gaming devices, and the like, as alluded to previously. In general, premises gateway 104 may comprise any equipment or apparatus associated with the premises that facilitates a broadband pipe connection into the premises using suitable modulation/demodulation technologies and associated hardware, e.g., antennas, multiplexer(mux)/demultiplexers (demux), scramblers, encoder/decoders, and the like, wherein a number of video/data/phone communications services may be bundled, which may be delivered over terrestrial, wireless, wireline, cable and/or satellite networks. For example, premises gateway 104 may comprise a DSL router coupled to a DSL Access Multiplexer (DSLAM) 114-2 via suitable connection infrastructure 112 (e.g., twisted or untwisted copper pair). One skilled in the art will recognize that the illustrative DSL infrastructure may comprise any variant type such as, e.g., Asymmetric DSL (ADSL), Symmetric DSL (SDSL), Very high bit-rate DSL (VDSL) and other variants. In a DOCSIS-compliant implementation, premises GW 104 may comprise a cable modem coupled to a CMTS node 114-2 via suitable connection infrastructure 112 such as Hybrid Fiber-Coaxial (HFC) infrastructure. Accordingly, as will be understood by a skilled person, a plurality of access nodes 114-1 to 114-K (such as, e.g., DSLAM or CMTS nodes) may be provided in association with an edge distribution network 116 wherein each access node is operative to serve a plurality of subscriber premises via appropriate local access network infrastructures.

An edge network node 120 disposed in edge distribution network 116 may be coupled to DSLAM/CMTS nodes 114-1 to 114-K via any number of intermediary network nodes, e.g., routers, access servers, etc., that are not specifically shown in FIG. 1 for clarity. Likewise, edge network node 120 may be coupled to one or more public packet-switched networks (e.g., the Internet or the cloud), private IP networks, content delivery networks, content provider networks, ABR back office networks, or a combination thereof, illustratively shown as an IP/CDN network 128, via suitable intermediary network nodes that are omitted for sake of clarity. One skilled in the art will appreciate that an example CDN implementation may comprise an overlay network architected for high-performance streaming of a variety of digital assets or program assets as well as services (hereinafter referred to as "content") to subscribers, including wireless/mobile equipment users, using one or more Internet-based infrastructures, private/dedicated infrastructures or a combination thereof. In general, the terms "content", "content file", or "media segment" and the like as used in reference to at least some embodiments of the present patent disclosure may include digital assets and program assets such as any type of audio/video content or program segment, live or static (e.g., recorded over-the-air free network television (TV) shows or programs, pay TV broadcast programs via cable networks or satellite networks, free-to-air satellite TV shows, IPTV programs, etc.), Over-The-Top (OTT) and video-on-demand (VOD) or movie-on-demand (MOD) shows or programs, time-shifted TV (TSTV) content, as well as other content assets provided by content publishers, owners or providers, including but not limited to software files, programs, online electronic/video games, Internet radio shows/programs, entertainment programs, educational programs, movies, music video programs, and the like, that may be delivered using any known or heretofore unknown streaming technologies. By way of further example, contents sources 130-1 to 130-N are representative of providers of various kinds of content described above, which may be encoded and delivered over the IP/CDN implementation 128 using suitable ABR streaming techniques, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on.

In general, the overlay architecture of IP/CDN 128 may include a multi-level, hierarchically-organized interconnected assembly of network servers for providing media pathways or "pipes" from one or more central distribution nodes to one or more levels of regional distribution nodes that are connected to one or more local edge servers and/or radio network entities configured to serve a plurality of end user premises in respective serving location areas. In addition to such "distribution servers", a CDN implementation may also include and/or interoperate with various network elements configured to effectuate request redirection or rerouting mechanisms as well as related back office systems or nodes such as operator/subscriber policy management systems, bandwidth scheduling systems, account/billing systems, and the like, that may be deployed as part of a streaming network back office infrastructure (not specifically shown in FIG. 1).

For purposes of the present patent application, one or more advertisement media management systems 132-1 to 132-K, each including suitable server(s) and advertisement ("ad" or "ads" for short) content database(s), as well as one or more ad campaign management systems 134 may be coupled to IP/CDN 128 and/or other networks. Additionally, to effectuate management of multicast ABR (MABR) media streaming an ABR multicast back office system 136 may be provided in conjunction with IP/CDN 128 that allows a suitable interfacing with a subscriber premises, e.g., premises 102, and with an ABR ad policy management system 138. As will be described in further detail below, the ad campaign management system 134 and the ABR ad policy management system 138 are operative to facilitate targeted ad delivery based on factors such as subscriber demographics, genre of particular media channels being watched, etc., in addition to subscriber-based ad pull policies relating to pull weights, priorities, and the like.

Figure 28:
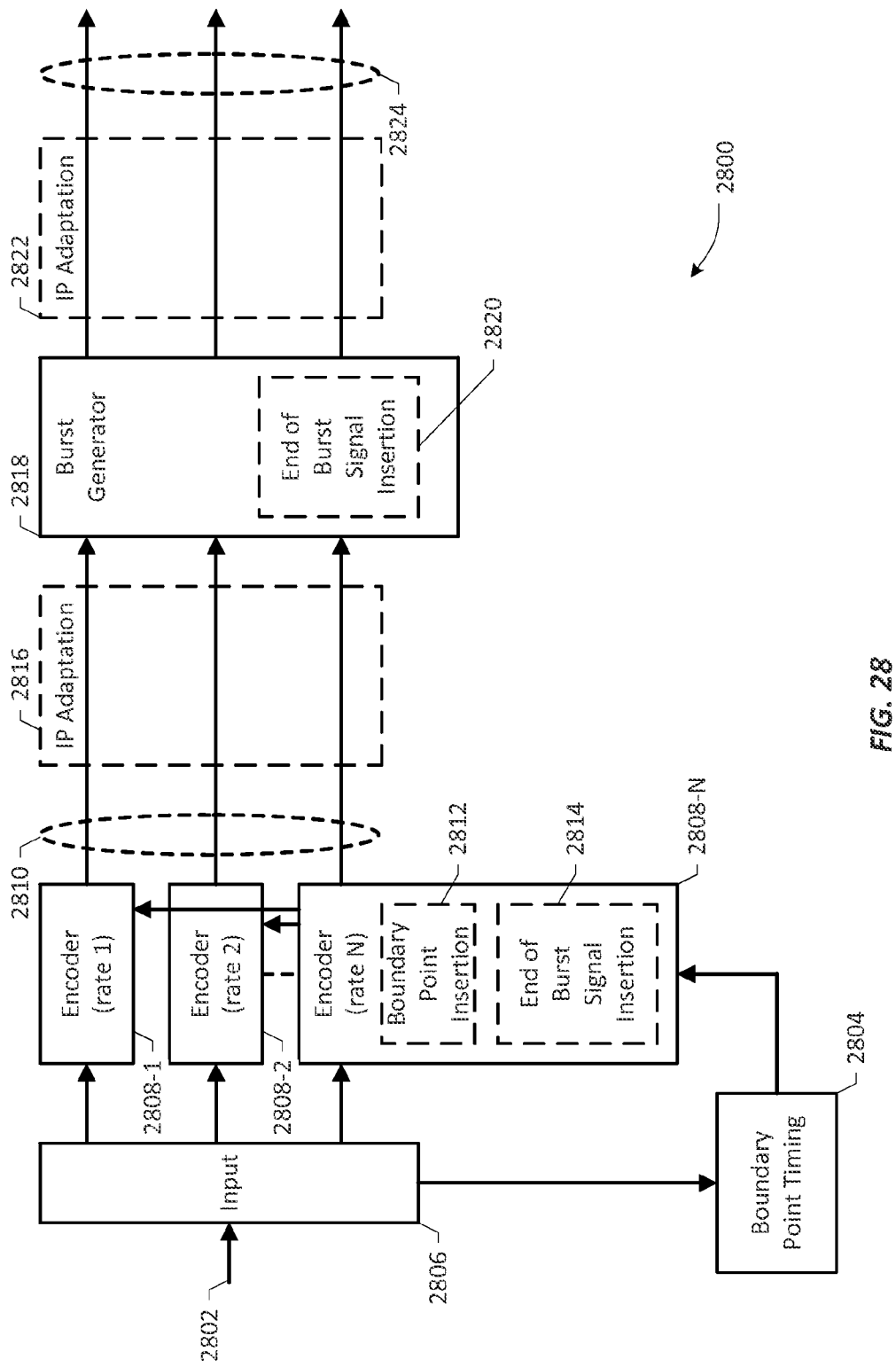
FIG. 28 depicts a block diagram of an apparatus for segmenting media and/or advertisement channels according to an embodiment of the present patent application.

As both media content streams and ad content streams may be sourced as unsegmented continuous streams, a multicast stream formation (MFS) functionality may be provided for facilitating multicasting of media and ad content as MABR channels having segmented streams at different bitrate representations, which may be suitably bandwidth-managed for delivery via a video delivery pipe provided to a subscriber premises. In one example implementation, such MFS functionality 122 may be provided at the edge network node 120 or some other upstream node (e.g., a head end node). Attention is now directed to FIG. 28 that depicts a block diagram of an apparatus 2800 operative as MSF functionality 122 for segmenting media and/or advertisement channels according to an embodiment for purposes of the present patent application. Apparatus 2800 is advantageously configured for creating a set of segmented stream representations and forming bursts with respect to a media and/or ad service, which segmented streams may be provided with suitable inter-segment gaps that allow channel operations such as channel joining, channel leaving, switching, splicing in or splicing out, channel (re)multiplexing, etc. at a downstream node (i.e., towards the subscriber premises). In an example implementation, apparatus 2800 may receive an input feed 2802 of content (e.g., A/V media or content) per service at an input block 2806 that fans the feed to a plurality of encoders/transcoders 2808-1 to 2808-N, which generate, in parallel, a set of representations of the content at different bitrates. The representations can differ in video resolution depending on the bitrate of encoding. A timing generator 2804 outputs a signal that determines the boundary point of the segments. For example, this functionality may output a signal once per 50 frames (2 seconds), or at any other suitable time interval. The signal output by generator 2804 is applied to all of the parallel encoders 2808-1 to 2808-N for that service. Advantageously, the set of coders 2808-1 to 2808-N can close a Group of Pictures (GOP) and a boundary point insertion unit 2812 can insert in-band signaling such as a Random Access Point (RAP) and a Boundary Point (BP). The outputs of the set of coders 2808-1 to 2808-N are the set of representations 2810 which have time-aligned segments. The representations 2810 are applied to a burst generator unit 2818 that creates the bursts separated by window periods (e.g., on the order of tens or hundreds of milliseconds). In operation, unit 2818 may be configured to play out data at a higher bit rate than the bit rate at which data was received to create the bursts and is operative to recognise the start and end of segments in the representations 2810 by detecting suitable signaling markers (e.g. the in-band BP signaling inserted by the encoders).

Advantageously, multicast address information may be added at an IP adaptation stage, which can occur at the edge network node 120, or at a node downstream of the node 120. Multicast IP datagrams have a destination IP address that is set to be in a range reserved for multicast. It should be appreciated that the apparatus shown in FIG. 28 can operate on data at one of various possible levels. In one advantageous scheme, data may be encoded into Transport Stream (TS) packets at a normal rate and the burst generator unit 2818 operates on TS packets. Transport Stream packets can be adapted into IP packets before burst generator unit 2818 at adaptation block 2816, or after unit 2818 at adaptation block 2822. Another alternative is to form bursts before any packetization (at TS or IP level), but this may be less desirable.

FIG. 28 further illustrates several possible places where end of burst signaling can be added. Each encoder 2808-1 to 2808-N can include an end of burst signal insertion unit 2814 that adds an information element indicating the end of a burst into the encoded data, which includes a header of the TS packets. Alternatively, the burst generator unit 2818 can include an end of burst signal insertion unit 2820 arranged to insert an information element indicating the end of a burst into each of the bursts. Where end of burst signaling is provided as a multicast (with same or different address), the multicast can be generated at the edge network node 120.

Typically, a network operator may receive a media content service feed from a service provider, which may then be converted to streams or channels having the right characteristics for the edge distribution network and end users of the network. Although FIG. 28 shows a set of encoders/transcoders 2808-1 to 2808-N configured to operate upon an input data stream 2808 to form the multiple representations at different bitrates, such a stage may be bypassed where a set of representations at different bitrates already exist. Accordingly, it should be understood that multiple representations for a media or ad content stream can be generated at a point of origin into the edge distribution network 116 or could be supplied by a service provider, wherein the multiple representations can include various definitions, e.g., Standard Definition (SD), High Definition (HD), Ultra HD, etc., of the same content. A skilled artisan will recognize that the duration of the window period introduced in a segmented stream is of sufficient magnitude for a multicast receiver to leave one representation of the stream and join a different representation at a different bit rate or an entirely different media stream, which may be accomplished by issuing appropriate IGMP Leave and Join messages. Additional details regarding multicast segmented stream formation and channel joining/leaving techniques may be found in commonly owned PCT Application No. PCT/EP2012/070960, titled "A METHOD AND APPARATUS FOR DISTRIBUTING A MEDIA CONTENT SERVICE", filed Oct. 23, 2012, in the name(s) of Anthony Richard Jones, now published as WO/2014/063726, incorporated by reference herein.

Referring back to FIG. 1, various aspects, functionalities and associated structures relating to targeted multicast ad delivery in an MABR environment such as the streaming network environment 100 may be advantageously provided in association with one or more downstream nodes, one or more upstream network nodes, or in combination thereof. For instance, such functionalities and structures may be provided in a gateway implementation, e.g., at premises gateway 104, or in a network node implementation, e.g., at edge network node 120, or in some combination thereof. In accordance with the teachings herein, a number of targeted multicast ad delivery techniques relate to providing targeted ads that are downloaded in a suitable cache. Another group of embodiments relate to selectively triggering multicast ABR streams of ads at specific points in a media channel. Yet another group of embodiments relate to switching continuously streaming multicast ad channels at suitable points in a "switched digital" architecture. By way of illustration of the overall network environment 100 shown in FIG. 1, an ad control functionality and local ad cache 110 may be provided at GW 104 with respect to certain embodiments. A video delivery processing (VDP) engine or virtual machine 124 having a network node-based ad control functionality 126 may be provided in conjunction with the edge network node 120 with respect to additional groups of embodiments. In still further embodiments, appropriate structures and functionalities for effectuating multicast ABR ad channel stream triggering may be provided in association with MFS 122 and VDP 124. These embodiments will be set forth below in additional detail.

Figure 2:
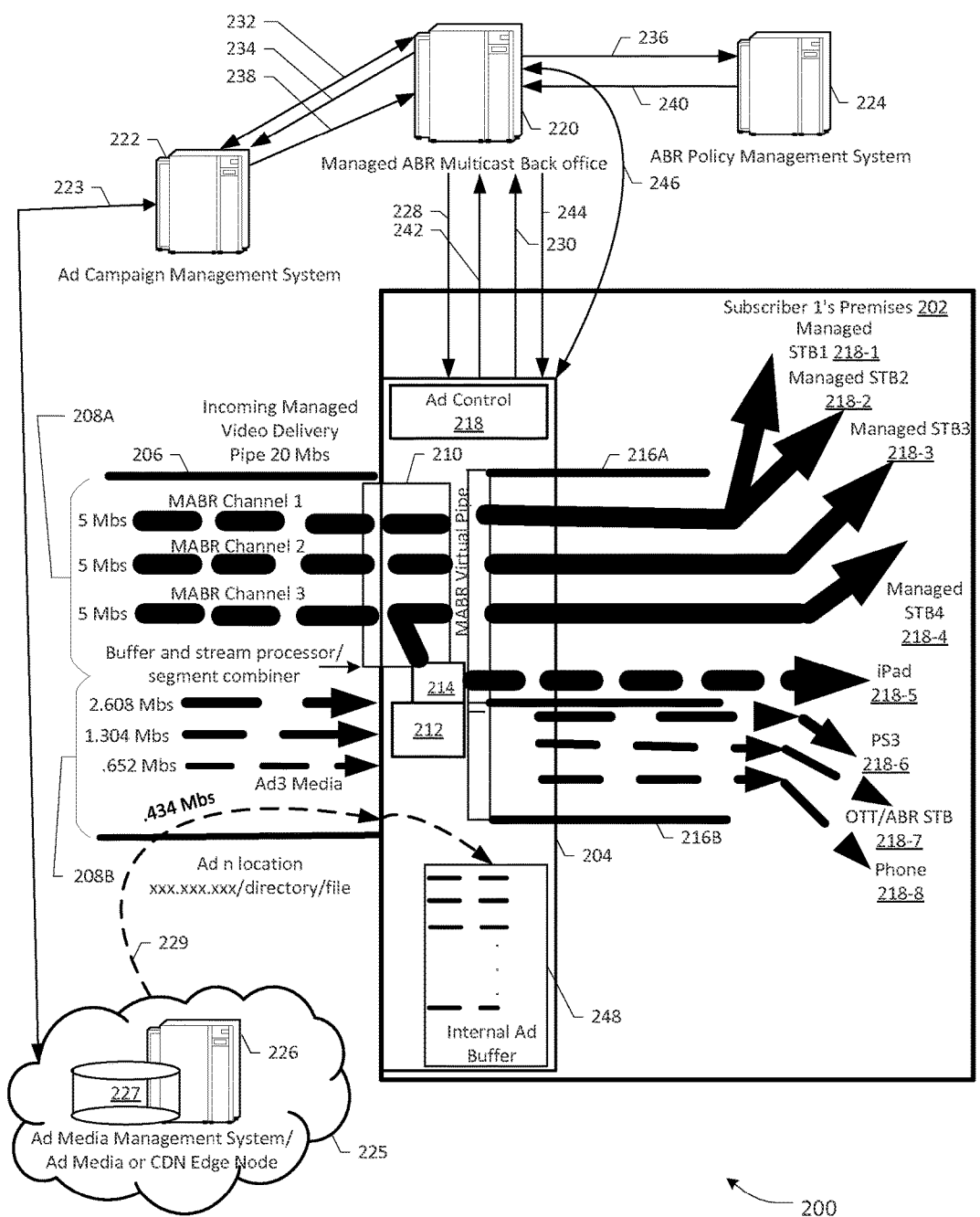
FIG. 2 depicts a portion of the MABR streaming network environment wherein targeted advertisements may be downloaded in a gateway implementation according to an embodiment.

FIGS. 2-8 relate to various functionalities and associated structures and apparatuses that relate to a gateway node implementation of multicast ad delivery wherein targeted ads may be preloaded in a local ad cache. In particular, FIG. 2 depicts a MABR streaming network portion 200 wherein targeted advertisements may be downloaded to an ad buffer 248 provided in association with a gateway 204, which is generally cognate with the generalized premises gateway 104 in FIG. 1. Operationally, gateway 204 may be configured to manage an incoming broadband delivery pipe 206 having certain managed bandwidth in order to provide an outbound MABR virtual pipe over LAN/WLAN into a subscriber's premises 202, e.g., including a managed pipe 216A that supports a plurality of MABR channels of managed unsegmented streams with respect to a plurality of managed subscriber devices or CPEs, as well as another outbound pipe portion (i.e., in premises) 216B that supports one or more unicast ABR channels with respect to one or more unicast subscriber devices or CPEs. Moreover, gateway 204 may be provided with additional bandwidth control functionality to support progressive download ABR streams within the same outbound pipe 216A/B serving the premises 202 in conjunction with a local HTTP server 214 coupled to one or more progressive download ABR clients. By way of illustration, managed devices STB1 218-1 to STB4 218-4 are illustrative of managed CPEs that receive 5 Mbs MABR channels 1-3, with STB1 and STB2 sharing the same MABR channel. Likewise, a gaming device 218-6, an Over-the-Top (OTT) STB 218-7 and a phone 218-8 are illustrative unicast client devices of the subscriber premises 202. A tablet device 218-5 operable with HTTP server 214 is also illustrated in FIG. 2 that is representative of a progressive download client that receives a shared video channel, e.g., MABR channel 3, via a bursty communication path.

To support the plurality of multicast ABR, unicast ABR and progressive download ABR channels or streams within the same pipe, GW 204 may be provided with suitable bandwidth control and bandwidth allocation divider functionality that manages the incoming delivery pipe's bandwidth using such techniques as, e.g., weighted fair queuing (WFQ), or any other bandwidth management methodologies, etc., collectively shown as BW management module 212. For example, in one implementation, a WFQ scheduler functionality associated with module 212 may buffer data segments of each of the received content streams, by saving and retrieving the data segments of different content streams in different memory queues of an input buffer. A scheduling technique may be provided that associates scheduling weights (e.g., priorities) to each of the memory queues, and retrieves the data segments from individual ones of the memory queues at rates that are controlled responsive to the associated weights. The retrieved data segments of the content streams are thereby statistically multiplexed when forwarded through the premises distribution network for receipt by the CPE nodes. Further, a bandwidth decision manager functionality may be provided to control the scheduling performed by the WFQ scheduler functionality using such parameters as subscriber- and channel-level weight values as well as user-equipment-node-level weight values. The bandwidth decision manager functionality preferably operates in combination with the WFQ scheduler functionality to regulate the bandwidth allocated to virtual pipes for carrying content streams through the local distribution network to groups of user equipment nodes associated with each of the subscriber accounts. By way of example, an incoming video pipe of 20 Mbs may be apportioned into a 15 Mbs virtual MABR video pipe for the managed MABR channels, thereby leaving 5 Mbs for a unicast ABR delivery pipe, each of which may be individually managed for dynamic bandwidth allocation or resizing. Additional details with respect to allocating bandwidth on an outgoing virtual pipe based on push/pull weights and priority levels, dynamic (re)sizing of the pipes and scheduling based on WFQ techniques may be found in one or more of the following commonly owned U.S. patent application(s) and/or patent(s): (i) "BANDWIDTH MANAGEMENT FOR OVER-THE-TOP ADAPTIVE STREAMING", application Ser. No. 13/845,320, filed Mar. 18, 2013, in the name(s) of Christopher Phillips et al., (ii) "REGULATING CONTENT STREAMS FROM A WEIGHTED FAIR QUEUING SCHEDULER USING WEIGHTS DEFINED FOR USER EQUIPMENT NODES", application Ser. No. 13/597,333, filed Aug. 29, 2012, in the name(s) of Christopher Phillips et al., now issued as published as U.S. Patent Application Publication No. 2014/0068076; (iii) "METHODS AND APPARATUS FOR MANAGING NETWORK RESOURCES USED BY MULTIMEDIA STREAMS IN A VIRTUAL PIPE", application Ser. No. 13/403,075, filed Feb. 2, 2012, in the name(s) of Christopher Phillips et al., now issued as U.S. Pat. No. 8,549,570; and (iv) "METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK", application Ser. No. 13/856,895, filed Apr. 4, 2013, in the name(s) of Christopher Phillips et al., incorporated by reference herein.

Further, BW management module 212 may also include a programmable allocation bandwidth divider functionality that separates the video pipe into a streaming side portion that is managed by a streaming processor in the premises gateway 204 and a progressive download side portion that is managed using the WFQ techniques described above. In an example implementation, management of the progressive download side portion of the premises video pipe 216A/216B may be provided by either the HTTP server functionality 214 of the premises gateway 204 or by an upstream node in the network 200, using information provided by the premises gateway 204. Typically, subscribers (e.g., Subscriber-1 associated with premises 202) can set priorities for individual CPE devices within the premises and can designate a percentage of the video pipe that will be dedicated to streaming (i.e., multicast and unicast ABR), the remaining percentage being allocated to progressive download clients. A dynamic bandwidth allocation functionality of BW management module 212 may also be provided in order to dynamically change the bandwidth being used by a streaming client on a managed channel, e.g., channels 1-3. Yet another functionality of BW management module 212 is operative, in conjunction with HTTP server 214 in an example implementation, for sharing multicast ABR segments with a progressive download client when the progressive download client is viewing the same content at the same bitrate as a multicast client. This functionality can utilize manipulation of a manifest for the progressive download ABR client and/or a mechanism that caches the MABR segments.

In terms of allocating or dividing the bandwidth of incoming delivery pipe 206 across the outbound video pipe that delivers both MABR/UABR content and progressive download ABR content, the functionality of BW module 212 includes executing a process that comprises, in one implementation, receiving a designation of a congestion boundary within the video pipe 206 serving the premises 202, wherein the congestion boundary is operative to designate a first percentage of the video pipe that is to be used for streaming ABR content when congestion exists on both sides of the congestion boundary. The remaining percentage of the video pipe 206 is designated for progressive download ABR clients. BW management module 212 is operative to allocate bandwidth for streaming content only that portion of the remaining percentage of bandwidth that is not requested for progressive download content. Likewise, allocation of bandwidth for the progressive download content may contingently be determined such that only that portion of the first percentage of bandwidth that is not requested for streaming content. In FIG. 1, reference numerals 208A and 208B are illustrative bandwidth portions allocated within the incoming pipe 206 according to an embodiment set forth above for managing various streaming and progressive download content delivery.

Additionally, with respect to managing bandwidth in the streaming side of the dedicated video pipe, e.g., pipe 216A, BW management module 212 may be configured to perform a process wherein a modeling or remodeling of the streaming pipe bandwidth allocations with the associated client device list and their associated priorities is effectuated whenever a streaming client changes a channel, a new broadcast client joins the streaming side or a client leaves the streaming side, or a change is made in the policy management of streaming pipe allocations, or a new unicast streaming client joins or leaves, or any combination thereof. A parameter referred to as a composite device priority (CDP) may be determined with respect to all requested streams and generating a requested streaming list associated with streaming clients for the modeled streaming pipe. In one implementation, the requested streaming list may be sorted based on the determined CDP, for example, in descending order. For each stream in the requested streaming list, the process continues with determining whether the lowest bitrate associated with the stream will fit into the modeled pipe and if the lowest bitrate will fit into the modeled pipe, the stream may be added to a list of applied streams along with a weight associated with the CDP for the stream. If the stream does not fit within the modeled pipe, the channel may be added to a skipped stream list. Thereafter, the process continues with computing an inadequacy metric for each stream in the list of applied streams using the respective weight and assigned bitrate and sorting the list of applied streams by inadequacy metric in descending order. Then, for each stream in the sorted list of applied streams, a determination may be made whether the stream can upgrade to a next highest bitrate using the given amount of streaming bandwidth and if the stream can upgrade to the next highest bitrate, the bitrate for the stream may be up-changed to the next highest bitrate. Once all bitrates are determined, for each stream in the list of applied streams, if the stream is a MABR stream and the stream is not currently connected to a correct IGMP group, an IGMP Join may be performed in order to join to the determined channel multicast bitrate. If the stream is a UABR stream and the stream needs to change streaming bitrate, a new unicast streaming bitrate may be requested from an appropriate CDN edge streamer. Additional details with respect to bandwidth divider implementations and CDP-based stream management may be found in one or more of the following commonly owned U.S. patent application(s): (i) "UNICAST ABR STREAMING", application Ser. No. 14/246,920, filed Apr. 2, 2014, in the name(s) of Christopher Phillips et al., and (ii) MERGING MULTICAST ABR AND UNICAST ABR WITH PROGRESSIVE DOWNLOAD ABR IN A CUSTOMER PREMISES DEVICE WITHIN THE SAME VIDEO DELIVERY PIPE", application Ser. No. 14/246,880, filed Apr. 2, 2014, in the name(s) of Christopher Phillips et al., which are hereby incorporated by reference.

Subscriber premises GW 204 further includes a buffer and stream processing engine coupled with segment combiner or multiplexer functionality 210 that is operative to combine, de-gap and appropriately multiplex the incoming segmented MABR channels that have been processed according to an upstream multicast stream formation functionality, e.g., an embodiment of apparatus 2800, described above. An ad control and management module 218, operative in conjunction with the stream processing engine functionality 210, is advantageously provided in association with GW 204. The ad control module 218 and/or GW 204 may be provided with appropriate network interfaces in order to effectuate various request and response interactions with a managed ABR multicast back office node 220 configured to provide media and ad-related back office functions for the subscriber premises 202. Further, suitable reporting interfaces 232 and 246 are respectively disposed between an ad campaign management system 222 and the ABR multicast back office node 220 and between the ABR multicast back office node 220 and GW/ad control 204/218 for effectuating ad management and maintenance communications as will be set forth below. The ad campaign management system/node 222 and an ABR pull policy management system/node 224 are interfaced with the managed ABR multicast back office 220 for effectuating downloading of targeted ads from a plurality of locations which may comprise distributed or centralized ad content sources or providers and/or associated with appropriate CDN edge nodes, as illustrated by an ad media management collection 225 wherein a server 226 and ad media database 227 are representative. An ad management system interface 223 is disposed between each of the ad locations 225 and the campaign management system 222.

Advantageously, a local ad buffer or storage 248 is provided in conjunction with subscriber premises GW 204 for storing downloaded ads that are targeted for the subscriber in accordance with the teachings herein. For purposes of the present patent disclosure, ads may comprise national ads, regional ads, local ads, commercials, infomercials, announcements that precede or follow ads, etc. that may be available as streaming media or as pull-based files, or both. Such ads may also be subject to licensing windows and/or other use/geography restrictions. Additionally, at least in the context of some of the embodiments set forth hereinbelow, a media channel or stream may be considered as a primary service channel that a subscriber may tune to using appropriate CPE devices whereas an ad channel that is provided to the subscriber while watching the primary service channel. In that sense, an ad channel may be considered a secondary channel in relation to the primary media channel which may be delivered to the subscriber premises via multicast ABR streaming.

The ad campaign management system 222 advantageously comprises appropriate service logic for determining and returning locations of ads that may be distinguished, differentiated or categorized based on subscriber-based factors as well as the media/content-related indicia of the channel being watched. Subscribed-based factors may comprise any combination or sub-combination of parameters such as subscriber demographics including, but not limited to, subscriber personal data such as names, age(s), gender(s), ethnicities, number of individuals in the premises or size of the household, socioeconomic parameters, subscribers' residential information (i.e., where they live—city, county, state, region, etc.), employment history, income or other economic data, spending habit data, social media data/profiles, religion, language, etc. Media/content-based factors may include, e.g., genre of the channel, category, type, ratings by applicable regional/national/foreign rating bodies, language of the content, content theme or plot information, and like. Accordingly, the service logic executing at the ad campaign management system 222 is operative to classify the available ad content locations (e.g., based on licensing and/or other restrictions) that are targeted to a specific subscriber, which may be downloaded into GW buffer 248 using the pull policies provided by the ABR policy management system 224.

Figure 3:
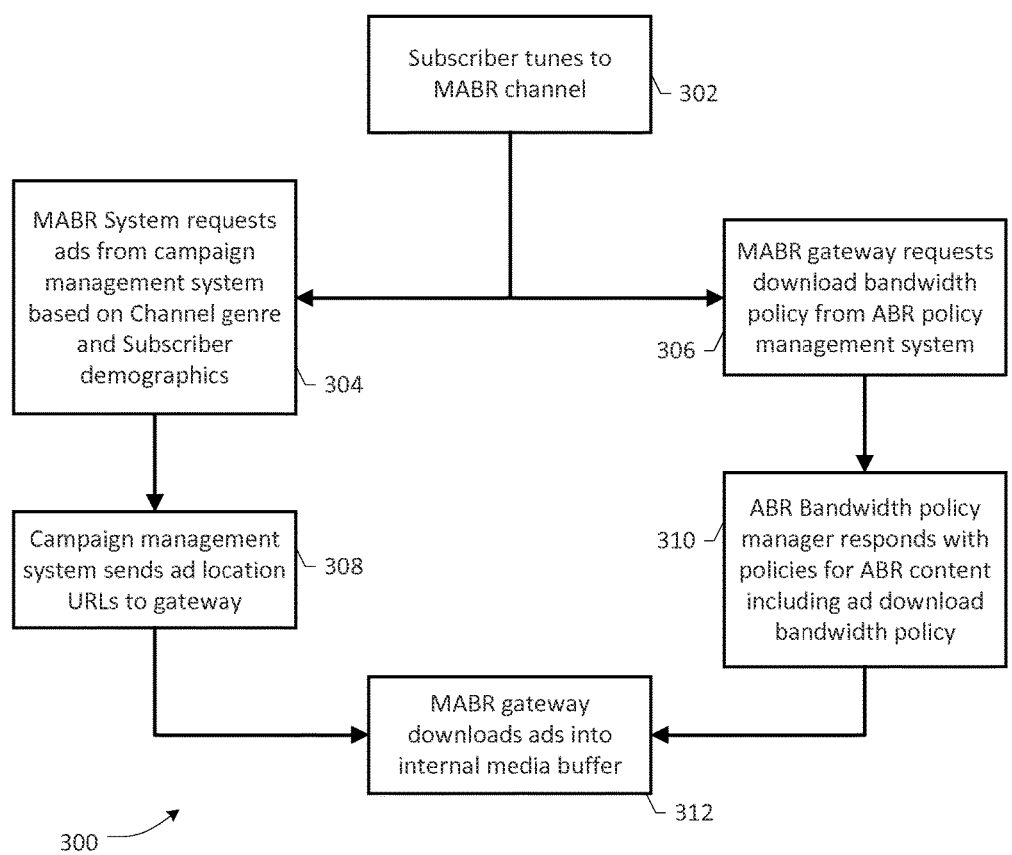
FIG. 3 depicts a flowchart of an illustrative process for downloading targeted advertisements in the gateway implementation of FIG. 2.

Turning to FIG. 3, depicted therein is a flowchart of various blocks, steps and/or acts that may be combined in one or more arrangements that illustrate a process 300 for downloading targeted advertisements in the gateway implementation described above, which will be described in reference to FIG. 2. As the subscriber tunes to a particular MABR channel, (e.g., channel 3), as set forth at block 302, the ad control functionality 218 is operative to issue a number of request/query mechanisms to ABR multicast back office node 220 that may be propagated to the ad campaign management system 222 and the pull policy management system 224. Reference numerals 242 and 230 in FIG. 2 are example subscriber-specific requests/queries: (Ad Demographic Request for Subscriber-1) and (Subscriber-1 Policy Request) for obtaining demographic/genre-based targeted ad locations and associated pull policies, respectively, generated by/from GW/ad control 204/218. Upon receipt of request/query 242, the ABR multicast back office 220 propagates or otherwise generates a corresponding request 234 to the ad campaign management system 222 relative to the subscriber demographics and MABR channel's genre (including any other related parameters as set forth above). Responsive thereto, the ad campaign management system 222 obtains or is otherwise provided with a plurality of ad locations hosting suitable ad media, e.g., by way of interactions with ad media management locations 225. A response 238 is thereafter generated including the ad location information, e.g., as below:

---
Ad Media Response
Subscriber 1
Ad 1 location url://xxx.xxx.xxx/directory/file
Ad 2 location url://xxx.xxx.xxx/directory/file
Ad 3 location url://xxx.xxx.xxx/directory/file
.
.
Ad n location url://xxx.xxx.xxx/directory/file
---

Upon receiving the response 238, the managed ABR multicast back office 220 propagates or otherwise generates a response 228 with the ad location information to the gateway ad control functionality 218. With respect to the pull policy request 230, the ABR multicast back office 220 generates or otherwise propagates a corresponding policy request 236 to the ABR policy management system 224. Responsive thereto, a response including the requesting subscriber device's weight, ad pull weight and priority is provided, e.g., as below:
Subscriber 1 Device Weight
Ad Pull Response
Ad Pull weight 0.5
Priority 4

Response paths 240 and 244 in FIG. 2 are illustrative of such a pull policy response process mediated via the MABR back office 220. In FIG. 3, blocks 304 and 308 set forth the steps relating to the MABR system requesting ads from ad campaign management system 225 and receiving ad locations (e.g., URLs) therefrom. Blocks 306 and 310 set forth the steps relating to the download bandwidth policy (i.e., pull policy). Thereafter, GW/ad control 204/218 is operative to download ads from the identified locations preferably using the bandwidth allocated to the progressive ABR download pipe portion 208B of the incoming delivery pipe 206 based on appropriate WFQ techniques such that the existing bandwidth allocations for the premises 202 are not unduly disturbed. In FIG. 2, reference numeral 229 is illustrative of such a download path from the identified ad location. As set forth at block 312 in FIG. 3, the ads are downloaded/pulled and stored into the local ad buffer 248, which may be organized in any manner (e.g., First-In, First-Out (FIFO), Last-In, First-Out (LIFO), circular buffer, etc.) depending on applicable ad playout and maintenance policy.

Figure 4:
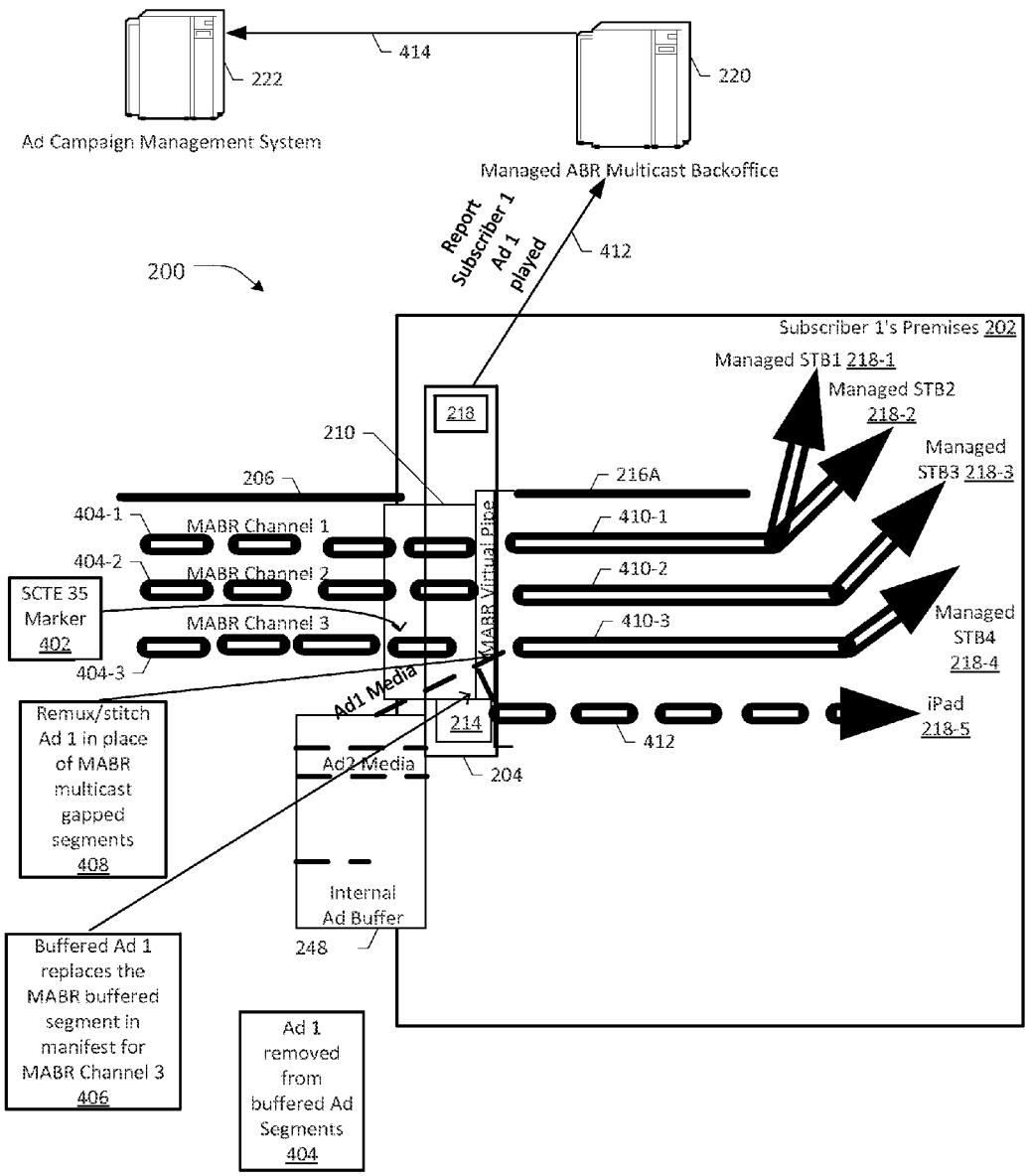
FIG. 4 depicts a portion of the MABR streaming network environment wherein the downloaded advertisements may be multiplexed within a media channel in the gateway implementation of FIG. 2.

FIG. 4 depicts the network portion 200 of example MABR streaming network environment wherein the downloaded advertisements may be multiplexed (i.e., "stitched") within a media channel in the gateway implementation of FIG. 2. In general, ad insertion into a primary channel involves cueing and splicing. Cueing defines a digital cue delivery that is in-band with the primary channel's video/audio programming. Advantageously, an embodiment of FIG. 4 utilizes the ANSI/SCTE-35 standard that defines a process to signal an ad insertion opportunity in a transport stream, i.e., how DPI (Digital Program Insertion) avails may be signaled to a video splicer/mux functionality. As one skilled in the art will recognize, SCTE-35 packets are multiplexed with the packets in the transport stream, wherein commands signaling splice-in and splice-out events may be formatted. When out_of_network_indicator is 1, splice_insert command signals switching from a primary stream to a secondary stream. When out_of_network_indicator is 0, splice_insert command signals switching back to the primary stream. These events may be referred to as cue-out event and cue-in event, respectively.

The timing of a splice event may be specified in terms of a Presentation Time Stamp or PTS, which has two fields: pts_adjustment field in splice_info_section( ) syntax and pts_time field in splice_insert( ) syntax. It is also possible to signal a splice event without specifying the time. For example, when splice_immediate_flag is 1, a splice event is triggered at the earliest possible timing. To allow for scheduling ad insertions before the actual event, a splice_schedule( ) command may be used. It has similar syntax and semantics as splice_insert( ) but uses wall clock time instead of PTS. Depending on the accuracy of the wall clock time, fairly accurate splicing events may be scheduled far before the actual event (e.g., 10 seconds) based on the broadcast schedule of a media channel, for example. Both splice_insert and splice_schedule commands may be issued with a unique identifier for each splice event (e.g., a 32-bit integer that may be incremented for each event). A splice_insert or splice_schedule command may be sent multiple times with the same splice_event_id in a transport stream so as to ensure that the video splicer/mux functionality receives the appropriate command prior to the actual event.

In terms of the splicing itself, it should be appreciated that splicing-out and splicing-in may only be performed on certain specific frames of a GOP representing the primary channel. For instance, only an intra-frame (I-frame) may initiate splicing-in whereas splicing-out may be performed on an anchor frame (i.e., an I-frame or a predictive frame (P-frame)). At the onset of a scheduled avail, the splicer begins to look for an out-point splicing event within the primary channel. When an ad avail finishes and cue message indicates a return to network source, the splicer/mux engine looks to execute an in-point splicing event accordingly.

It should be apparent that although ANSISCTE-35 compliant ad insertion cueing is specifically set forth above, an implementation of appropriate advertisement insertion markers and advertisement endpoint markers (i.e., AIMs/AEMs) for purposes of the embodiments set forth herein are not limited to such technologies. As pointed out previously, in the context of the present patent disclosure, AIMs/AEMs should be understood as comprising any indication or indicium relative to a Transport Stream (TS) that provides a reference (e.g., one or more timing references, including an auto return option) to a receiving entity that allows inserting or splicing of secondary streams, channels or files at an appropriate time or location within the flow. For example, an AEM could be a time code in a stream that identifies the end of an ad stream based on a Program Clock Reference (PCR) value or a Presentation Time Stamp (PTS) or Decoding Time Stamp (DTS) provided in the M2TS container format used for muxing A/V data. Accordingly, in an example implementation, a message may be received with ad coverage starting at clock reference <xx:xx:xx> and ending at <yy:yy:yy>, indicating that the primary media stream is to be joined at time stamp <yy:yy:yy>. Likewise, suitable clock references pertaining to other container format variations (e.g., BDAV MPEG-2 or Transport Stream on Disc (TOD), etc.) may also be used as AIMs/AEMs in other variations. Also, an ad termination may be indicated without explicitly providing a clock reference (absolute or indexed), e.g., using an auto return option, wherein a receiver does not have to wait for a specific timing indicator. In the context of the present patent disclosure, therefore, the terms "advertisement endpoint marker" or "AEM" also include the absence of a specific clock reference for signaling termination of an advertisement, and should be construed to mean any indication (direct, indirect, or inferential, or a priori or otherwise) to the receiver that a primary media channel is to be (re)joined or returned to (i.e., an endpoint).

In respect of FIG. 4, appropriate AIM/AEM indicia (e.g., SCTE-35 markers) for splicing-in and splicing-out may be advantageously propagated on incoming segmented or gapped MABR channels (Channels 1 to 3) 404-1 to 404-3 after processing by an upstream MFS functionality (e.g., MFS 122), which may be monitored by the stream processing and segment combiner/splicer functionality 210 of the gateway 204. Reference numerals 410-1 to 410-3 refer to the unsegmented (i.e., de-gapped) MABR channels provided to CPE 218-1 to CPE 218-4. In the example shown, the media content of de-gapped MABR channel 410-3 is also provided to a progressive download client 218-5 via path 412 as effectuated by HTTP server 214. Reference numeral 402 refers to an SCTE-35 marker that is monitored with respect to incoming MABR channel 404-3, which signals to the stream processing and segment combiner/splicer functionality 210 when to fetch an ad media file from the ad buffer 248 and mux it in place of MABR gapped segments of channel 404-3 (i.e., stitching), as set forth at block 408. Accordingly, rather than playing out the MABR buffered segment(s) indicated in the received manifest, the ad media file is replaced and played out as part of Channel 3 stream, which is provided to STB-4 218-4 and progressive download client 218-5 as set forth at block 406. The played out ad media file may be removed from the ad buffer 248, either immediately or after a time period (as set forth 404). A report 412 that a particular ad was played for the subscriber may be generated by the ad control module 218 to the ABR multicast back office 220, which is then propagated to the ad campaign management system 222 via reporting interface 414.

Figure 5:
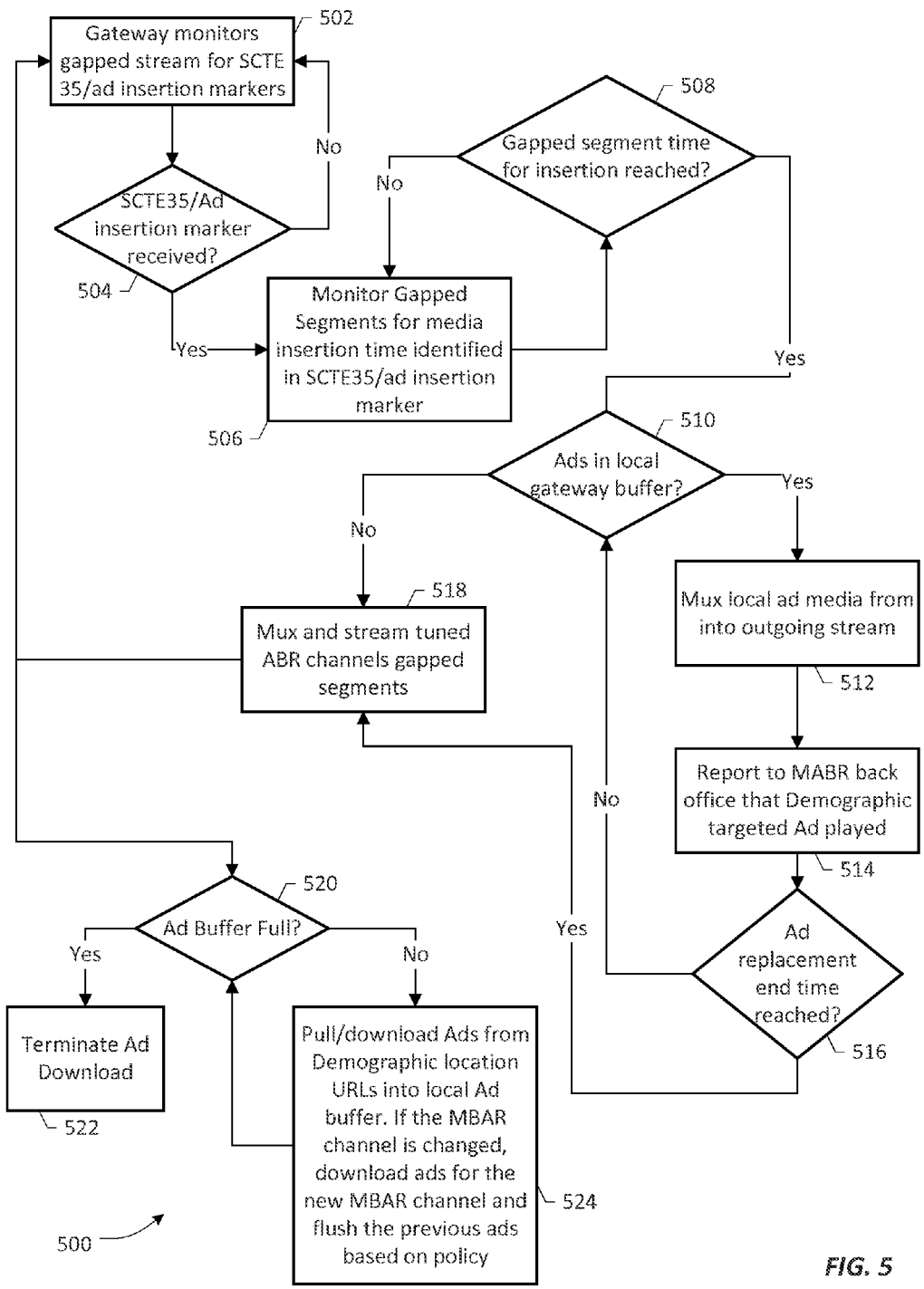
FIG. 5 depicts a flowchart of an illustrative process for delivering targeted advertisements in the gateway implementation of FIG. 2.

FIG. 5 depicts a flowchart of various blocks, steps and/or acts in additional detail that may be combined in one or more arrangements that illustrate a process 500 for delivering targeted advertisements spliced in a media channel in the gateway apparatus 204 as exemplified above. At block 502, the gateway service logic (e.g., stream processing and segment remux/splicing functionality) monitors the incoming gapped stream for the ad insertion markers (e.g., splice-in and splice-out markers such as SCTE 35 markers) in the tuned MABR channel relating to ad control. If an ad insertion marker is received (block 504), the gapped stream is monitored for the appropriate media insertion time specified in the marker (i.e., splicing event), e.g., in an iterative loop as set forth at blocks 506 and 508. If the specified time for the splice event is reached, a determination may be made whether there are ad media files in the local gateway buffer (block 510). If so, a local ad media file is multiplexed or stitched into the outgoing stream (i.e., into the premises network), which is now appropriately de-gapped. (block 512). Those skilled in the art will recognize that the inter-segment gap periods introduced into the incoming media stream by the upstream MFS functionality may be configured to facilitate a smooth splicing operation. Furthermore, when the splicing operation is viewed from the standpoint of the primary media channel wherein secondary content (e.g., ad media content) is stitched into the same primary channel, the so-called "cue-out" or "splice-out" event may be seen as a "splice-in" or "stitch-in" operation in one sense. Accordingly, for purposes of the present patent application, the meaning of terms such as "splice-in", "stitch-in", "cue-in", "mux-in", "splice-out", "mux-out", or "cue-out", etc., should be understood without necessarily implying any inherent directionality but rather within the context of the description of an embodiment set forth herein, or the arrangement of a particular drawing Figure, or in the context and structure of the recited language in a particular claim or claims appended hereto.

After sending out the muxed-in ad media file on the outgoing MABR channel into the premises, the gateway ad control logic is operative to generate a report message to the MABR back office that the targeted ad has been played (block 514). An iterative loop process may be effectuated to keep playing out the local ad media files (i.e., keep muxing in) until an ad replacement end time (e.g., as indicated in the SCTE-35 markers previously received) or an auto return indication is reached, as exemplified by blocks 516 and 510. If it was determined that the local buffer did not contain suitable ad media files (block 510) or if the ad replacement end time is reached (block 516), the process continues to mux and de-gap the primary MABR channel segments for sending out as the unsegmented MABR media channel (block 518), whereupon one branch of the process may return to the monitoring state (block 502). In a further variation, another branch of the process may also be executed with respect to managing and maintaining the local ad buffer. For example, a determination may be made whether the local ad buffer is full (block 520). If so, the targeted ad download process that may have been going on from the time the subscriber tuned to the particular MABR channel (e.g., as set forth in FIG. 3) may be terminated (block 522). Otherwise, a plurality of actions (or their combinations and/or sub-combinations) may take place such as, e.g., continuing to pull or download targeted ad media files from their locations, monitoring if the MABR channel has been changed, and if so, start downloading targeted ads relevant to the new MABR channel, and/or flushing or retaining the previously downloaded ads based on a retainment policy, as set forth at block 524.

Figure 6:
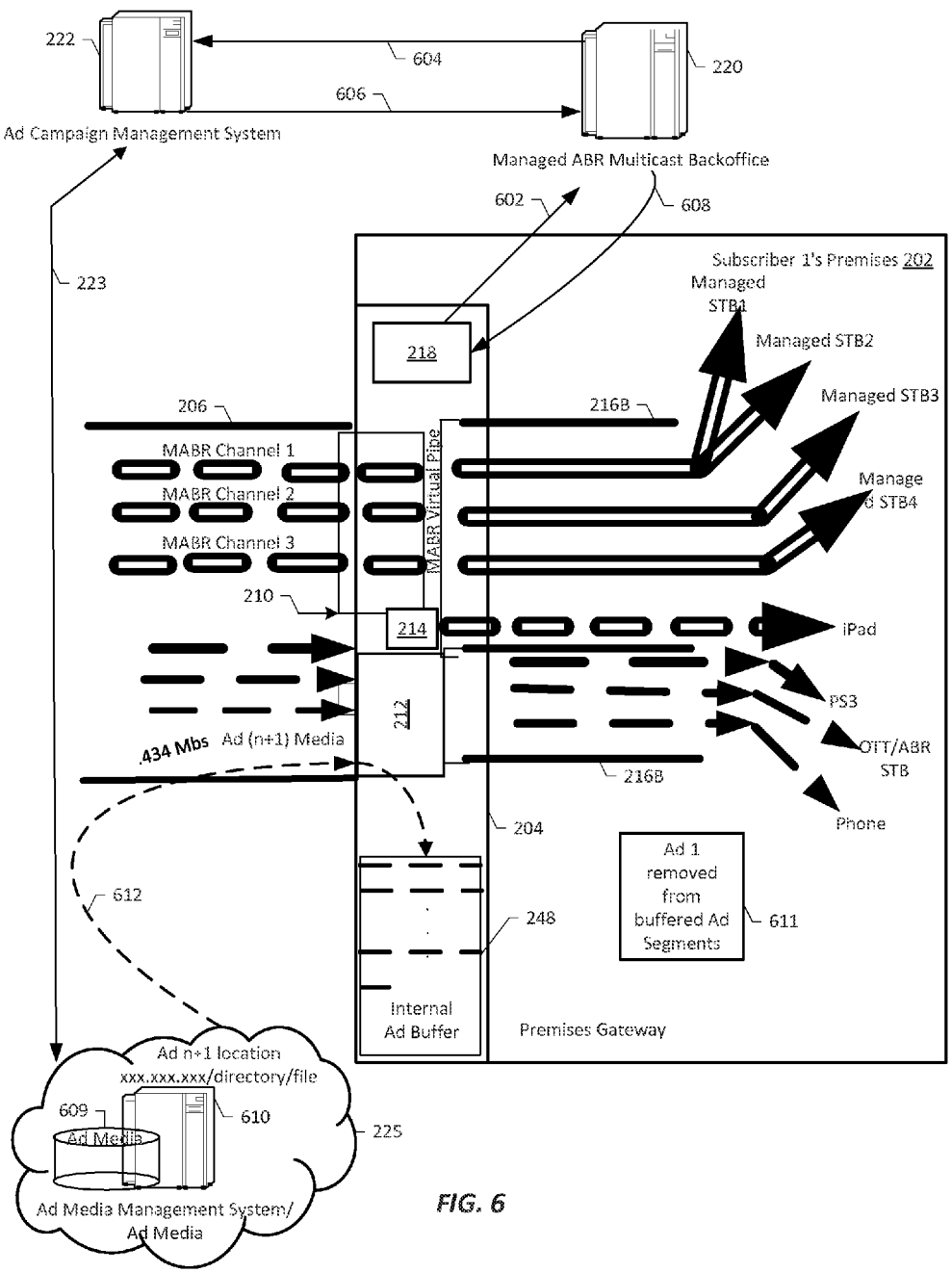
FIG. 6 depicts a portion of the MABR streaming network environment wherein a local advertisement buffer may be maintained in the gateway implementation of FIG. 2 according to an embodiment of the present patent application.

FIG. 6 depicts the network portion 200 of the MABR streaming network environment wherein a local advertisement buffer (e.g., buffer 248) may be maintained in the gateway apparatus 204 of FIG. 2 according to an embodiment of the present patent application. As pointed out above, after an ad media file has been muxed-in and played out on the tuned MABR channel, it may be removed from the buffer, which is illustrated at block 611 for a specific ad media file (Ad-1) in FIG. 6. The gateway ad control functionality 218 is operative to generate an ad update request 602 to the MABR multicast back office 220 indicating that Ad-1 has been played. The update request 602 may also include additional indicia (e.g., currently loaded ads, current content genre, current subscriber data, etc.). As before in the initial downloading process, the updated request 602 is propagated (as request 604) to the ad campaign management system 222, which interfaces with ad media management systems 225 via interfaces 223 to determine or otherwise obtain the next or updated set of ad locations. By way of illustration, reference numerals 609 and 610 refer to an example next location (Ad (n+1) location and associated ad media database(s)), which information is returned to the MABR multicast back office node 220 as response 606. The new ad location information is then passed on to the gateway ad control functionality via response 608, which is utilized in downloading or pulling the identified ad media in a suitable manner, e.g., via a progressive download path, as illustrated by a download path 612. The new ad media file(s) may be stored into the local buffer 248 in any structure or format depending on the manner the buffer is managed.

Figure 7:
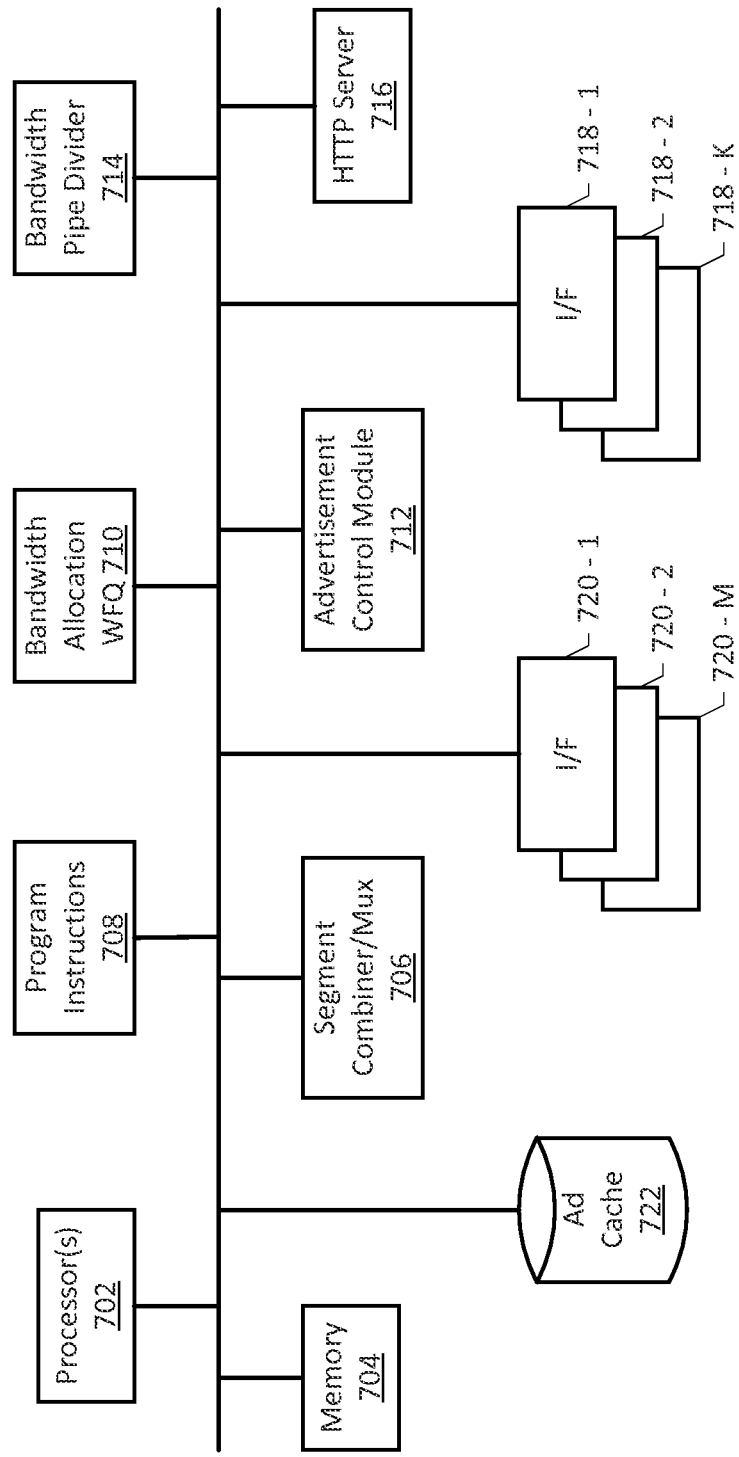
FIG. 7 depicts a block diagram of an example gateway apparatus in the gateway implementation of FIG. 2 according to an embodiment of the present patent application.

Turning to FIG. 7, depicted therein is a block diagram of an example gateway apparatus 700 that may be configured to operate in the gateway implementation of FIG. 2 according to an embodiment of the present patent application. A plurality of processors 702 may be coupled to memory 704 and persistent memory 708 for executing various program instructions or modules with respect to one or more processes set forth herein. One or more of processors 702 may be configured to operate as a streaming processor operative in association with other modules such as a segment combiner/mux module 706, bandwidth allocation and WFQ module 710, bandwidth pipe divider 714, etc. Likewise, one of the processors 702 may be configured to operate as a processor operative in association with an HTTP server 716 and related modules. An ad control and management module 712 may comprise its own dedicated hardware and/or software and may interoperate with additional program instructions 708 to effectuate the targeted ad download functionality set forth above. A data storage structure 722 is operative as a local ad cache for storing the downloaded ads targeted to a premises or subscriber served by the gateway apparatus 700. Various interfaces (I/F) 720-1 to 720-M are representative of network interfaces that the gateway apparatus 700 may use for external communications (i.e., outside of the premises and towards any networks) including, e.g., back office communications, CDN edge node communications, media stream communications, ad location communications, as well as other data/video/voice communications, etc. Accordingly, I/F 720-1 to 720-M may be embodied as interfaces operative for any wired, wireless, satellite, terrestrial, and/or cable communications. Further, the gateway apparatus 700 also includes suitable interfaces 718-1 to 718-K operative for effectuating in-premises communications via wireline and/or wireless network infrastructures with respect to various CPE devices as described above.

One skilled in the art should recognize that the gateway apparatus 700 described above may be configured to operate not only in the gateway implementation of FIG. 2 but also in one or more additional embodiments described below. Accordingly, at least some of the modules and blocks may be rearranged, modified or omitted in a particular embodiment while the program instructions stored in persistent memory 708 may also be suitably configured or reconfigured for executing appropriate service logic relevant to the particular embodiment(s) below.

Figure 8:
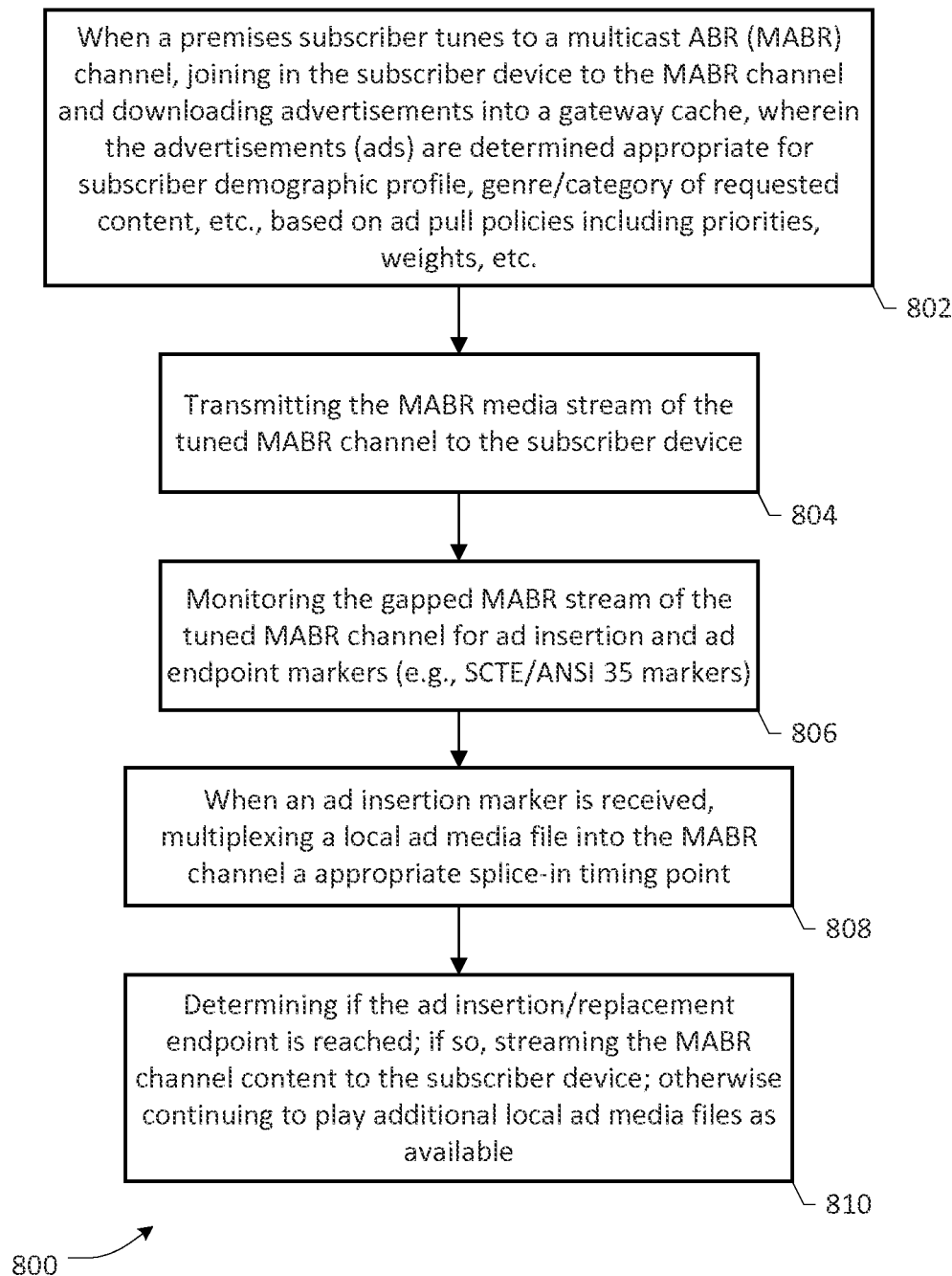
FIG. 8 depicts a flowchart of various blocks, steps and/or acts with additional detail that may be combined in one or more arrangements for delivering targeted advertisements in the gateway implementation of FIG. 2 according to an embodiment of the present patent application.

FIG. 8 depicts a flowchart of various blocks, steps and/or acts with additional detail that may be combined in one or more arrangements, e.g., including any portions or substitutions thereof shown in the flowcharts of FIGS. 3 and 5, for delivering targeted advertisements in the gateway implementation of FIG. 2 according to an embodiment of the present patent application. At block 802, when a premises subscriber tunes to or otherwise engages a particular MABR channel, the subscriber device may be joined to the multicast group for the channel using suitable IGMP messaging. Thereafter, targeted advertisements based on various subscriber indicia as well as content-based indicia may be downloaded as described above. Further, the downloading/pulling of the ad media files may be bandwidth-managed based on ad pull policies relating to content/device priorities, weights, etc. The MABR media stream for the tuned MABR channel may be suitably de-gapped/muxed and combined for delivery to the subscriber device as unsegmented stream using a suitable premises transmission network (block 804). The incoming gapped MABR stream of the tuned MABR channel is monitored for the scheduled avails based on ad insertion and ad endpoint markers, e.g., ANSI/SCTE 35 markers (block 806). When an ad insertion marker timing event is reached or otherwise received, a local ad media file is muxed into the MABR channel at appropriate splice-in timing point for playout on the tuned MABR channel to the subscriber device (block 808). A determination may be made whether an ad insertion/replacement endpoint time or other indication (e.g., auto return) is reached, and if so, the incoming gapped MABR segments are muxed and combined for streaming as before (block 810). Otherwise, the process 800 may continue to play additional local ad media files until the endpoint timing marker or an auto return indication is reached, or the channel is changed, or until buffer conditions no longer afford a playout (e.g., drainage), as illustrated at block 810.

Figure 9:
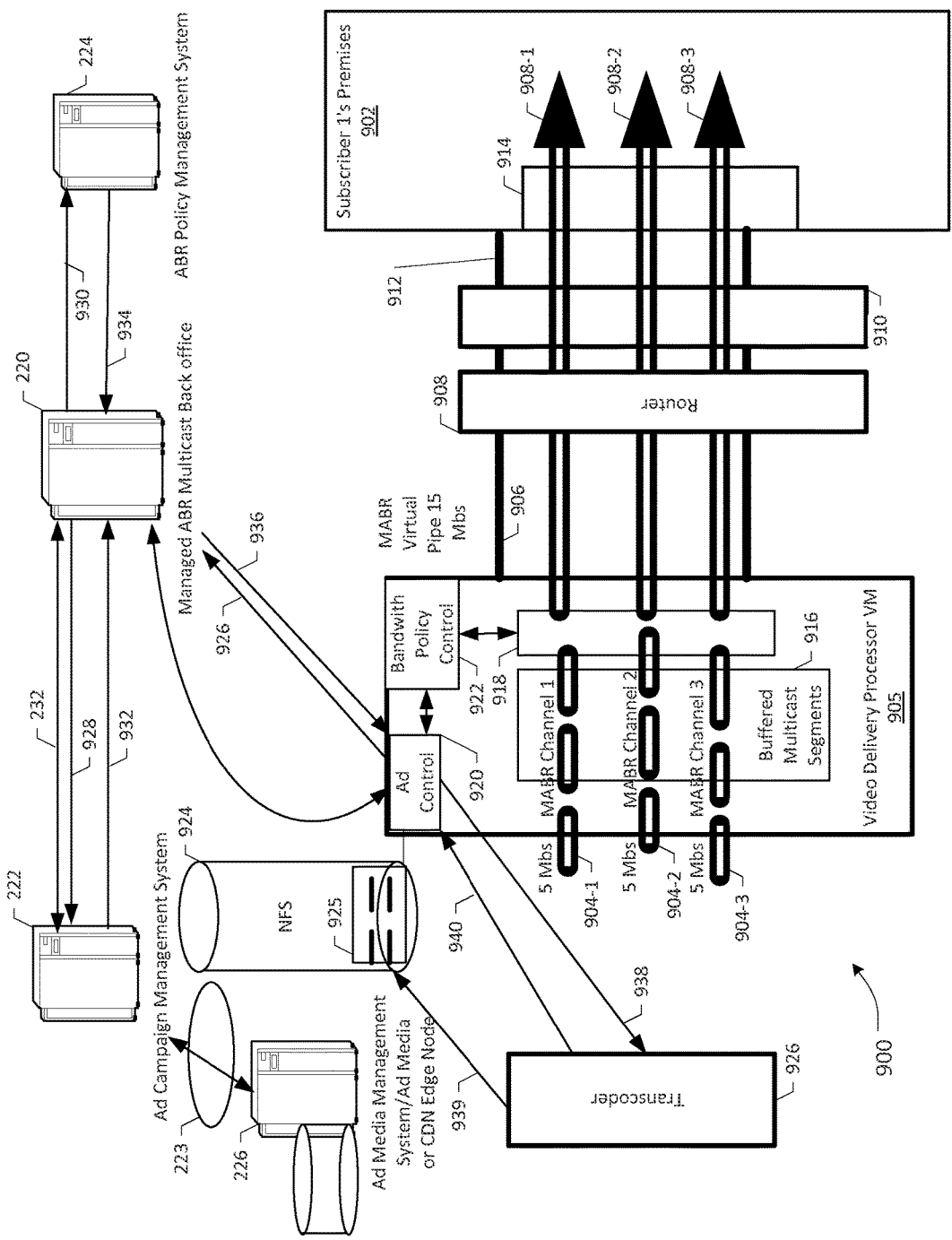
FIG. 9 depicts another rendition of an example MABR streaming network environment wherein targeted advertisements may be delivered to a subscriber premises in a network node implementation according to an embodiment of the present patent application.

FIGS. 9-14 broadly relate to various functionalities and associated structures and apparatuses that relate to a network node implementation of multicast ad delivery wherein targeted ads may be preloaded in a network-based storage system. In particular, FIG. 9 depicts an example MABR streaming network environment 900 with applicable network elements and functionalities that are upstream from a premises gateway 914 operative to serve a subscriber premises 902. It will be realized that the subscriber premises 902 is a simplified rendition of the premises 202 described hereinabove and, accordingly, will not be described in additional detail herein, except that gateway 914 is operative to receive unsegmented MABR streams that have already been appropriately muxed/combined in an upstream node 905 as will be set forth below. The unsegmented MABR streams (i.e., de-gapped MABR streams) are provided to the premises 902 via a physical pipe 912 capable of supporting certain bandwidth (e.g., 15 Mbs) with respect to the MABR channels, e.g., channels 908-1 to 908-3, effectuated by gateway 914 within the premises 902. As one skilled in the art will appreciate, appropriate access network infrastructure, e.g., routers, access multiplex nodes, etc., as exemplified by router 908 and DSLAM/CMTS node 910, is operative to support the delivery pipe from the upstream processing node 905 to the premises 902.

Advantageously, the upstream processing node 905 may be provided with ad control functionality 920 similar to the gateway ad control functionality 218 described hereinabove. Accordingly, suitable request/response and reporting interfaces may be provided between the ad control functionality 920 and the ABR multicast back office node 220 for effectuating subscriber-specific targeted ad downloads. In one example implementation, the upstream processing node 905 may be provided as a virtual machine optimized for video delivery processing, although it should be appreciated that the overall functionality may be realized in various additional or alternative hardware/software architectures and platforms. A plurality of segmented MABR streams for various channels, e.g., channels 904-1 to 904-3, each for a select bitrate representation (e.g., 5 Mbs) of a corresponding particular media/content source, may be received from MFS functionality as described above. A media segment buffer 916 is operative to store multicast segments of the respective MABR channels at different bitrates, which segments may be muxed, combined and de-gapped by a multicast ABR streamer and segment combiner 918 for generating corresponding unsegmented media streams that may be provided via a virtual pipe 906 to the downstream router 908. For example, the media segment buffer 916 may be configured to store media segments for Channel 3 904-3 at 8 Mbs, 5 Mbs, 3 Mbs, 1 Mbs and 800 Kbs. A bandwidth policy control 922 may also be provided operative with the multicast ABR streamer/combiner functionality 918 to manage the virtual pipe 906 as well as any ad download operations. Depending on destination addressing and forwarding tables, router 908 executes appropriate data forwarding logic to route the streams to the appropriate DSLAM/CMTS node 910 with respect to the premises 902

Associated with the video delivery processing (VDP) node 905 is a subscriber-specific network file storage (NFS) system 924 operative to store ad media files and associated manifests. As MABR channels for a subscriber may be provided at different representations, it becomes necessary to ensure that the ad media files are encoded at bitrates that are compatible with the bitrates of the MABR channels into which they would need to be spliced. Accordingly, one or more transcoders 926 may be provided such that suitable bitrate transcoding of ad media files may be effectuated, which are then provided to the NFS node 924 for storage. For example, ad control module 920 may generate a transcode request 938 to transcoder 926 for a particular ad source along the following structure:

Ad Media Transcode
Ad 3 source: xxx.xxx.xxx/directory/file
Bitrates 8 Mbs, 5 Mbs, 3 Mbs, 1 Mbs, 800 Kbs
2 second Stream Access Points
Destination: Subscriber 1 NFS Ad 3 directory location
Video format parameters
Audio Format parameters
Mux Format parameters Responsive thereto, transcoder 926 issues a write operation 939 to NFS 924 to store Ad 3 transcoded segments and associated manifest(s). In addition, transcoder 926 is operative to generate a response 940 to the ad control module 920 to indicate completion of the process along the following lines:

Transcode Complete:
Ad 3 Location:
<Subscriber 1 NFS Ad 3 directory location/manifest filename>

Apart from the foregoing transcoding processes, the ad control module 920 is operative to execute a subscriber-specific ad request 926 and obtain targeted ad locations via response 936 similar to the request/response processes set forth in FIG. 2. Further, similar request/response messages are mediated or otherwise propagated between the back office node 220 and ad campaign management system 222 and between the back office node 220 and ABR policy management system 224. Accordingly, it should be appreciated that requests/queries 926, 928 and 930 in FIG. 9 are analogous to requests/queries 242, 234 and 226 in FIG. 2. Likewise, responses 936, 932 and 934 in FIG. 9 are analogous to responses 228, 238 and 240 in FIG. 2. Relevant description of the various requests/responses set forth in reference to FIG. 2 above is equally applied to the requests/responses of FIG. 9, mutatis mutandis, and will not be repeated here.

Figure 10:
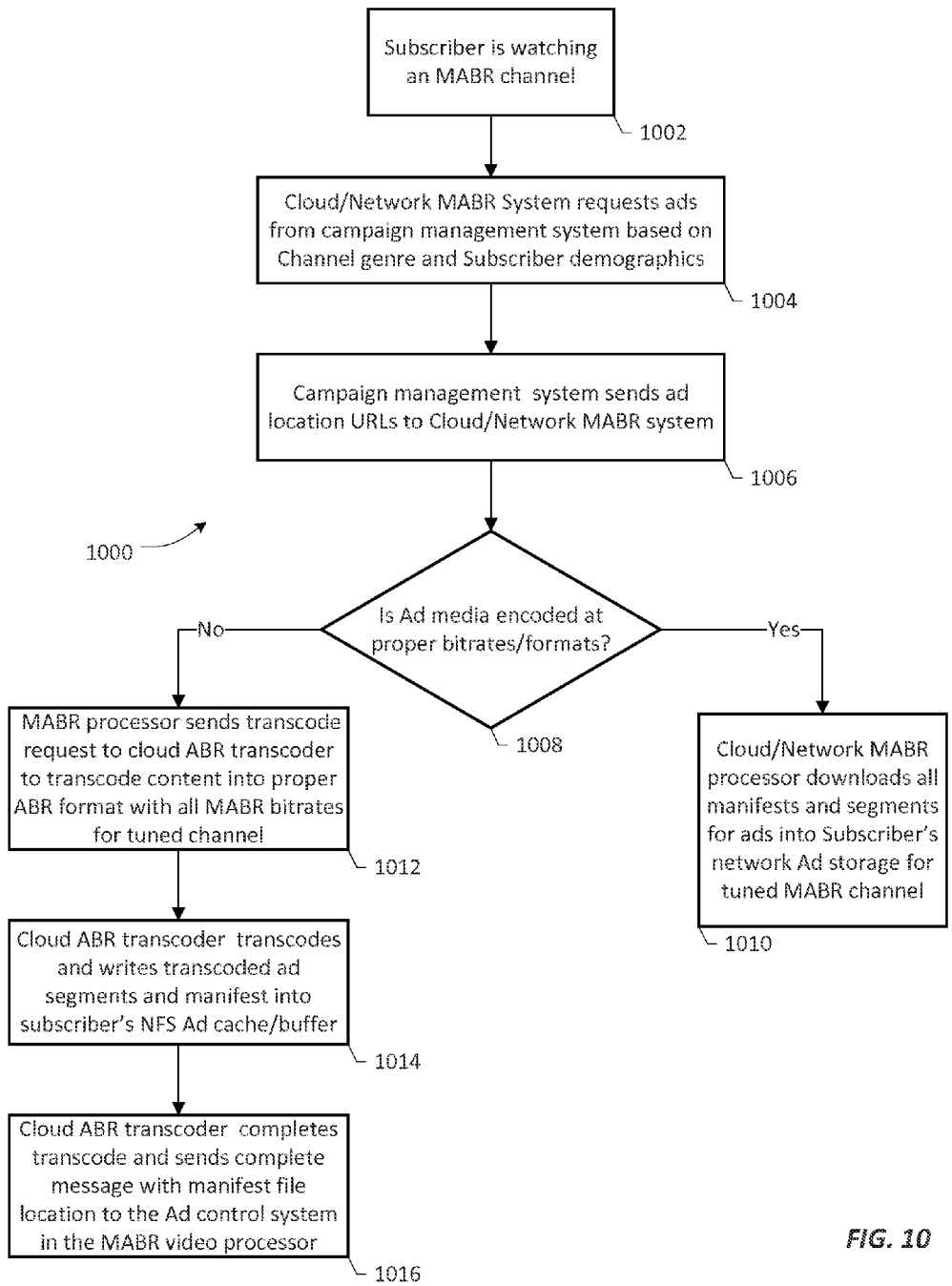
FIG. 10 depicts a flowchart of an illustrative process for downloading targeted advertisements in the network node implementation of FIG. 9.

Taking reference to FIG. 10, depicted therein is a flowchart of an illustrative process 1000 for downloading targeted advertisements in the network node implementation of FIG. 9. When the subscriber tunes to watch a particular MABR channel (block 1002), the network-node-based MABR ad control system requests ads from the campaign management system based on indicia such as channel genre and subscriber demographics (block 1004). At block 1006, the campaign management system sends targeted ad locations (e.g., URLs) to the cloud/network ad control system. A determination is made whether the ad media is encoded at proper bitrates and/or formats (e.g., compliant with the bitrate of the primary media MABR channel tuned to), as set forth at block 1008. If so, appropriate processor(s) (e.g., MABR processors) of the VDP node associated with the ad control system download all manifests and segments for the targeted ads into the subscriber's NFS with respect to the tuned MABR channel (block 1010). Otherwise, the MABR/VDP node processor sends suitable transcode requests to cloud/network transcoders to transcode ad media content into proper ABR format consistent with the all MABR bitrates of the tuned channel (block 1012). At block 1014, the cloud/network ABR transcoder transcodes and writes transcoded ad segments and manifest(s) into the subscriber's NFS ad cache/buffer. Thereafter, the cloud/network ABR transcoder issues a message to the MABRNDP node indicating that the transcode operation is complete, which message further includes the manifest file information of the stored ad segments (block 1016).

Figure 11:
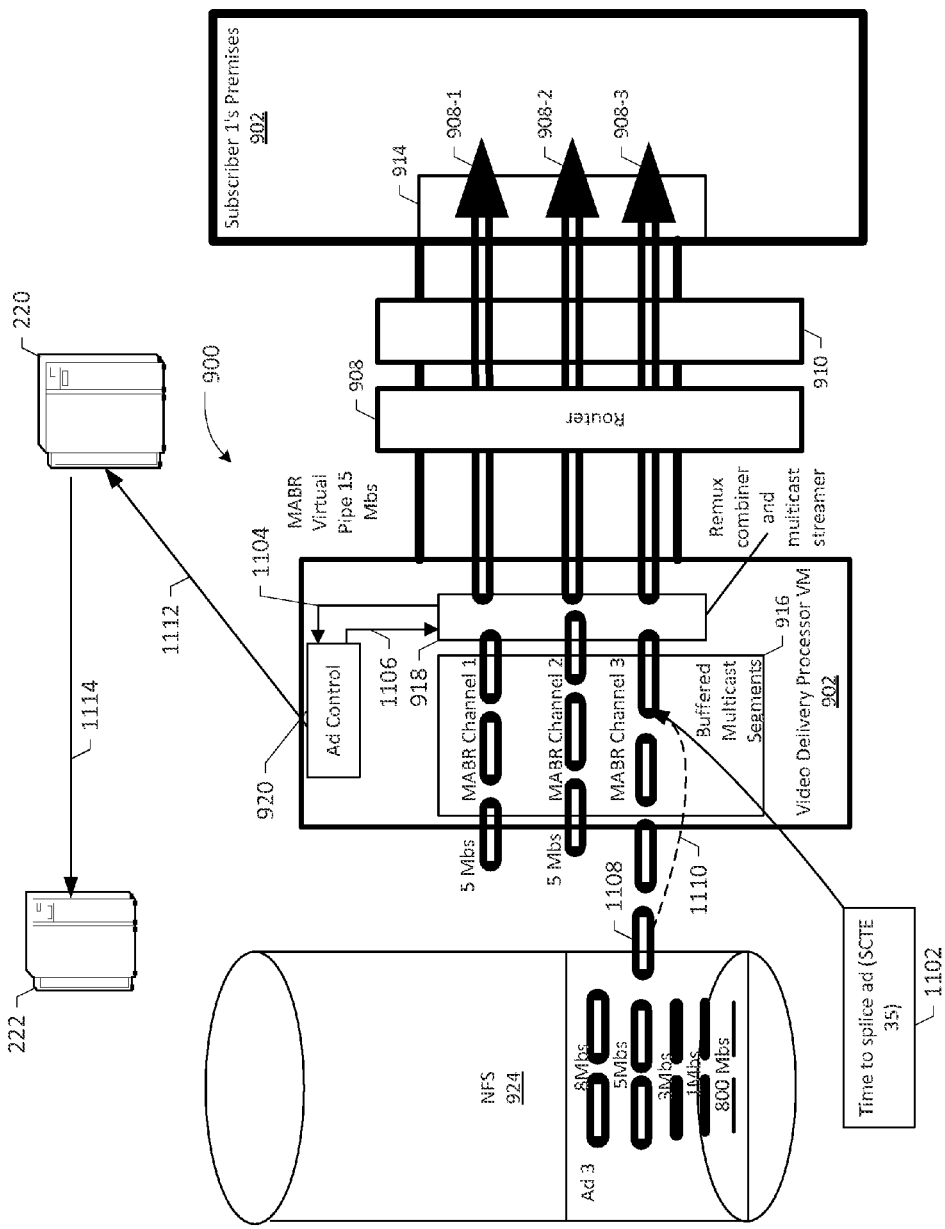
FIG. 11 depicts a portion of the MABR streaming network environment wherein the downloaded advertisements may be multiplexed within a media channel in the network node implementation of FIG. 9.
Figure 12:
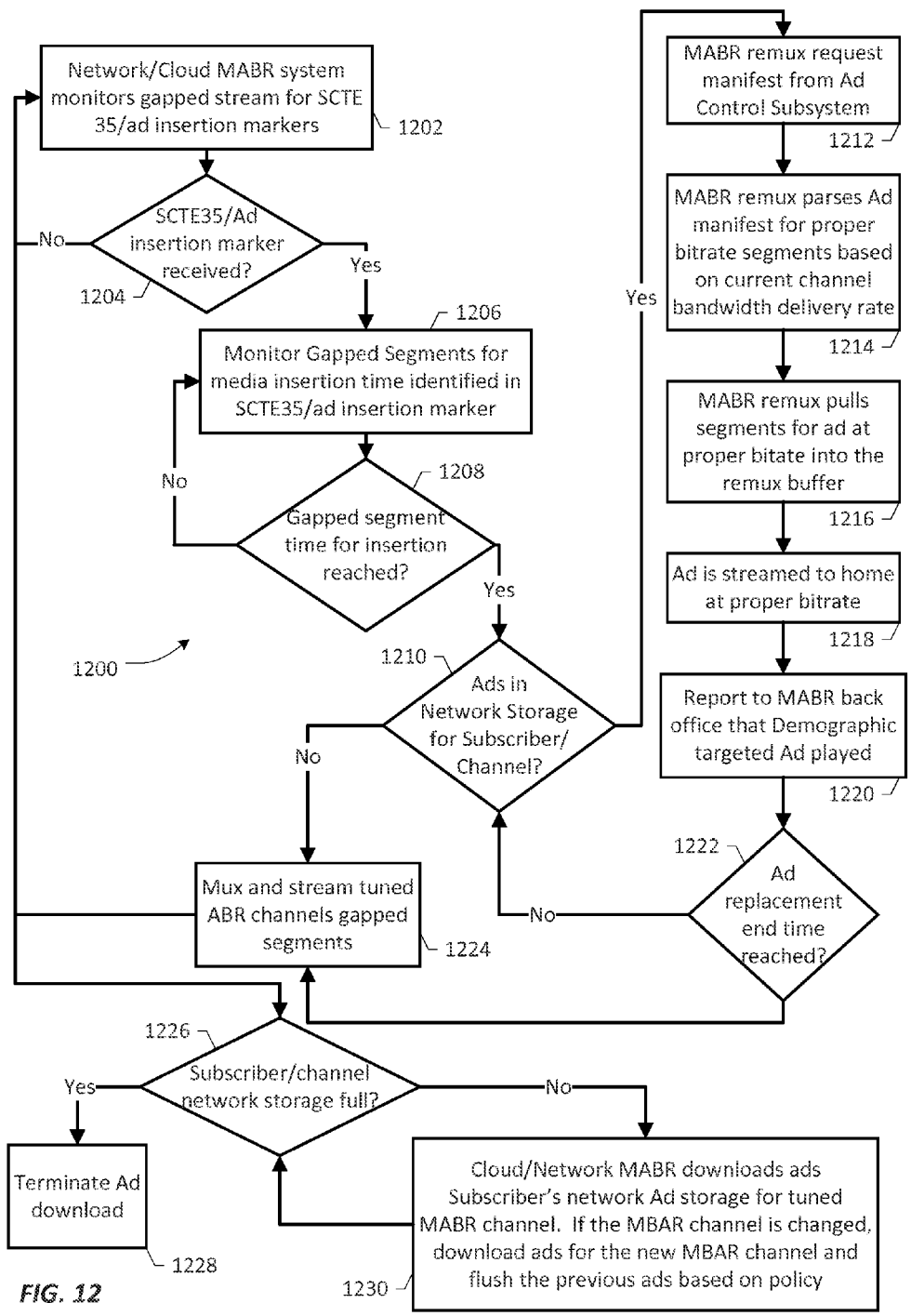
FIG. 12 depicts a flowchart of an illustrative process for delivering targeted advertisements in the network node implementation of FIG. 9.

FIG. 11 depicts another rendition of the network 900 wherein the downloaded advertisements may be multiplexed within a media channel in the network node implementation of FIG. 9. FIG. 12 depicts a flowchart of various blocks, steps and/or acts that illustrate a process 1200 for delivering targeted advertisements in the network rendition of FIG. 11. As in the case of the gateway implementation, the tuned MABR channel (e.g., Channel 3) is monitored for the ad insertion and endpoint markers, as illustrated in block 1102 of FIG. 11. In FIG. 12, steps relating to this operation are set forth at block 1202 wherein the network/cloud MABR system of VDP node 905 monitors the incoming gapped stream for ANSI/SCTE-35 markers. If the ad insertion marker is received (block 1204), the gapped stream is further monitored if the insertion time identified in the marker is reached, as set forth in an iterative loop sequence of blocks 1206 and 1208. If so, a further determination is made whether the subscriber's NFS contains ads relative to the requested media channel (block 1210). If so, a remux request by the multicast streamer/combiner 918 is made to the VDP ad control module 920 to obtain the manifest information for the identified ad media via a response, which are shown in FIG. 11 as request 1104 and response 1106. By way of example, the remux response may take on the following form:

Channel 3; Ad 3:
Location: <NFS Ad 3 directory location/manifest filename>

After obtaining the manifest (block 1212), the manifest is parsed for proper bitrate segments based on current channel bandwidth delivery rate (block 1214). Thereafter, the appropriate ad segments for Ad 3 encoded at proper bitrate are pulled into the multicast segment buffer 916 (block 1216), which is exemplified in FIG. 11 as path 1110 for pulling 5

Mbs segments for Ad 3 from NFS 924 (since the primary MABR Channel 3 is at 5 Mbs). The muxed-in ad segments are then streamed to the subscriber premises 902 (block 1218), whereupon an appropriate reporting message may be issued to the MABR back office 220 to inform that the particular targeted ad has been played (block 1220). This operation is indicated in FIG. 11 as reporting message 1112 that is eventually propagated to the ad campaign management system 222 via reporting interface 1114.

As with the ad playout process shown in FIG. 5 relative to the gateway node implementation, a number of similar steps and acts may also take place relative to the process 1200. For instance, an iterative loop sub-process may be effectuated to keep playing out one or more NFS-based ad media files (i.e., obtaining appropriate manifests, parsing them and pulling in the ad segments at proper bitrates for muxing in) until an ad replacement end time (e.g., as indicated in the SCTE-35 markers previously received) an auto return indication is reached, as exemplified by blocks 1222 and 1210. If it was determined that the NFS system for the subscriber did not contain suitable ad media files (block 1210) or if the ad replacement end time is reached (block 1222), the process continues to mux and de-gap the primary MABR channel segments for sending out as the unsegmented MABR media channel (block 1224). Also similar to the ad playout process of FIG. 5, the network-based ad playout process 1200 may take various optional paths or branches depending on a particular implementation. For example, in addition to retuning to the initial monitoring state (block 1202), another branch of the process may be executed with respect to managing and maintaining the NFS ad buffer for the subscriber. For example, a determination may be made whether the network storage is full (block 1226). If so, the targeted ad download process that may have been going on from the time the subscriber tuned to the particular MABR channel may be terminated (block 1228). Otherwise, a plurality of actions (or their combinations and/or sub-combinations) may take place such as, e.g., the cloud/network MABR ad control system continuing to download ads, transcoding them if necessary, storing the ad media and manifests in the NFS for the tuned channel. If the MABR channel has been changed, the cloud/network MABR ad control system may commence downloading targeted ads relevant to the new MABR channel. Also, optionally, any previously downloaded ads may be flushed based on a suitable ad retainment policy, as set forth at block 1230.

Figure 13:
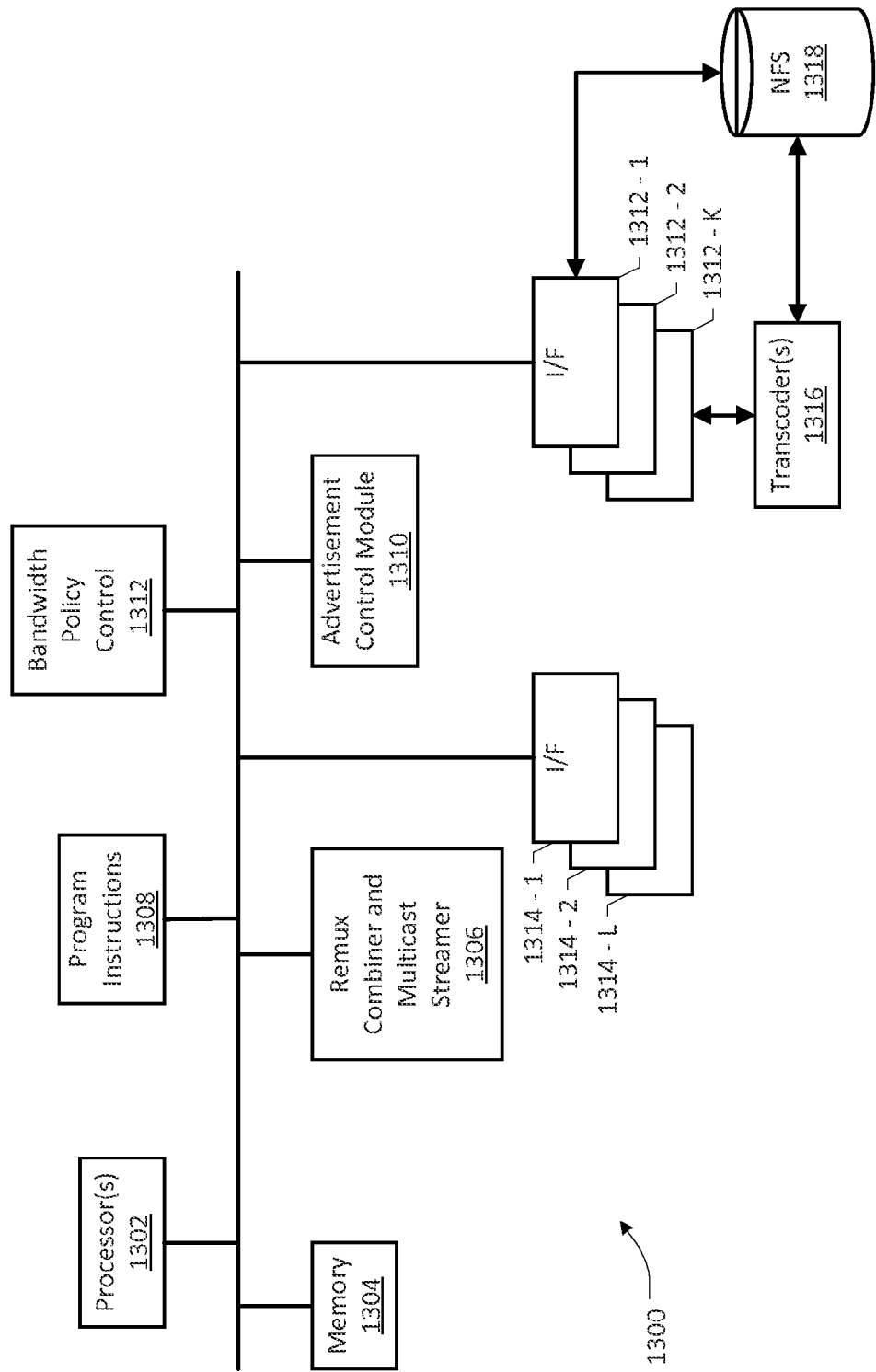
FIG. 13 depicts a block diagram of an example network node apparatus in the network node implementation of FIG. 9 according to an embodiment of the present patent application.

Turning to FIG. 13, depicted therein is a block diagram of an example network node apparatus 1300 operative as VDP node 905 in the network node implementation of FIG. 9 according to an embodiment of the present patent application. A plurality of processors 1302 may be coupled to memory 1304 and persistent memory 1308 for executing various program instructions or modules with respect to one or more processes set forth hereinabove. One or more of processors 1302 may be configured to operate as a streaming processor operative in association with other modules such as a multicast streamer/segment combiner/(re)mux module 1306 and bandwidth policy control module 1312. An ad control and management module 1310 may comprise its own dedicated hardware and/or software and may interoperate with additional program instructions 1308 to effectuate the targeted ad download functionality set forth above. Various interfaces (I/F) 1314-1 to 1314-M are representative of network interfaces that the network node apparatus may use for downstream communications (i.e., towards routers, DSLAM/CMTS nodes, and the like). Other interfaces 1312-1 to 1312-K are representative of network interfaces that the network node apparatus may use for other communications (e.g., towards other networks) including, e.g., back office communications, NFS systems 1318, cloud/network transcoders 1316, as well as other upstream communications.

It should be appreciated that the network node apparatus 1300 described above may be configured to operate not only in the network node implementation of FIG. 9 but also in one or more additional embodiments described below, suitably modified. Accordingly, at least some of the modules and blocks may be rearranged, augmented, or omitted in a particular embodiment while the program instructions stored in persistent memory 1308 may be configured or reconfigured for executing appropriate service logic relevant to the particular embodiment(s) below.

Figure 14:
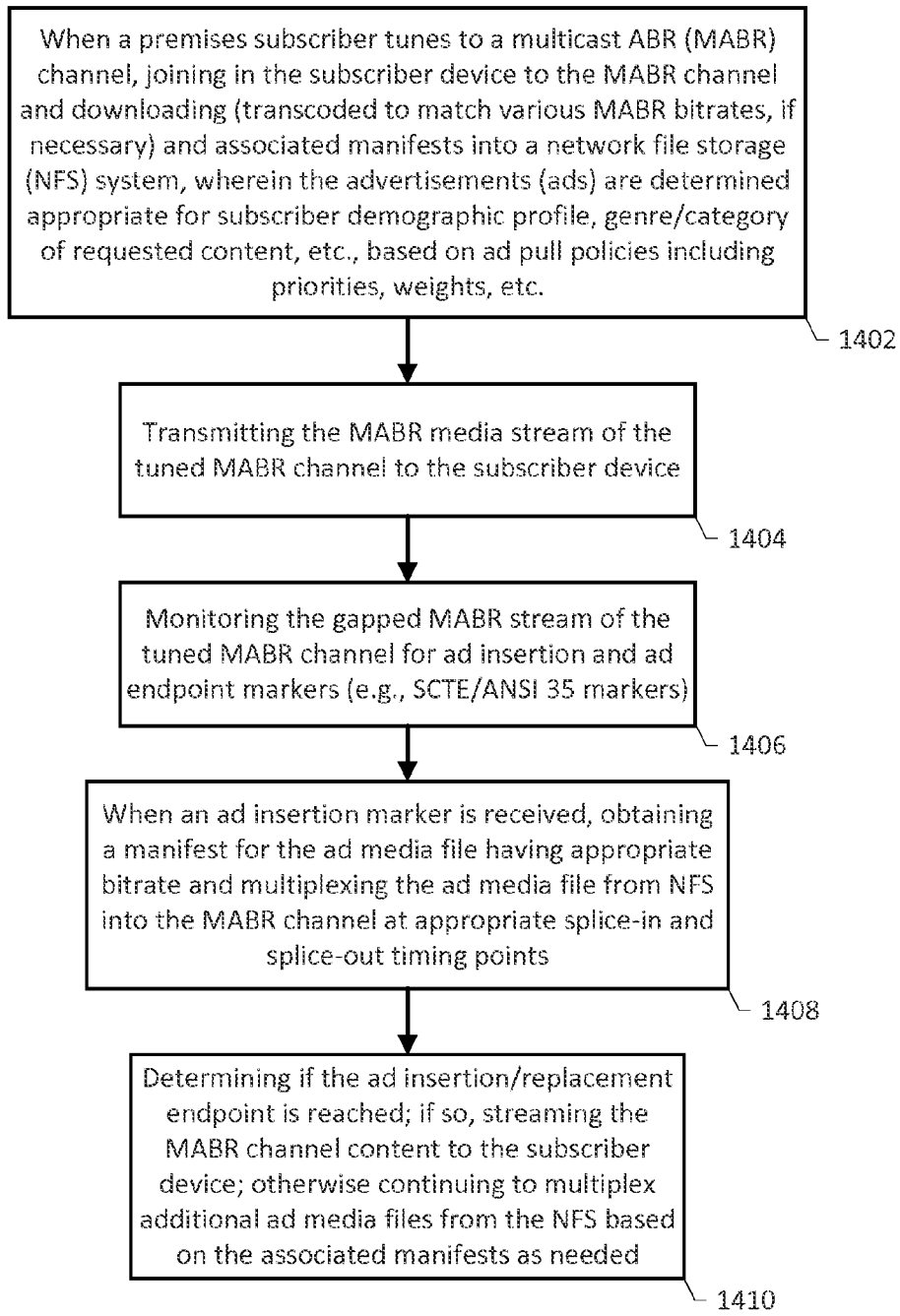
FIG. 14 depicts a flowchart of various blocks, steps and/or acts with additional detail that may be combined in one or more arrangements for delivering targeted advertisements in the network node implementation of FIG. 9 according to an embodiment of the present patent application.

FIG. 14 depicts a flowchart of various blocks, steps and/or acts with additional detail that may be combined in one or more arrangements, e.g., including any portions or substitutions thereof shown in the flowcharts of FIGS. 10 and 12, for delivering targeted advertisements in the network node implementation of FIG. 9 according to an embodiment of the present patent application. At block 1402, when a premises subscriber tunes to or otherwise engages a particular MABR channel, the subscriber device may be joined to the multicast group for the channel using suitable IGMP messaging. Thereafter, targeted advertisements and associated manifests based on various subscriber indicia as well as content-based indicia may be downloaded (with transcoding, if necessary) into a network file storage system, as described above. Further, the downloading/pulling of the ad media files may be bandwidth-managed based on ad pull policies relating to content/device priorities, weights, etc. The MABR media stream for the tuned MABR channel may be suitably de-gapped/muxed for delivery to the downstream elements for subsequent delivery to the subscriber premises as unsegmented stream in a virtual MABR delivery pipe (block 1404). The incoming gapped MABR stream of the tuned MABR channel is monitored for the scheduled avails based on ad insertion and ad endpoint markers, e.g., ANSI/SCTE 35 markers (block 1406). When an ad insertion marker timing event is reached or otherwise received, ad manifest information is obtained for the ad media file having appropriate bitrate(s). Thereafter, the ad media file from network storage is muxed into the MABR channel at an appropriate splicing time point for playout on the tuned MABR channel to the subscriber device (block 1408). A determination may be made whether an ad insertion/replacement endpoint time/indication is reached, and if so, the incoming gapped MABR segments are muxed and combined for streaming as before (block 1410). Otherwise, the process 1400 may continue to play additional ad media files from the NFS based on the associated manifests until the endpoint timing marker an auto return indication is reached, or the channel is changed, or until buffer conditions no longer afford a playout (e.g., drainage), as illustrated at block 1410.

It will be appreciated that in the foregoing embodiments of multicast ABR ad delivery, various targeted ad media files are downloaded into either local GW storage or network storage for stitching in the ad content into a primary media channel at scheduled avails. In another variation, rather than downloading and buffering the ad media, the ads may be provided in a multicast feed but are streamed to targeted subscribers only when suitable triggers (e.g., insertion/endpoint markers) are present and based on demographic profile information. In other words, multicast ad media streams may be selectively turned on or off, e.g., throttled, at an appropriate element in the network and the subscriber CPEs may be joined in to the selected ad media streams based on the targeting criteria. In such a scheme, a subscriber CPE receives an ad channel much like any MABR media channel upon leaving the primary media channel that is being watched and goes back to the primary media channel at an appropriate marker (i.e., akin to "channel switching"), which may be effectuated by issuing appropriate IGMP Join and Leave messages with respect to the tuned primary media channel and the targeted ad channel that has been triggered to stream. Depending on where the muxing/de-gapping and "channel switching" is effectuated, the foregoing scheme (which may be referred to as "targeted multicast ad switching with triggered streaming") may be realized as a gateway node implementation or as a network node implementation. FIGS. 15-24 illustrate various functionalities and associated structures and apparatuses that relate to such a scheme in one implementation, which will now be described in the following sections.

Figure 15:
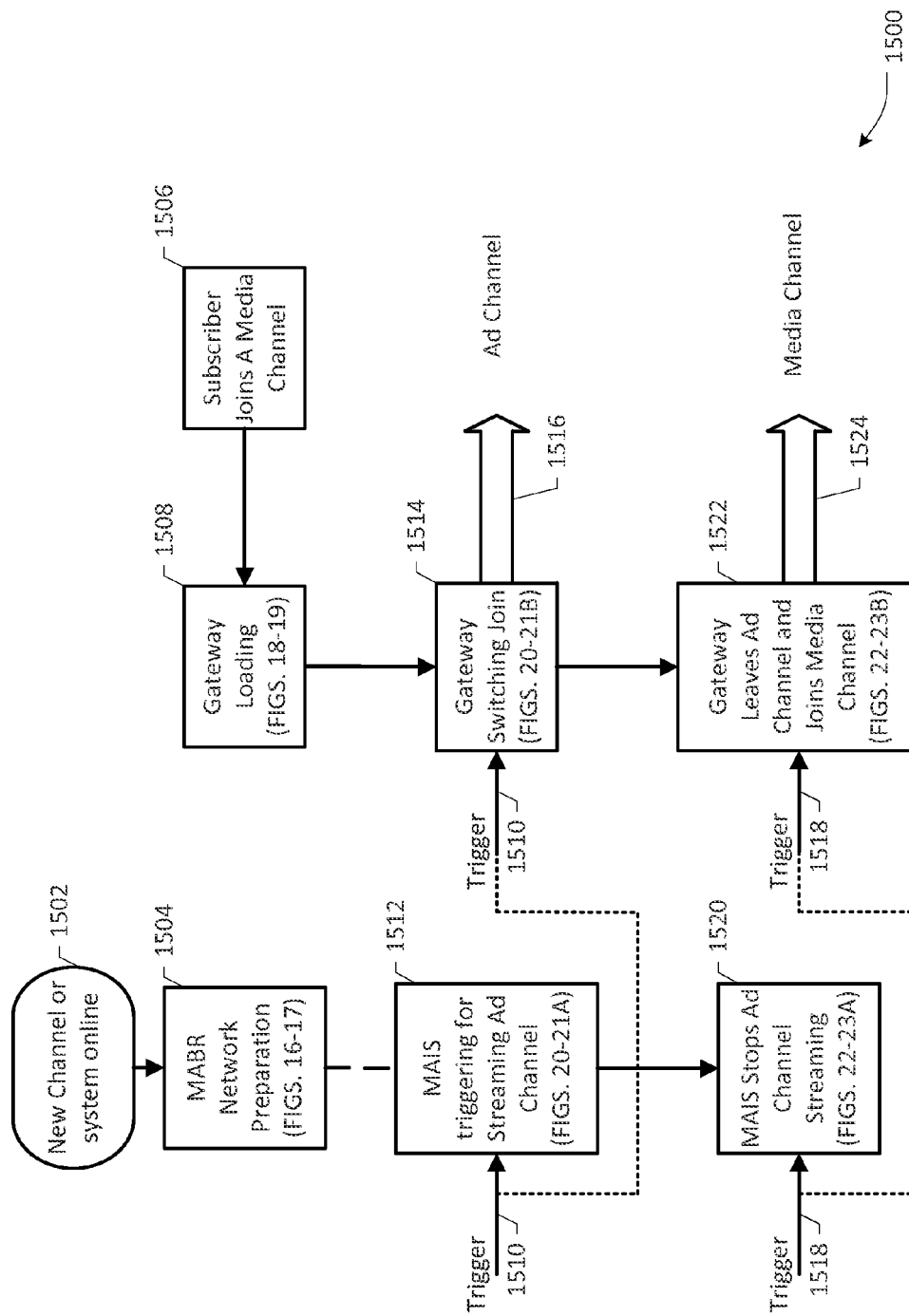
FIG. 15 depicts a scheme for delivering targeted advertisements in an MABR streaming network environment according to another embodiment wherein streaming of a targeted MABR advertisement channel is triggered by markers for switching with a MABR media channel to subscriber premises.

FIG. 15 depicts a high level representation of a scheme 1500 setting forth various blocks of activities or processes that take place in orchestrated manner in an example MABR streaming network where a gateway node may be configured to perform the muxing/de-gapping operations for purposes of streaming targeted ads to a premises. Part of the activities/processes of the scheme 1500 relate to what may be referred to as MABR network initialization or preparation 1504 that takes place before any ad channel targeting or triggered switching is done. This portion of the scheme 1500 takes place when a new channel is added or the MABR network is brought online (e.g., as set forth at block 1502) in order to initialize one or more entities or elements referred to herein as MABR ad insertion streamers (MAIS) with appropriate multicast ad channel source addresses, multicast destination addresses and applicable bitrates for ad channels. Structures and processes relating to portion 1504 will be described in detail below in particular reference to FIGS. 16 and 17. Separately, a gateway loading process 1508 may take place when a subscriber joins a media MABR channel (block 1506), wherein the gateway is provided with multicast addresses of targeted ad channels and associated bitrates for the subscriber based on subscriber demographic profile and media channel indicia. This portion 1508 of the scheme will be described below in reference to FIGS. 18 and 19. After these portions 1504 and 1508 have been executed, the MABR network is in a state ready to effectuate targeted delivery of suitable ads by turning on ad streaming by the MAIS element upon a triggering event 1510 (e.g., the occurrence of an insertion marker in the monitored MABR media channel), as set forth at block 1512. Additional details pertaining to this portion of activities will be described in reference to FIGS. 20 and 21A. The triggering event 1510 that initiates the streaming of multicast ad channels by MAIS is also propagated downstream to the gateway, which signals the operations of leaving the primary media channel and joining a targeted ad channel at an appropriate time, as set forth at block 1514. Additional details pertaining to this portion of activities are set forth below in reference to FIGS. 20 and 21B. Until another triggering event (i.e., an endpoint marker or an auto return indication) is received or otherwise reached, targeted multicast ad channel(s) 1516 are streamed to the subscriber device instead of the primary media channel. When an ad endpoint event 1518 is triggered, MAIS stops streaming the ad channels (block 1520), which will be described in detail taking reference to FIGS. 22 and 23A. Responsive to the propagated triggering event 1518, the gateway leaves the ad channel and joins the primary media channel 1524 for streaming to the subscriber, as set forth at block 1522. Activities and structures relating to this portion 1522 of the scheme will be described below in reference to FIGS. 22 and 23B.

Figure 16:
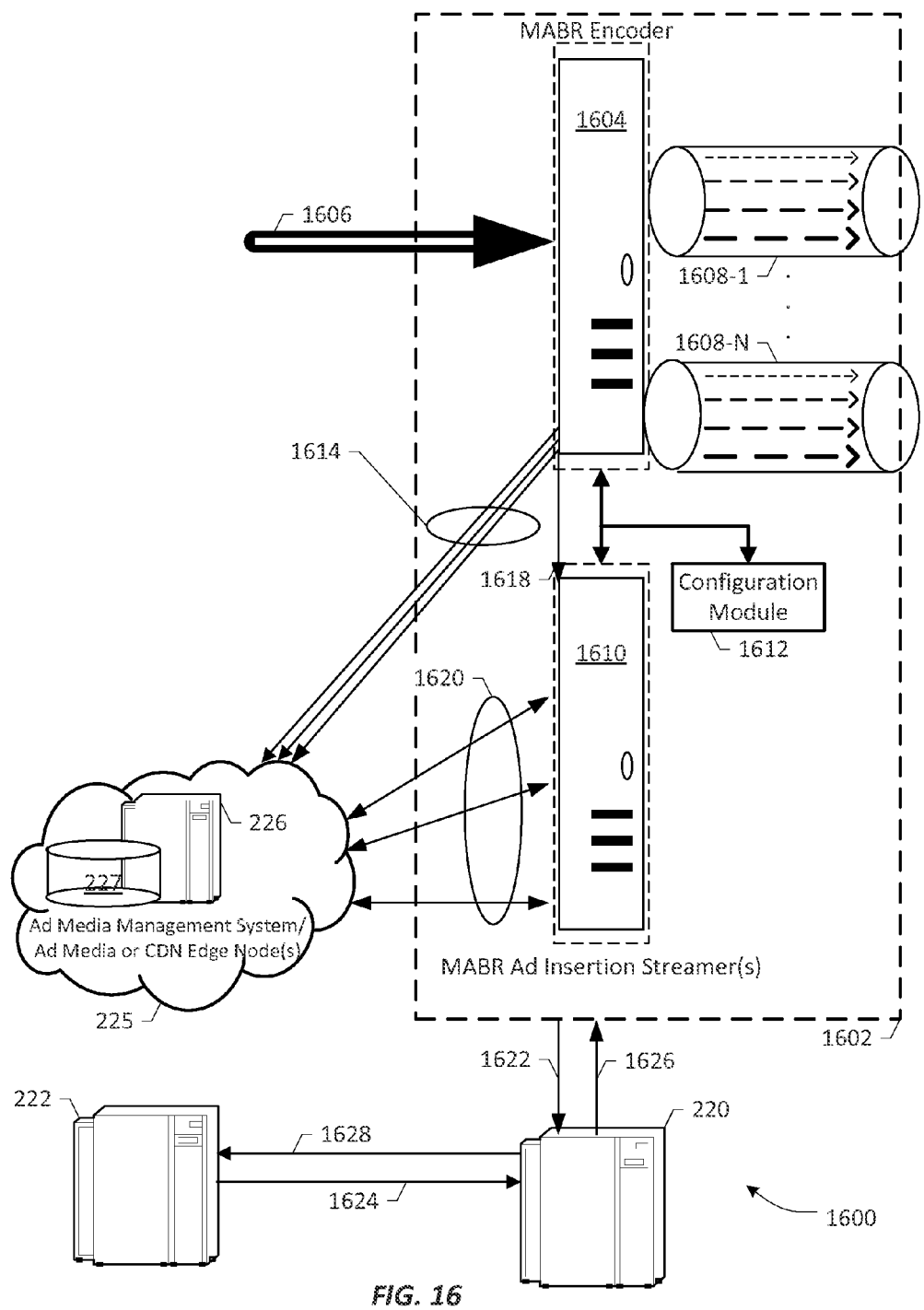
FIG. 16 depicts a network portion for facilitating initialization of the MABR streaming network environment for providing targeted MABR advertisement channels in the scheme of FIG. 15 according to an embodiment.

Turning to FIG. 16, depicted therein is a network portion 1600 for facilitating initialization of example MABR streaming network environment for providing targeted MABR advertisement channels in the scheme of FIG. 15 according to an embodiment. A network-based apparatus 1602, which may be implemented as one or more network nodes or elements, either co-located or distributed, includes one or more MABR encoders 1604 operative to receive incoming unsegmented media streams from a plurality of media/content sources, as exemplified by media stream 1606. In one arrangement, MABR encoder(s) 1604 may be configured as an MFS functionality for generating pluralities of segmented MABR representations encoded at different bitrates, each plurality corresponding to an incoming unsegmented media stream. Accordingly, it will be appreciated that MABR encoder 1604 may be implemented using the apparatus 2800 described in detail hereinabove for generating gapped MABR media channels with respect to the incoming media streams 1606. Reference numerals 1608-1 to 1608-N refer to illustrative pluralities of such gapped MABR channels across multiple bitrates, wherein an example plurality may comprise representations at 1 Mbs, 2 Mbs, 3 Mbs, 5 Mbs and 6 Mbs, etc. which may be illustratively represented as segmented arrows of varying thicknesses (somewhat akin to the stream or channel representations shown in the drawing Figures discussed previously).

Apparatus 1602 also includes one or more MABR ad insertion streamer (MAIS) elements 1610 coupled to MABR encoder 1604 via an interface 1618 operative to communicate the occurrence of ad insertion markers and ad endpoint markers in an incoming media stream such as, e.g., stream 1606. Advantageously, both MABR encoder 1604 and MAIS 1610 are provided with appropriate interfaces 1614, 1620, respectively, with a plurality of ad media management systems and/or CDN edge nodes, illustratively shown as servers 226 and databases 227 comprising the ad media collective 225 as previously described. In one implementation, an MABR ad streamer may be provided for each media channel for turning on or off ad streams relevant for that media channel. In another variation, an MABR ad streamer may be configured for a group of related media channels, e.g., same genre, etc., or in some other fashion. One skilled in the art shall recognize upon reference hereto that a number of alternative or additional variations in the organization of MAIS elements 1610 may be provided.

Further, each MAIS 1610 is also provided with suitable request/response interfaces 1622/1626 with the MABR back office 220 that in turn is coupled to the ad campaign management system 222 for appropriate request/response interactions 1628/1624. A configuration module 1612 having suitable hardware/software may be provided as part of the apparatus 1602 for facilitating an initialization process when a new media channel is brought up or when the MABR system is (re)configured (e.g., upon power-up). In effect, when an event requiring initialization is detected, MAIS element 1610 is triggered or otherwise activated to interface with the MABR back office node 220 and associated ad media campaign management system 222 to identify all applicable ad channels relevant to the new media channel, for example. Responsive thereto, MAIS 1610 is provided with a plurality of multicast addresses, multicast destination addresses and bitrates for the identified ad channels.

Figure 17:
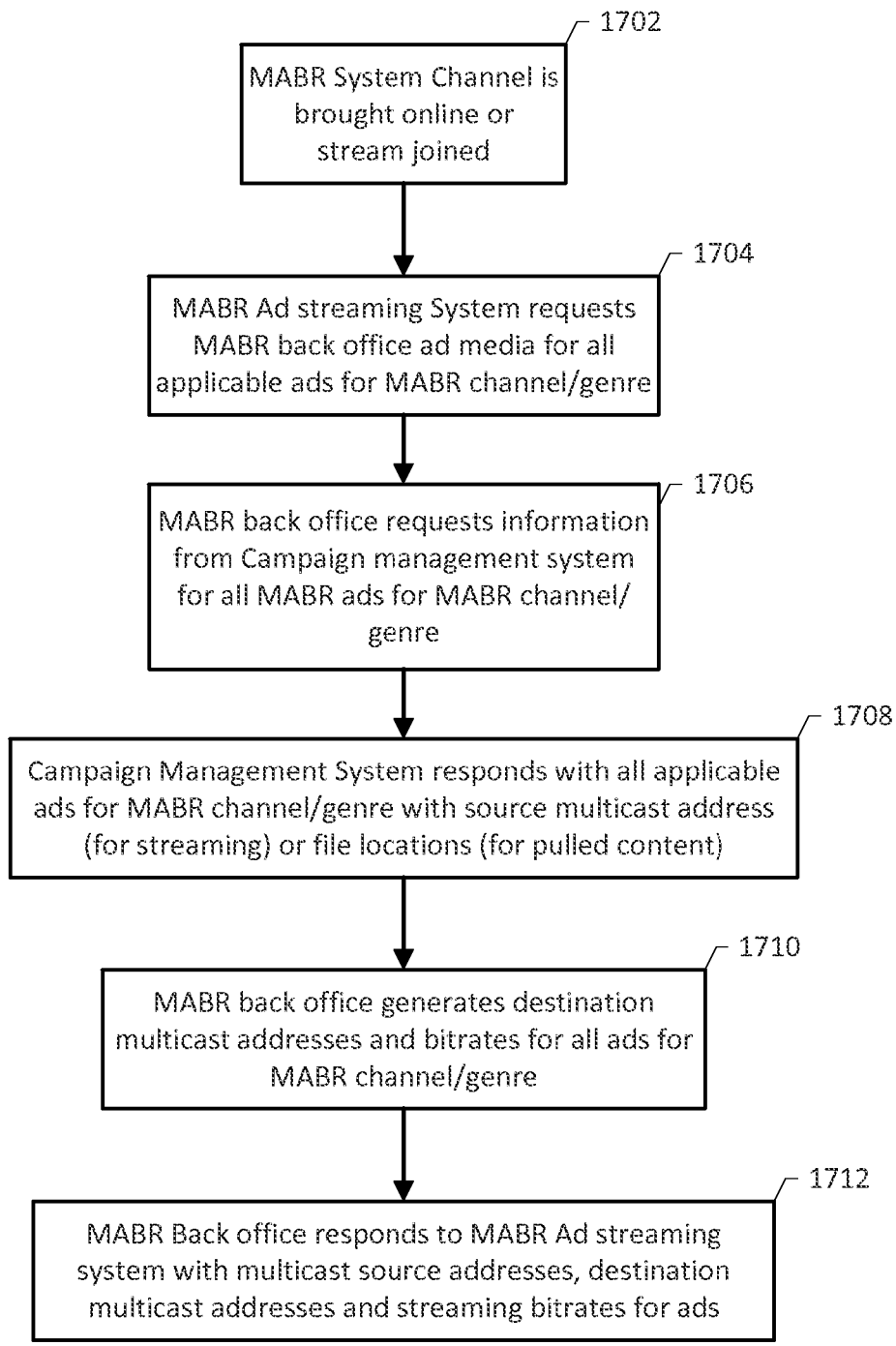
FIG. 17 depicts a flowchart of an initialization process relative to the network portion shown in FIG. 16 according to an embodiment.

FIG. 17 depicts a flowchart of various blocks, steps and/or acts in additional detail that may be combined in one or more embodiments for effectuating an initialization process 1700 relative to the network portion 1600 described above. At block 1702, a new media channel for the MABR system is brought online or the stream is joined. At block 1704, MAIS requests the MABR back office the ad media for all applicable ads with respect to the MABR channel's genre. By way of illustration, a request (e.g., request 1622) may take on the form:

Request Ad media
<Channel Genre: Kids>

Responsive thereto, the MABR back office requests (e.g., request 1628) ads from the ad campaign management system for all multicast ads pertinent to the MABR channel (block 1706), which may be similar in format to one shown above. In turn, the ad campaign management system responds (e.g., response 1624) with all applicable ads for the MABR media channel having various pieces of source addresses information (block 1708), as exemplified below:

---
Ad Media Response <Genre: Kids>
Ad 1 location
Src: (multicast address or file location)
.
.
.
Ad n location
Src: (multicast address or file location)

--- wherein source addresses may comprise multicast addresses for streaming ad content or file locations for pulled content. Thereafter, the MABR back office generates appropriate destination multicast addresses and bitrates for all ads with respect to the MABR channel/genre added (block 1710), which may be provided to the MAIS element via a response (e.g., response 1626) that includes both multicast source addresses, destination multicast addresses and streaming bitrates (block 1712), as exemplified below:

---
Ad Media Response <Genre: Kids>
Ad 1 location
Src: (multicast address or file location)
Dest: multicast:
6Mbs 227.4.1.1:5001, 4Mbs 227.4.1.2:5002,...800Kbs 227.4.1.8:5008
Ad 2 location multicast:
6Mbs 227.4.2.1:5001, 4Mbs 227.4.2.2:5002,...800Kbs 227.4.2.8:5008
.
.
Ad n location
Src: (multicast address or file location)
Dest: multicast:
6Mbsxxx.xxx.xxx.xxx:xxxx,
4Mbs xxx.xxx.xxx.xxx,...
800Kbs xxx.xxx.xxx.xxx:xxxx

---

Figure 18:
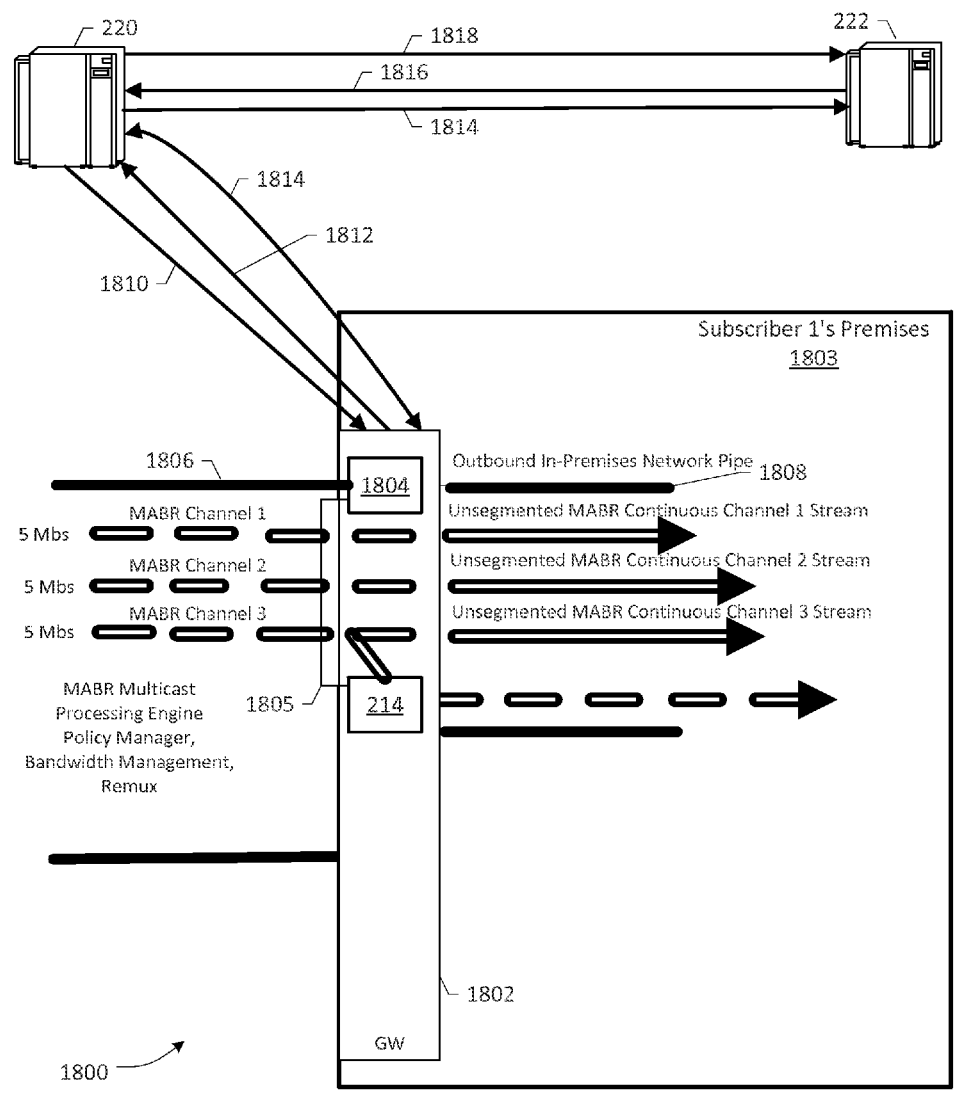
FIG. 18 depicts a gateway portion of the MABR streaming network environment configured for loading targeted multicast ABR advertisement channel information in the scheme of FIG. 15.

It should be appreciated that the source addresses above are unique multicast addresses of ports that may be accessed using suitable IGMP messages. Turning to FIG. 18, shown therein is a gateway portion 1800 of the MABR streaming network environment configured for loading targeted multicast ABR advertisement channel information in the scheme of FIG. 15. A premises gateway 1802 is operative to manage an incoming delivery pipe 1806 (e.g., 20 Mbs) with respect to subscriber premises 1803 for providing an outbound pipe 1808 (i.e., into premises 1803) pipe with respect to a plurality of CPE devices therein, similar to the subscriber premises arrangement 202 shown in FIG. 2, although a rather simplified arrangement is illustrated herein. An MABR multicast processing engine (MMPE), policy management, bandwidth control/management and remux/combiner functionality, collectively shown at block 1805 is included in GW 1802 for de-gapping and muxing incoming segmented MABR media channels (e.g., Channel 1 to 3) that may have been generated by an upstream MFS functionality (e.g., apparatus 1602 shown in FIG. 16). Corresponding plurality of unsegmented (i.e., de-gapped) MABR media channels may be provided to the premises devices as before. GW 1802 may also include an HTTP server (e.g., server 214) for facilitating a best-effort, progressive ABR download path with a progressive ABR download client that may share content from a multicast media channel (e.g., MABR Channel 3).

Advantageously, GW 1802 is further provided with a multicast ad control module 1804 operative to effectuate suitable request/response interactions or messages 1812/1810 with the MABR back office 220 for obtaining channel-based and demographic-based ad location information. A reporting interface 1814 therebetween may be effectuated for purposes of reporting completion of ad playout(s) to the back office 220. As before, loading requests to the back office 220 are propagated to the ad campaign management system 222, which responds accordingly, as illustrated by request/response interaction paths 1814/1816. A reporting interface 1818 therebetween may also be effectuated for purposes of propagating ad playout completion reports.

Figure 19:
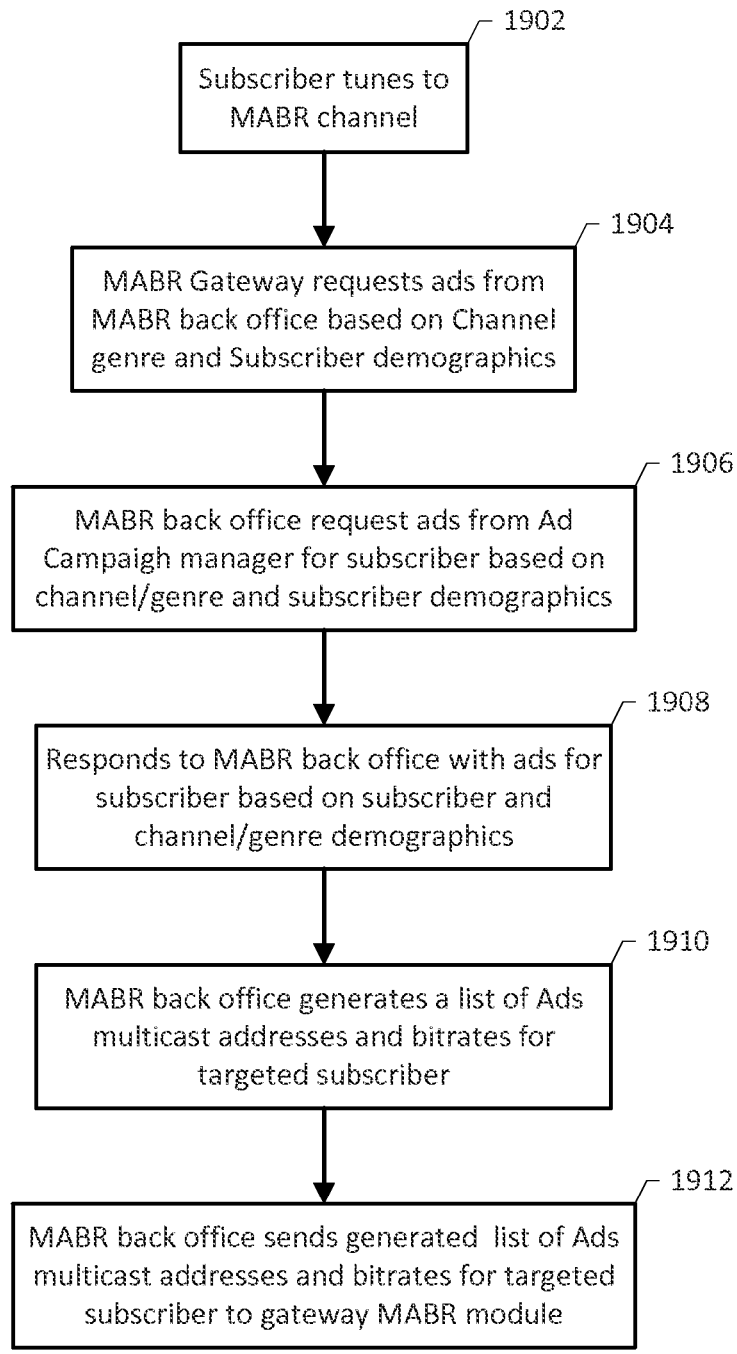
FIG. 19 depicts a flowchart of a loading process relative to the gateway portion shown in FIG. 18 according to an embodiment.

FIG. 19 depicts a flowchart of various blocks, steps and/or acts in additional detail that may be combined in one or more embodiments for effectuating a loading process 1900 relative to the GW portion 1800 set forth above. When a subscriber tunes to a particular MABR channel (block 1902), the GW/ad control system module 1804 is operative to request ads from the MABR back office 220 (e.g., via request 1812) based on the channel genre and subscriber demographic indicia (block 1904), in an example form as illustrated below:

Ad Demographic Request
Subscriber 1<Content: Kids>

In response, the MABR back office 220 generates or otherwise propagates a corresponding request (e.g., request 1814) to the ad campaign management system 222, as set forth at block 1906, which may take on a form similar to the one shown above. The ad campaign management system 222 responds (e.g., response 1816) to the MABR back office 220 with ads for the subscriber based on the demographic and channel/genre data (block 1908), which may take on the following form:

Ad Media Response
Subscriber 1
Ad 1, Ad 2, Ad 3, Ad 4, Ad 5, Ad 6, Ad 7, Ad 8

Responsive thereto, the MABR back office 220 generates a list of ads, multicast addresses and applicable streaming bitrates for the targeted subscriber (block 1910), which are transmitted to the GW/ad control module 1804 in a response (block 1912), e.g., as response 1810 having a form:

---
Ad Media Response
Subscriber 1 <Content: Kids>
Ad 1 location multicast:
6Mbs 227.4.1.1:5001, 4Mbs 227.4.1.2:5002,...800Kbs 227.4.1.8:5008
Ad 2 location multicast:
6Mbs 227.4.2.1:5001, 4Mbs 227.4.2.2:5002,...800Kbs 227.4.2.8:5008
.
.
Ad 8 location multicast:
6Mbs 227.4.8.1:5001, 4Mbs 227.4.8.2:5002,...800Kbs 227.4.8.8:5008

---

Figure 20:
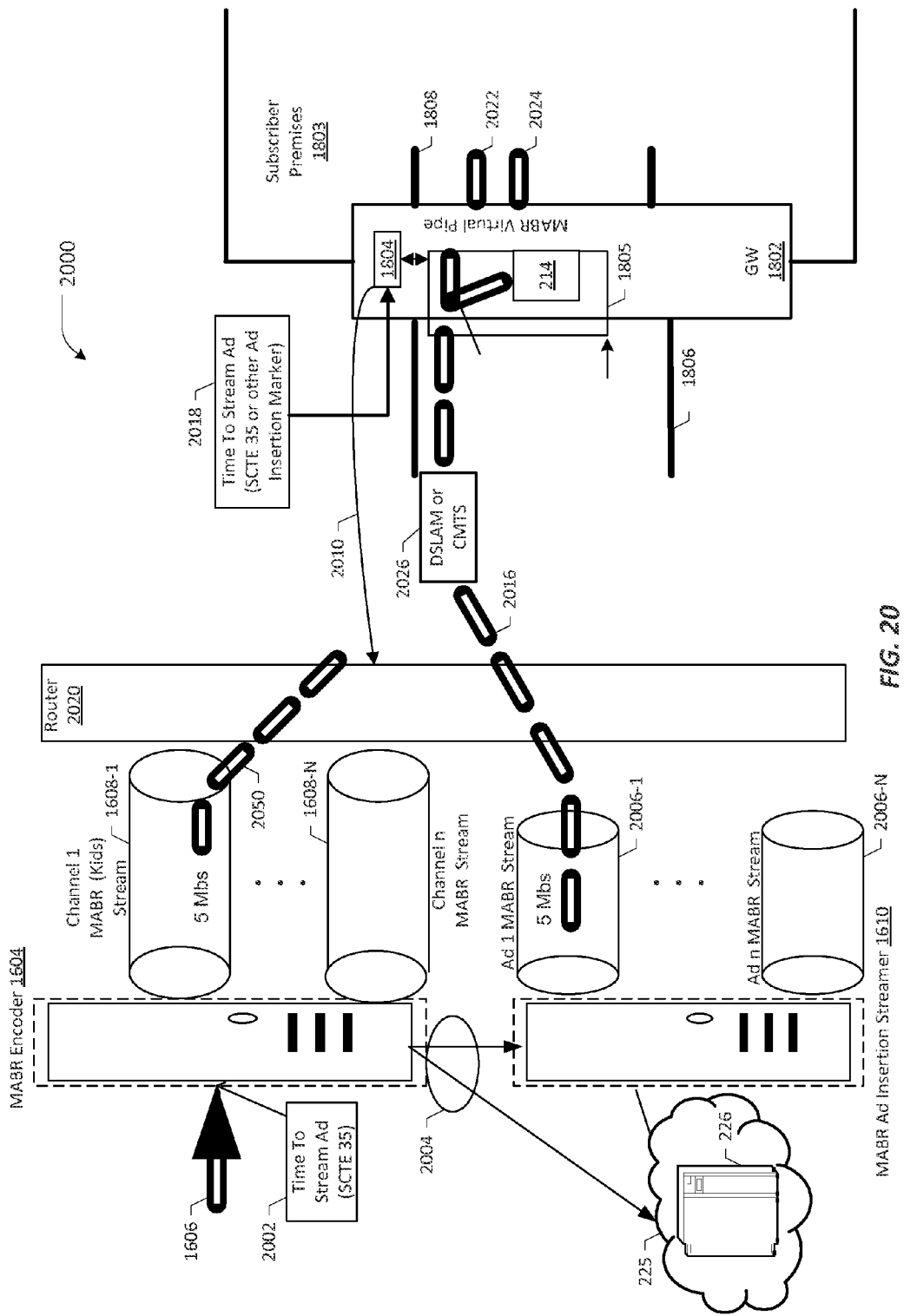
FIG. 20 depicts another rendition of an example MABR streaming network environment configured for effectuating certain aspects of the scheme of FIG. 15 for joining a multicast ABR advertisement channel according to an embodiment.

Turning to FIG. 20, depicted therein is an expanded arrangement 2000 that includes the network side and gateway portions of the example MABR streaming network environment shown in FIGS. 16 and 18, configured for effectuating triggered ad streaming and channel switching aspects (blocks 1512 and 1514) of the scheme of FIG. 15 for joining a multicast ABR advertisement channel according to an embodiment. As previously explained, multicast ad streams may be provided as segmented ABR streams wherein the ad content may be encoded at different bitrates (akin to the primary media service channels), whose streaming can be "gated" by MAIS 1610. In FIG. 20, reference numerals 2006-1 to 2006-N refer to a plurality of MABR ad stream pipes, each containing multiple representations of the content of a particular ad channel, wherein the ad streams are specific for an MABR media channel 1606 and its genre. The incoming stream of the MABR media channel 1606 may be monitored for appropriate markers, e.g., SCTE-35 2002, which are passed to the MAIS system 1610 via interface 2004. Responsive thereto, the MAIS system 1610 pulls ad files (e.g., Ad-1 to Ad-n) or joins source multicast addresses of Ad-1 to Ad-n. The ads may be transcoded and/or encoded at applicable bitrates consistent with the bitrate of the particular MABR media channel, e.g., as illustrated by reference numeral 2050 at 5 Mbs, with the content genre being <Kids>, for example. With respect to the applicable ad channels Ad-1 to Ad-n for this media channel/genre, the MABR Ad-1 pipe 2006-1 may contain representations at 6 Mbs at source <227.4.1.1:5001>, 4 Mbs at source <227.4.1.2:5002>, . . . , 800 Kbs at source <227.4.1.8:5008>, and the like. In similar fashion, the MABR Ad-n pipe 2006-N may contain representations 6 Mbs at source <xxx.xxx.xxx.xxx:xxxx>, 4 Mbs at source <xxx.xxx.xxx.xxx>, . . . , 800 Kbs at source <xxx.xxx.xxx.xxx:xxxx>, where sources <xxx.xxx.xxx.xxx:xxxx> are unique multicast addresses of the ports.

As pointed out earlier, the insertion markers in the incoming stream 1606 are also propagated to GW 1802 via appropriate intermediary network elements, e.g., router 2020 and DSLAM/CMTS 2026. In FIG. 20, receipt/detection of the insertion markers at the GW/ad control module 1804 is illustrated at block 2018. It should be noted at this point that the GW has already downloaded applicable streaming ad location information that is specific to the subscriber and media channel/genre via response 1810 described above. Based on this information and the received insertion marker information, the MABR processing engine 1805 performs one or more IGMP interactions, illustratively via an IGMP path 2010 to router 2020, to effect a switching from the primary media channel to a specific ad channel, e.g., an IGMP Leave from Channel 1 MABR <Kids> stream 2050 and IGMP Join to an ad stream representation at the identified source, e.g., encoded at 5 Mbs having the source address <227.4.1.2:5002>, as illustrated by stream 2016.

Figure 21A:
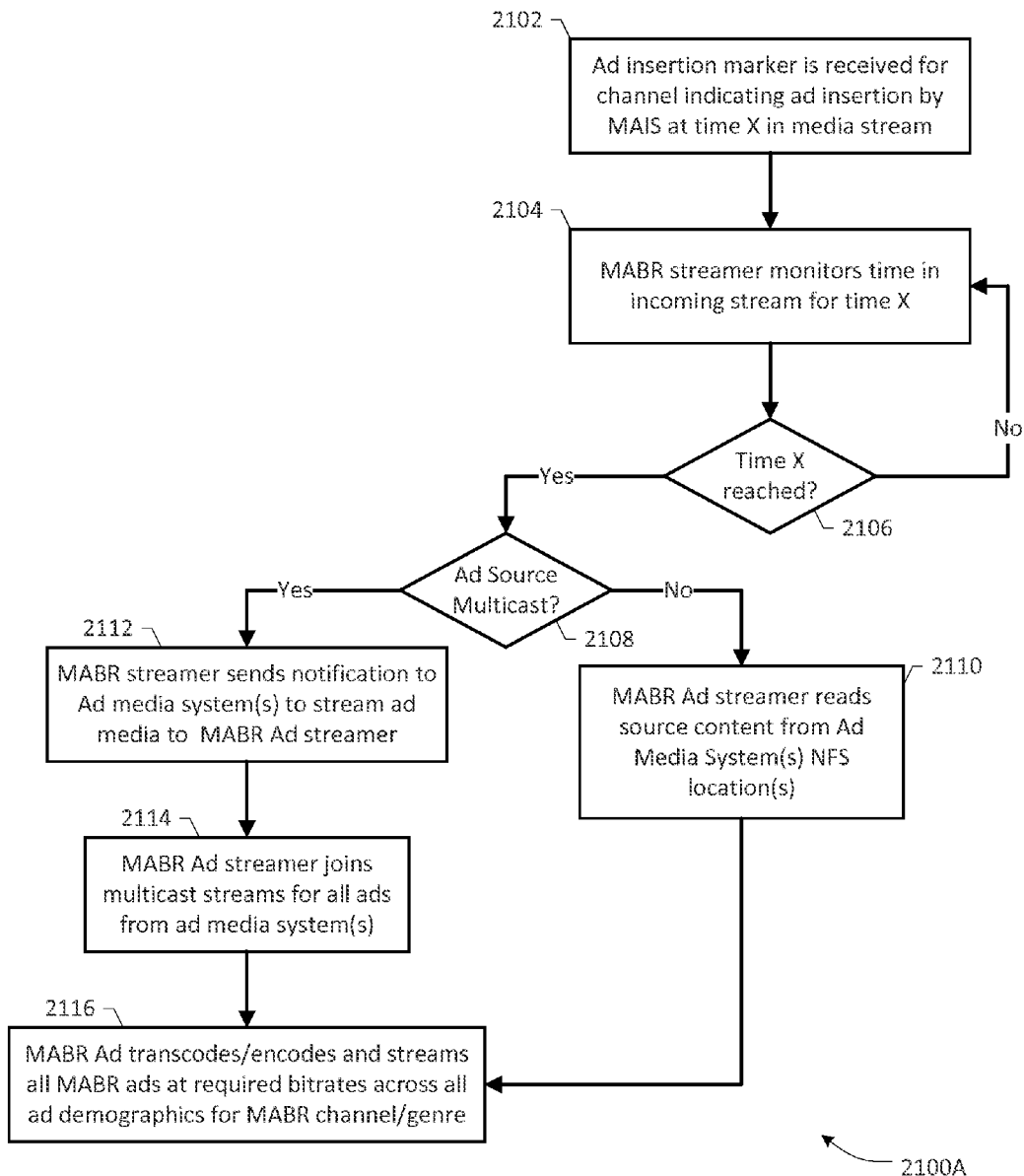
FIG. 21A depicts a flowchart of a triggering process at the network portion of FIG. 20 with respect to MABR advertisement channel streaming in accordance with the scheme of FIG. 15.

FIG. 21A depicts a flowchart of various blocks, steps and/or acts in additional detail that may be combined in one or more embodiments for effectuating an MAIS-triggered process 2100A at the network portion of FIG. 20 with respect to MABR advertisement channel streaming in accordance with the scheme of FIG. 15. At block 2102, an ad insertion marker is received by the MAIS for the monitored primary media channel, wherein the marker is operative to indicate inserting of a secondary media channel (e.g., an ad channel) at a future time. MAIS or associated MABR system monitors time relative to the incoming stream's time to determine if the indicated time (e.g., at time X) is reached (blocks 2104 and 2106). If so, a further determination is made whether ad sources relevant to the primary media channel/genre are multicast or not (block 2108). If an ad source is not a multicast ad source, MAIS reads the source content from a network file storage location of the ad media management system 225, which may be repeated for other non-multicast ad sources (block 2110). If the ad sources are multicast sources, MAIS sends one or more notifications to the associated ad media management systems 225 to start streaming ad media (block 2112). MAIS then joins multicast streams for all ads from the ad media management systems (block 2114), upon which it transcodes and/or encodes the multicast ad streams at required bitrates and streams all MABR ad channels across all subscribers for that particular MABR media channel/genre (block 2116).

Figure 21B:
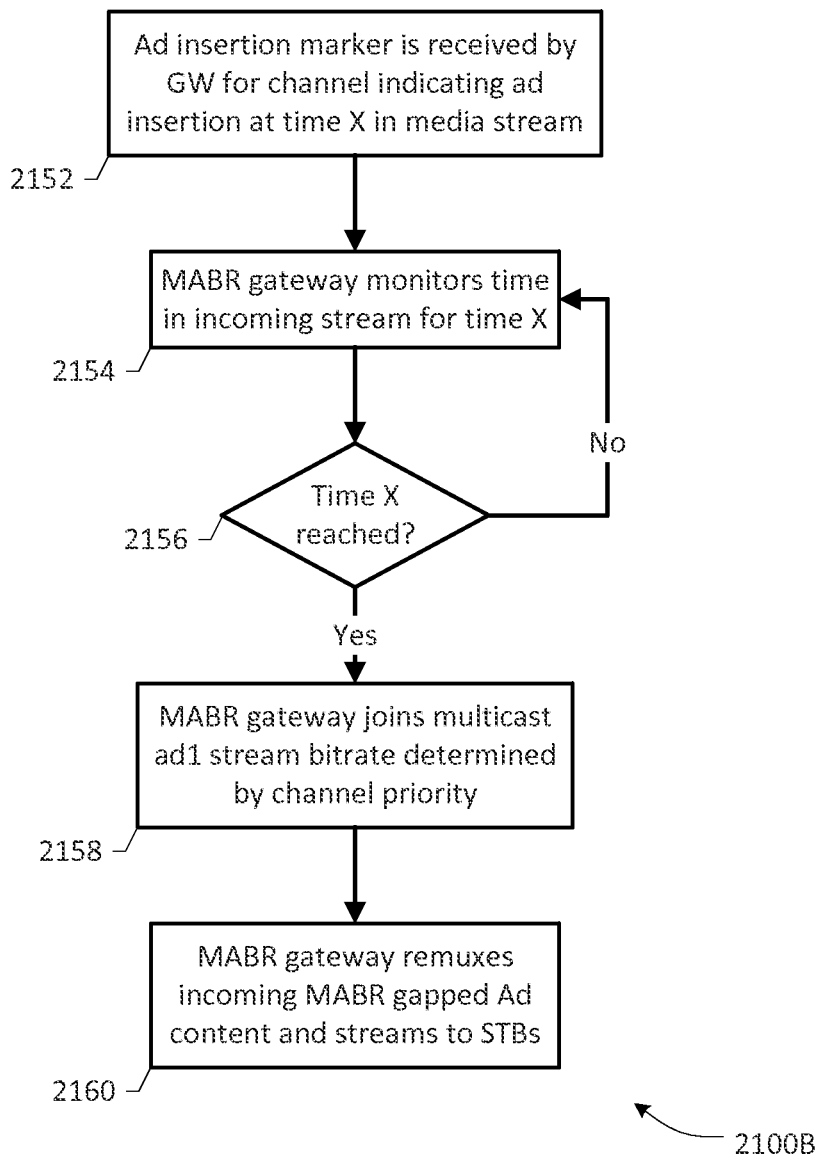
FIG. 21B depicts a flowchart of a join process at the gateway portion of FIG. 20 with respect to MABR advertisement channel streaming in accordance with the scheme of FIG. 15.

FIG. 21B depicts a flowchart of various blocks, steps and/or acts in additional detail that may be combined in one or more embodiments for effectuating a join process 2100B at the gateway portion of FIG. 20 in accordance with the scheme of FIG. 15. At block 2152, an ad insertion marker is received by premises GW 1802 (also referred to as MABR GW system) indicating ad insertion at a future time with respect to the primary media stream. MABR GW monitors time relative to the incoming stream's time to determine if the indicated time (e.g., at time X) is reached (blocks 2154 and 2156). If so, the gateway joins the multicast ad stream of a particular representation determined by channel priority (block 2158). As noted previously, this process involves issuing appropriate IGMP Leave (to leave the tuned MABR media channel) and Join (to join to the correct ad channel determined based on the subscriber demographics). As the segmented content stream for the joined ad channel is received, the MABR multicast processing engine functionality 1805 of GW 1802 remuxes and de-gaps the content for streaming as unsegmented content to the CPEs (block 2160), which may be shared with a progressive ABR download client, as illustrated by communication paths 2022 and 2024 in FIG. 20.

Figure 22:
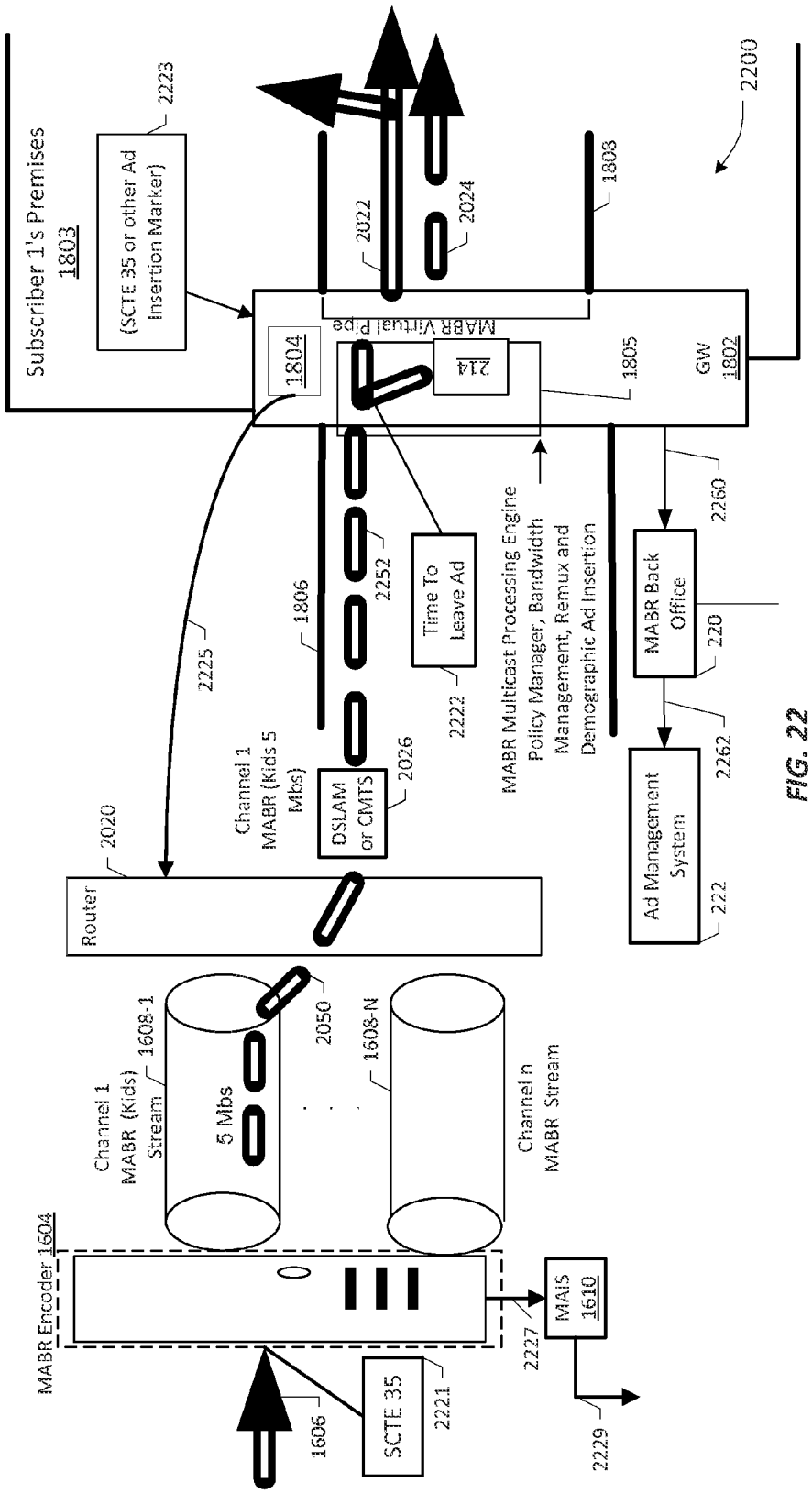
FIG. 22 depicts the example MABR streaming network environment configured for effectuating certain aspects of the scheme of FIG. 15 for leaving a multicast ABR advertisement channel according to an embodiment.

Referring to FIG. 22, depicted therein is a further view of MABR network portion 2000 that includes the network and gateway portions of the example MABR streaming network environment shown in FIGS. 16 and 18, configured for performing the aspects set forth at blocks 1520 and 1522 of the scheme of FIG. 15 (i.e., turning off ad streaming and switching back to the primary media channel). Similar to the arrangement described in reference to FIG. 20, the incoming MABR media stream 1606 channel is monitored for a suitable ad endpoint marker or other indication (e.g., SCTE-35) as illustrated at block 2221, which is also propagated to premises GW 1802 via applicable intermediary elements. In FIG. 22, receipt and/or detection of the endpoint marker by GW 1802 is illustrated at block 2223. At the network side, when the endpoint marker is received/reached, MAIS is accordingly notified via notification 2227, which then issues suitable messages 2229 to applicable ad media management systems to stop streaming the ads. When it is determined that it is time to leave the ad channel, illustrated at block 2222, GW 1802 issues appropriate IGMP messages 2225 via router 2020 to effect channel switching. Similar to the IGMP interactions previously discussed, MABR processing engine 1805 issues an IGMP Leave message to leave from ad channel source <227.4.1.2:5002> and an IGMP Join message to join Channel 1 MABR <Kids> stream 2050, which in the example set forth in FIG. 20 is a 5 Mbs channel, although it should be apparent that a bitrate representation different from the initial bitrate (i.e., before switching) may be joined if the network bandwidth conditions so require. Thereafter, the gapped media segments 2252 are received at the gateway, which are remuxed and de-gapped for streaming to the CPEs as before.

Figure 23A:
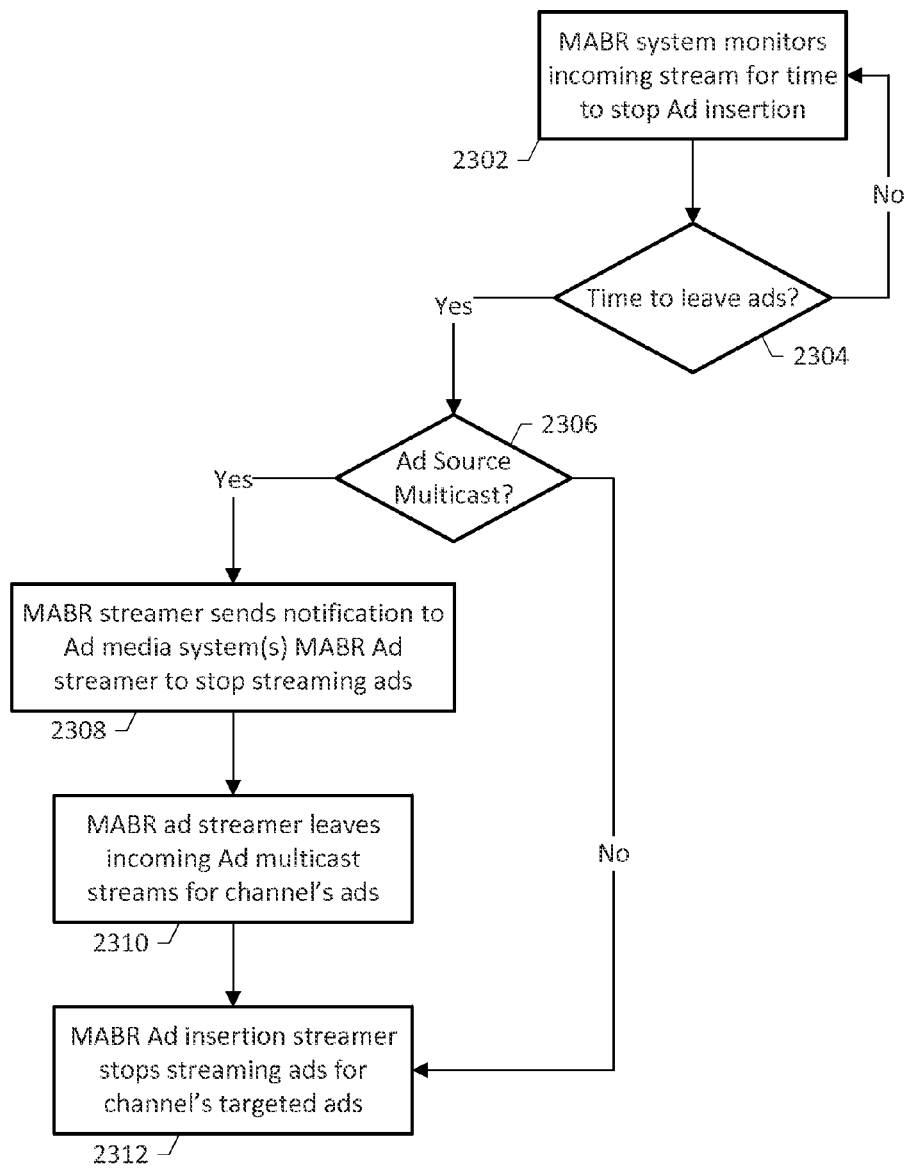
FIG. 23A depicts a flowchart of a leave process at the network portion of FIG. 22 with respect to MABR advertisement channel streaming in accordance with the scheme of FIG. 15.
Figure 23B:
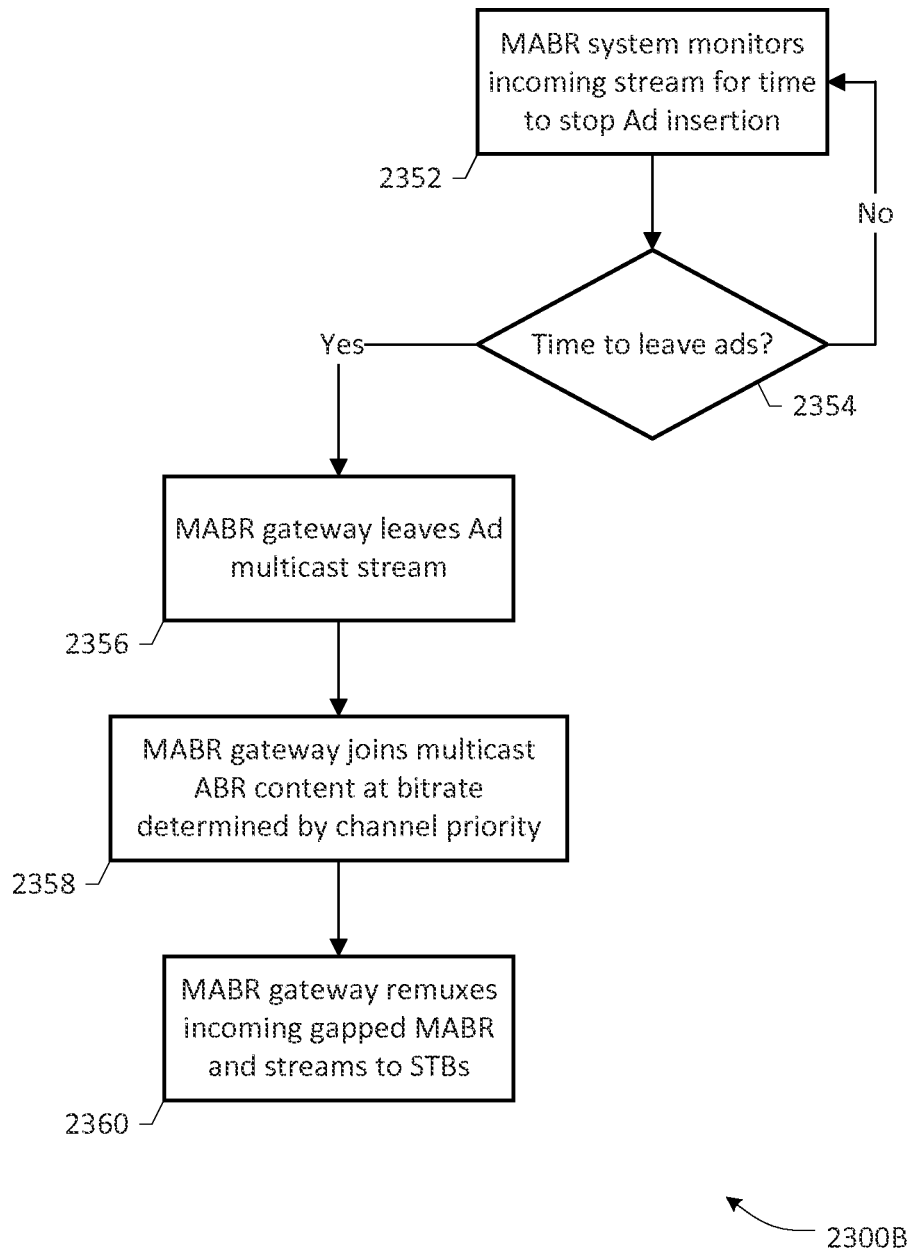
FIG. 23B depicts a flowchart of a leave process at the gateway portion of FIG. 22 with respect to MABR advertisement channel streaming in accordance with the scheme of FIG. 15.

The foregoing processes are set forth in additional detail in FIGS. 23A and 23B. Reference numeral 2300A in FIG. 23A generally refers to a leave process at the network portion of FIG. 22. At blocks 2302 and 2304, the MABR system iteratively monitors the incoming primary media stream for appropriate avails with respect to halting ads. When it is time to leave the ads (e.g., due to an indication including an auto return option), a determination is made whether the ad source is multicast (block 2306). If so, MAIS sends notifications to the applicable ad media management systems to stop streaming the ads (block 2308). Thereafter, MAIS leaves incoming ad multicast streams for the primary media channel (block 2310). Subsequently, MAIS stops streaming the targeted ads for the primary media channel (block 2312). If the ad source is not multicast as determined at block 2306, MAIS simply proceeds to stop streaming the targeted ads for the primary media channel as there will be no need to inform the static ad media file locations (block 2312).

FIG. 23B depicts a flowchart of various blocks, steps and/or acts for effectuating a leave process 2300B at the gateway portion of FIG. 22. Similar to the blocks 2302 and 2304 in FIG. 23A, blocks 2352 and 2354 are operative to determine whether it is time to leave the ads. Whereas the operations of blocks 2302 and 2304 may be effectuated at the MAIS element, the operations of blocks 2352 and 2354 are executed by the MABR service logic at the gateway. At block 2356, the gateway leaves the ad multicast stream. Thereafter, it joins the multicast media ABR channel at a bitrate determined by channel priority and/or bandwidth conditions (block 2358). The gateway resumes receiving gapped MABR stream of the joined media channel, which is remuxed and de-gapped for outbound streaming (i.e., into subscriber premises) (block 2360).

Figure 24:
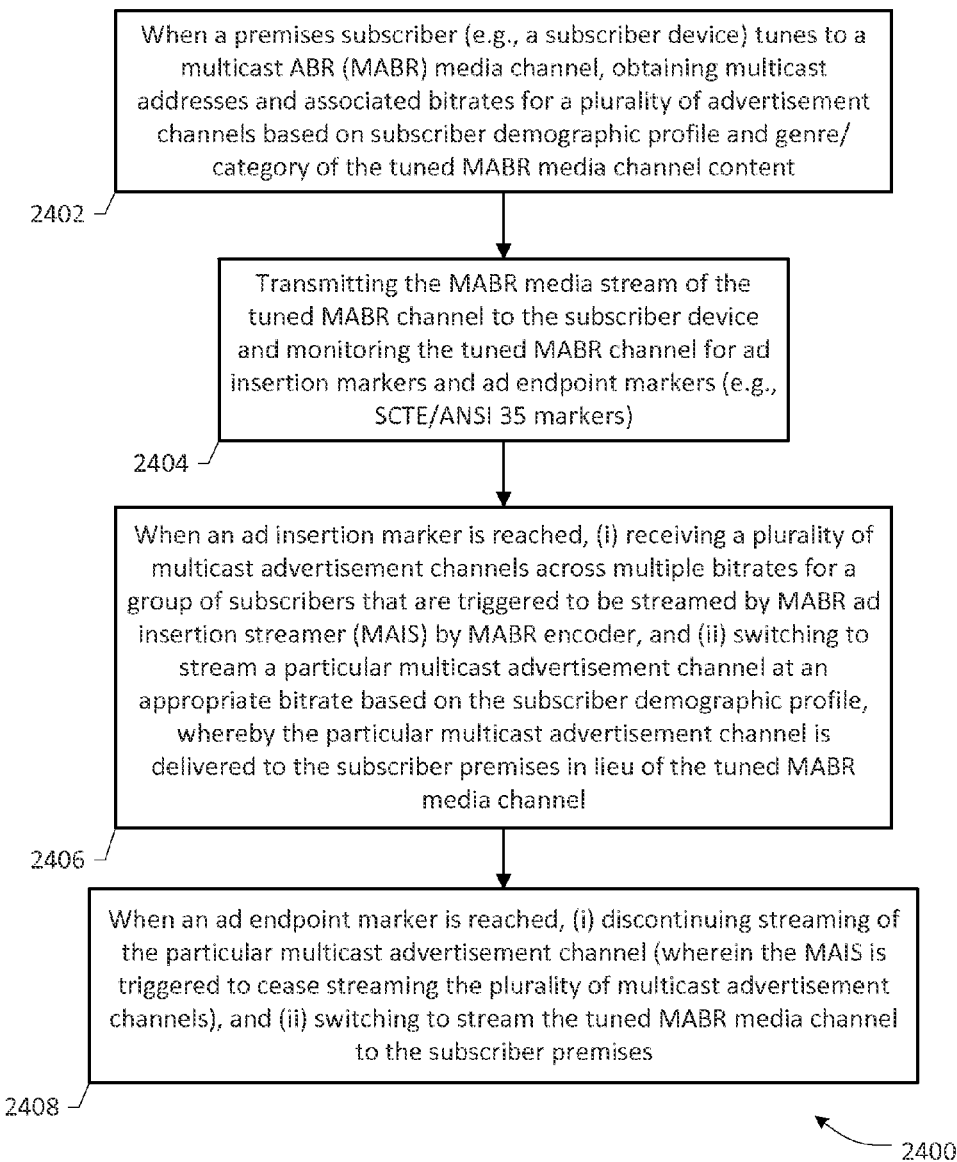
FIG. 24 depicts a flowchart of various blocks, steps and/or acts with additional detail for effectuating an advertisement channel streaming process in accordance with the scheme of FIG. 15.

FIG. 24 depicts a flowchart of various blocks, steps and/or acts with additional detail for effectuating an advertisement channel streaming process 2400 in accordance with the scheme of FIG. 15. When a premises subscriber (i.e., a subscriber device) tunes to a multicast ABR (MABR) media channel, multicast addresses and associated bitrates for a plurality of advertisement channels based on subscriber demographic profile and genre/category of the tuned MABR media channel content may be downloaded or other obtained by a gateway serving the subscriber premises (block 2402). The MABR media stream of the tuned MABR channel is transmitted (e.g., multicast) to the subscriber device for subscriber viewing. Also, the tuned MABR channel is monitored for ad insertion markers and ad endpoint markers or other endpoint indications (e.g., SCTE/ANSI 35 markers including auto return options), as highlighted at block 2404. When an ad insertion marker is reached, a set of actions may be effectuated. A plurality of multicast advertisement channels across multiple bitrates for a group of subscribers are received based on triggering of an MABR ad insertion streamer (MAIS), e.g., responsive to the monitoring by MABR encoder. The gateway then effectuates switching to stream a particular multicast advertisement channel at an appropriate bitrate based on the subscriber demographic profile, whereby the particular multicast advertisement channel is delivered to the subscriber premises in lieu of the tuned MABR media channel. As explained previously, these processes may be mediated by way of appropriate IGMP Join and Leave messages. When an ad endpoint marker is reached, the gateway is operative to perform the following: (i) discontinuing streaming of the particular multicast advertisement channel (wherein the MAIS is triggered to cease streaming the plurality of multicast advertisement channels across multiple bitrates, and (ii) switching to stream the tuned MABR media channel to the subscriber premises, by way of suitable IGMP Leave and Join messages. These foregoing operations are highlighted at blocks 2406 and 2408.

Those skilled in the art will recognize that the functionality set forth at the gateway portion of the example MABR streaming network of FIGS. 18, 20 and 22 may be deployed at an upstream node such as, e.g., VDP node 905 shown in FIG. 9, whereby similar ad channel switching may be effectuated based on triggering of the MAIS elements that would be upstream from VDP 905. In such a scenario, remuxing of ad channels at appropriate markers will take place in conjunction with a multicast processing engine and remux/combiner functionality disposed at the VDP node and, therefore, the gateway will receive already de-gapped streams. Accordingly, the foregoing description of FIGS. 15-24 is equally applicable to such a network-based implementation, with suitable straightforward modifications, and alternative embodiments relating to the network-based implementation shall therefore be regarded as being encompassed herein for all purposes.

Figure 25:
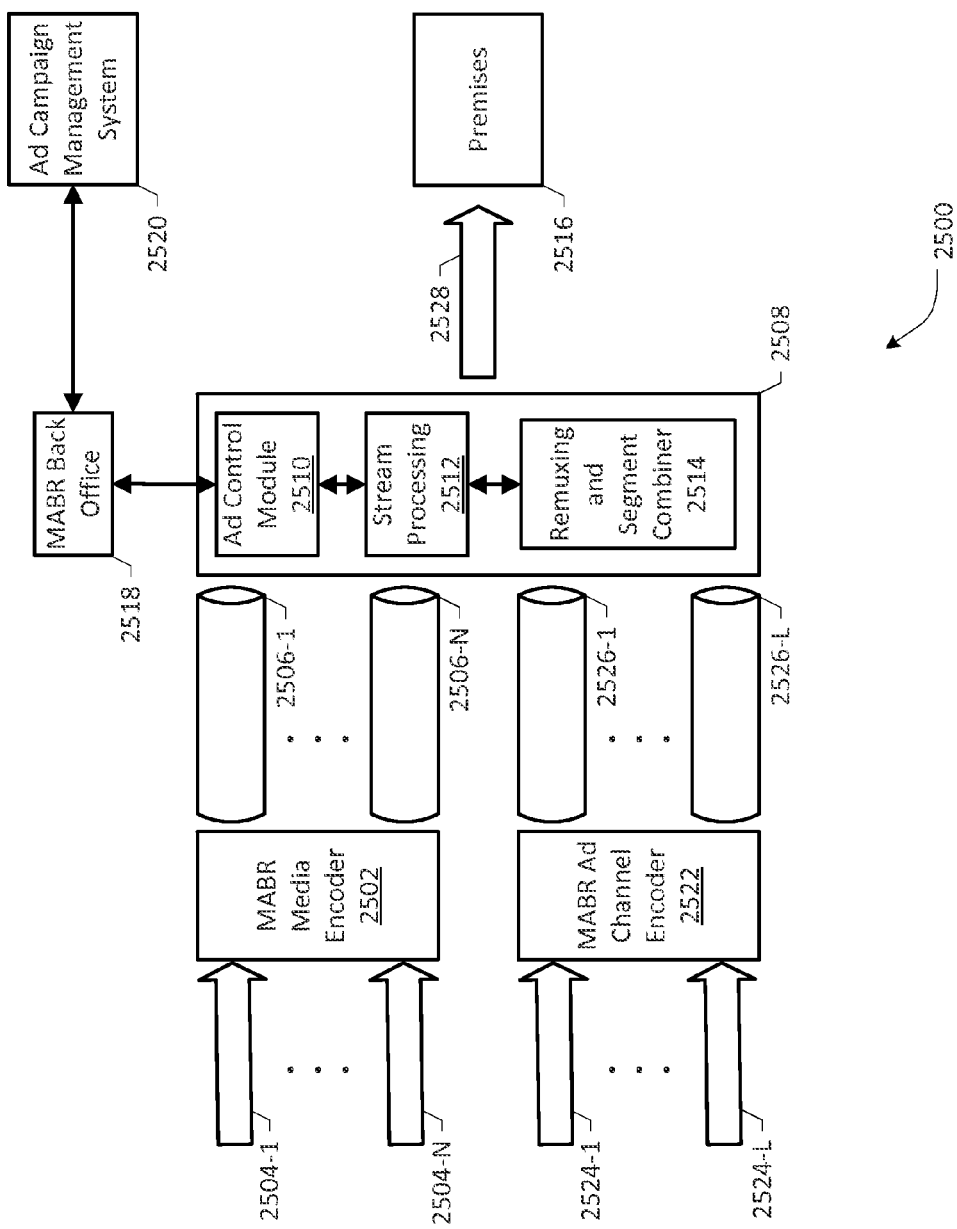
FIG. 25 depicts another rendition of an MABR streaming network environment wherein MABR advertisement channels are continuously streamed for appropriately switching with a MABR media channel to subscriber premises in a switched digital architecture.
Figure 26A:
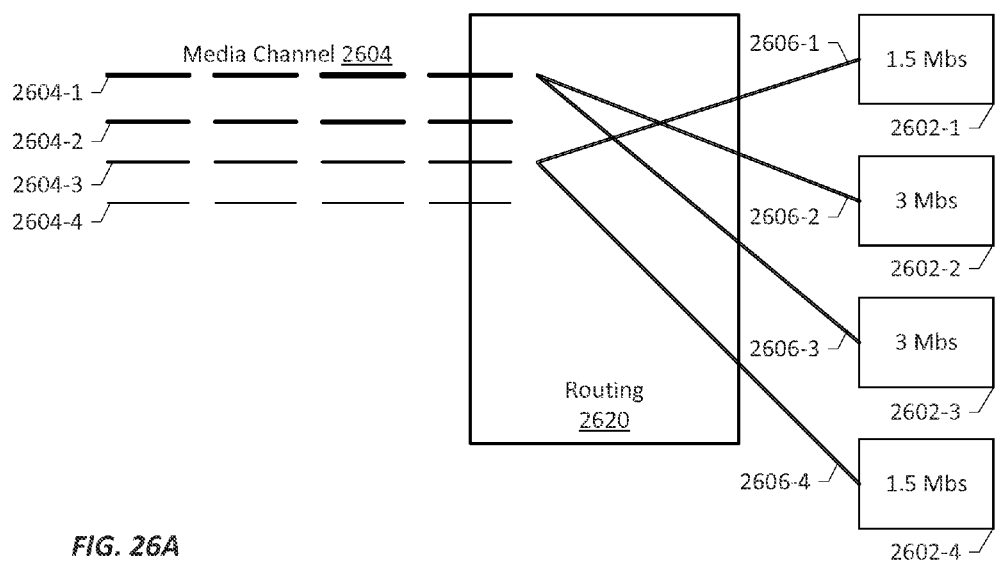
FIGS. 26A and 26B depict example scenarios where continuously streamed MABR advertisement channels and MABR media channels are switched back and forth in a targeted manner with respect to a plurality of subscriber premises.
Figure 26B:
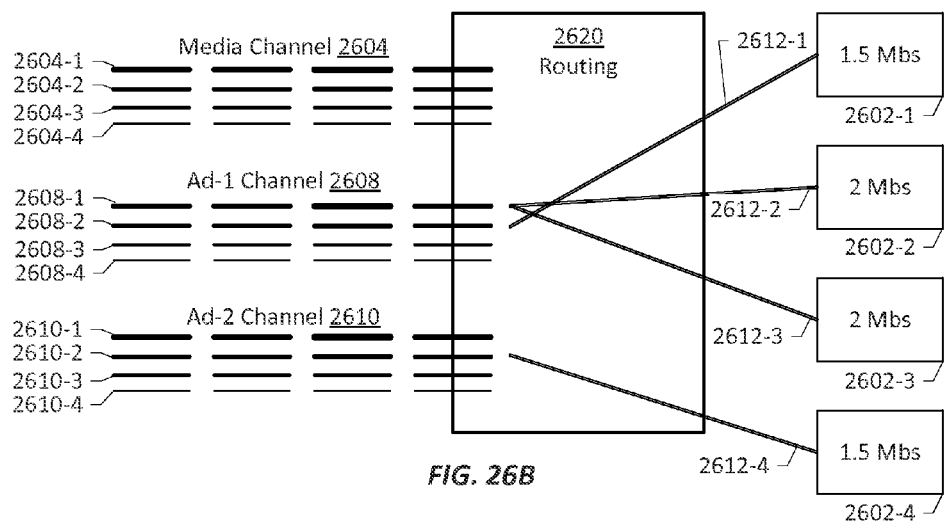
Figure 27:
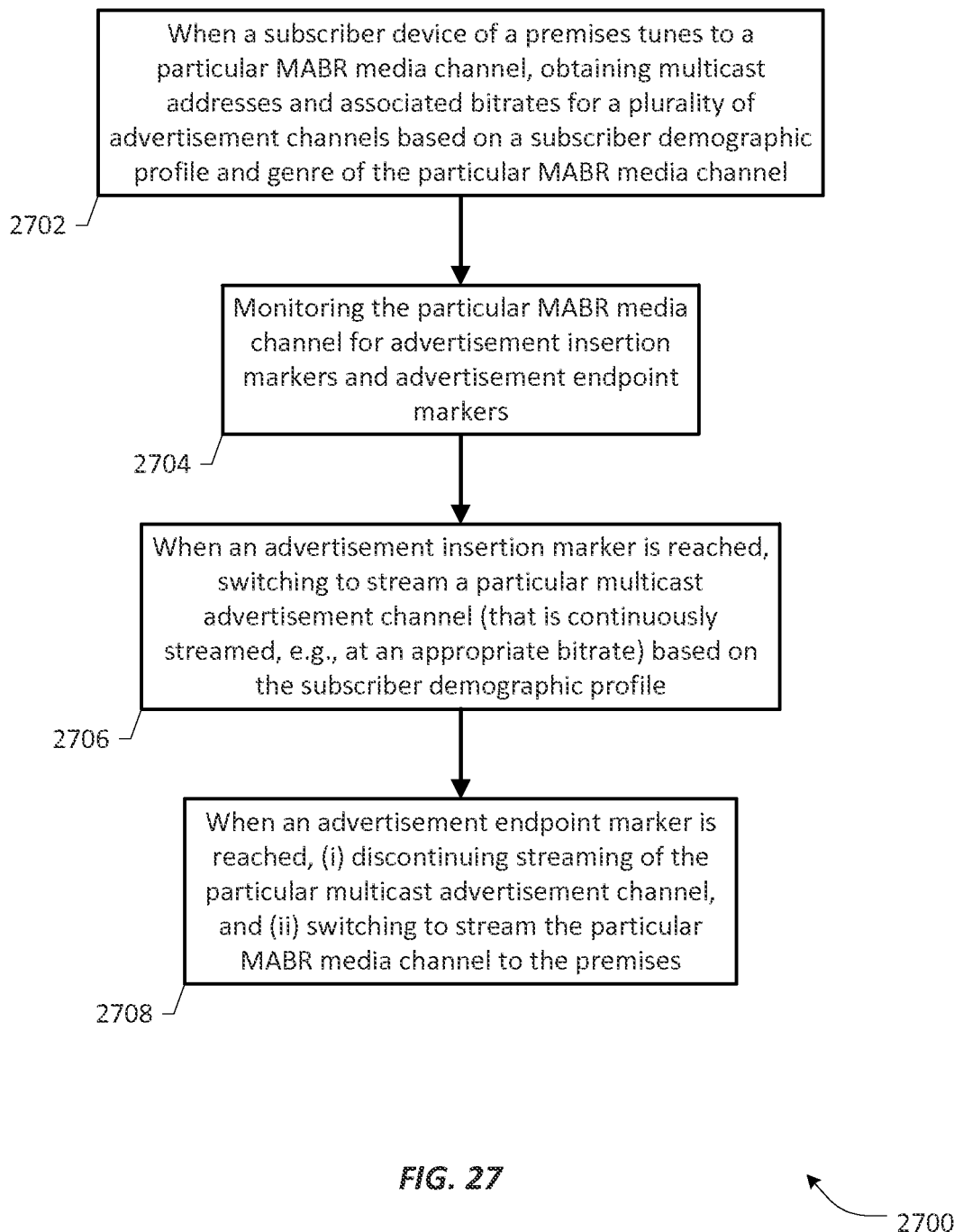
FIG. 27 depicts a flowchart of various blocks, steps and/or acts with additional detail for effectuating an advertisement channel streaming process in the switched digital architecture of FIG. 25.

Turning attention to FIGS. 25-27, yet another group of embodiments are set forth for effectuating targeted ad media delivery in an example MABR streaming network. Whereas the embodiments covered in FIGS. 15-24 employ triggered streaming of ad channels, embodiments below relate to switching continuously streaming multicast ad channels at suitable points in a "switched digital" architecture. In such an arrangement, ads are provided as a multicast feed which the CPEs may join in response to ad insertion markers and demographic profiles. It can be seen that the advertising feeds can be repetitive, allowing the premises to join any multicast stream that is appropriate to the demographic profile and at a suitable starting point for the ad media (i.e., so as to avoid joining an ad channel at some point other than the start of the ad). As the ad media channels are provided continuously just like the media service channels, the correct multicast ad stream may be switched to or tuned to in response to an advertisement marker in the main media service channel and based on subscriber demographics and channel genre information.

Referring in particular to FIG. 25, depicted therein is another rendition of an example MABR streaming network environment 2500 wherein advertisement channels 2524-1 to 2524-L are continuously streamed for appropriately switching with a multicast media channel to subscriber premises 2516 in a switched digital architecture facilitated by an entity 2508 that may be embodied at a gateway (e.g., similar to GW 1802) or at an upstream network node (e.g., similar to VDP 905). Reference numerals 2504-1 to 2505-N refer to a plurality of unsegmented media streams from various content sources and providers, which may be processed by an MABR encoder functionality 2502 to generate multicast ABR channels across multiple representations for each incoming media stream, e.g., media ABR pipes 2506-1 to 2506-N, substantially similar to the functionality of the MFS/MABR encoder functionality 1604 described above. An MABR ad channel encoder (MACE) 2522 is similarly operable with respect to the incoming advertisement channels 2524-1 to 2524-L for generating continuously streaming MABR ad channel pipes 2526-1 to 2526-L, each comprising multiple representations of an ad content stream at different bitrates. It should be realized that the MABR media encoder and MACE functionalities may be integrated, co-located, distributed or otherwise architected in the example MABR streaming network environment 2500. Further, as these functionalities are advantageously implemented as MFS functionalities, the resultant media channel pipes and ad channel pipes comprise respective gapped streams, wherein the gap intervals in the primary media channels (i.e., service channels) may be sized appropriately to facilitate fairly smooth switching between the media service channel and an applicable ad channel.

The MABR media channel pipes 2506-1 to 2506-N and MABR ad channel pipes 2526-1 to 2526-K may be passed through suitable downstream elements to the entity 2508 for stream processing and remuxing, as exemplified by modules 2512 and 2514. An ad control module 2510 is operative to interface with a MABR back office 2518 and one or more ad campaign management systems 2520. In one implementation, a premises gateway may be provided with applicable ad information (including proper ad channel bitrates) based on subscriber demographics and media channel/genre. One skilled in the art will recognize that this process may be similar to an embodiment of the gateway loading scheme described above. However, as the MABR ad channels are continuously streamed in the example MABR network 2500, there will be no need to deploy and initialize a network-based MAIS-like functionality as set forth in the scheme 1500 of FIG. 15. In a gateway implementation, appropriately routed gapped streams of the primary media channels or applicable ad channels are delivered to the gateway which remuxes the stream to delivered as a de-gapped stream 2528 to the premises 2516. In a network node implementation, the de-gapping takes place at an upstream node and therefore de-gapped media or ad channels are appropriately routed to the premises gateway which delivers it as stream 2528 to the premises 2516. As one of ordinary skill should appreciate, suitable IGMP Join and Leave messaging processes initiated and/or mediated by the joining CPE(s), premises gateway and DSLAM/CMTS elements to the serving router, similar to the embodiments set forth in FIGS. 20 and 22, may be implemented here as well in order to effectuate channel switching between a media channel and a targeted ad channel at appropriate markers. Accordingly, the teachings of the foregoing drawing Figures are also applied here with suitable modifications.

FIG. 27 depicts a flowchart of various blocks, steps and/or acts with additional detail for effectuating an advertisement channel streaming process 2700 in the switched digital architecture of FIG. 25. When a premises subscriber (e.g., a subscriber device) tunes to a multicast ABR (MABR) media channel, multicast addresses and associated bitrates for a plurality of advertisement channels based on subscriber demographic profile and genre/category of the tuned MABR media channel content may be downloaded or other obtained by a gateway serving the subscriber premises (block 2702). The MABR media stream of the tuned MABR channel is transmitted (e.g., multicast) to the subscriber device for subscriber viewing. Also, the tuned MABR channel is monitored for ad insertion markers and ad endpoint markers or indications (e.g., SCTE/ANSI 35 markers including auto return options), as highlighted at block 2704. When an ad insertion marker is reached, an IGMP Join process is effectuated for switching to stream a particular multicast advertisement channel (that is continuously streamed, e.g., at an appropriate bitrate) based on the subscriber demographic profile, which is accompanied by an IGMP Leave process with respect to the MABR media channel being watched. When an advertisement endpoint marker or an indication (e.g., an auto return option) is reached, streaming of the particular multicast advertisement channel is discontinued and streaming of the particular MABR media channel to the premises device, which may be effectuated by the IGMP Leave and Join processes. The foregoing operations are highlighted at blocks 2706 and 2708.

Turning to FIGS. 26A and 26B, depicted therein are example scenarios 2600A, 2600B where continuously streamed MABR advertisement channels and MABR media channels are switched back and forth in a targeted matter with respect to a plurality of subscriber premises 2602-1 to 2602-4. As illustrated in scenario 2600A of FIG. 26A, premises 2602-1 to 2602-4 are watching the same media channel 2604 that is encoded at different bitrates 2604-1 (highest bitrate) to 2604-4 (lowest bitrate). As the premises' bandwidth capacity varies, MABR routing functionality 2620 feeds them different representations of the ABR media source. Premises 2602-2 and 2602-3 have a higher bandwidth and therefore are provided with ABR media channel representation 2604-1 having a bitrate of 3 Mbs via suitably managed pipes 2606-2 and 2606-3. On the other hand, premises 2602-1 and 2602-4 have a lower bandwidth and therefore are provided with ABR media channel representation 2604-3 having a bitrate of 1.5 Mbs via suitably managed pipes 2606-1 and 2606-4.

In scenario 2600B of FIG. 26B, two different ad channels 2608 and 2610, each having multiple representations at different bitrates, Ad-1 2608-1 to 2608-4 and Ad-2 2610-1 to 2610-4, are illustrated. When it is time for a targeted ad insertion, router 2620 stops copying packets from the ABR media channel source 2604 and starts copying packets from the applicable ABR ad channel sources based on a targeting scheme. Premises 2602-1, 2602-2 and 2602-3 each have a demographics profile that indicates delivery of Ad-1 channel 2608 whereas the demographics of premises 2602-4 indicate relevance with respect to Ad-2 channel 2610. Since premises 2602-2 and 2602-3 have a higher bandwidth, router 2620 feeds them ABR Ad-1 channel representation 2608-1 having a bitrate of 2 Mbs via suitably managed pipes 2612-2 and 2626-3. On the other hand, premises 2602-1 having a lower bandwidth receives ABR Ad-1 channel representation 2608-2 having a lower bitrate of 1.5 Mbs via pipe 2612-1. Likewise, premises 2602-4 having a lower bandwidth receives ABR Ad-2 channel representation 2610-2 having a lower bitrate of 1.5 Mbs via pipe 2612-4. When it is time to leave the ads, router 2620 resumes delivering packets from the ABR media channel source 2604 at appropriate bitrates to the respective premises 2602-1 to 2602-4 as in scenario 2600A.

Based upon the foregoing Detailed Description, it should be appreciated that one or more embodiments of the present disclosure can be advantageously implemented in a number of MABR streaming environments for effectuating targeted delivery of advertisements at least at an individual premises level.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An advertisement targeting method in a multicast adaptive bitrate (MABR) streaming network, the method comprising:

initializing an MABR advertisement insertion streamer (MAIS) of the MABR streaming network to be configured with a plurality of multicast source addresses, multicast destination addresses and bitrate information for advertisements channels applicable to MABR media channels on a genre-by-genre basis when the MABR media channels are initially brought up in the MABR streaming network;

when a subscriber device of a premises served by a premises gateway coupled to the MABR streaming network tunes to a particular MABR media channel, obtaining multicast addresses and associated bitrates for a plurality of advertisement channels based on a subscriber demographic profile and genre of the particular MABR media channel, wherein the subscriber device is one of a plurality of multicast subscriber devices including multiple set-top boxes (STBs) served via a premises video pipe managed by the premises gateway;

monitoring the particular MABR media channel for advertisement insertion markers and advertisement endpoint markers;

responsive to detecting an advertisement insertion marker in the particular MABR media channel, triggering the MAIS to commence streaming of all multicast advertisement channels applicable to the particular MABR media channel to a plurality of subscribers, including a subscriber using the subscriber device of the premises gateway, wherein each of the multicast advertisement channels is received by the premises gateway as a plurality of segmented MABR advertisement streams having different bitrate representations;

joining the subscriber device to a specific multicast advertisement channel having a select bitrate representation based on the subscriber demographic profile, whereby the specific multicast advertisement channel rather than the particular MABR media channel is delivered to the subscriber device, wherein the select bitrate representation for the specific multicast advertisement channel is determined responsive to modeling bandwidth allocation of the premises video pipe based on a channel prioritization process taking into account multicast streams of the multiple subscriber devices of the premises;

when an advertisement endpoint marker or an auto return is reached, discontinuing streaming of the multicast advertisement channels by the MAIS to the plurality of subscribers, including the subscriber using the subscriber device of the premises gateway relative to the particular MABR media channel; and leaving the specific multicast advertisement channel and joining the subscriber device back to the particular MABR media channel having a select bitrate representation, wherein the select bitrate representation for the particular MABR media channel is determined responsive to modeling bandwidth allocation of the premises video pipe based on a channel prioritization process taking into account multicast streams of the multiple subscriber devices of the premises.

2. The method as recited in claim 1, wherein the advertisement insertion markers and the advertisement endpoint markers comprise SCTE/ANSI 35 markers.

3. The method as recited in claim 1, wherein the streaming of the applicable advertisement channels by the MAIS is triggered by an MABR encoder receiving an input unsegmented media stream associated with the particular MABR media channel.

4. The method as recited in claim 3, wherein the triggering is effectuated responsive to the advertisement insertion marker received in the input unsegmented media stream.

5. The method as recited in claim 1, wherein the joining the subscriber device to the specific multicast advertisement channel is effectuated by issuing an Internet Group Management Protocol (IGMP) Join message to the multicast address associated with the specific multicast advertisement channel.

6. The method as recited in claim 1, wherein leaving the specific multicast advertisement channel is effectuated by issuing an IGMP Leave message to the multicast address associated with the specific multicast advertisement channel.

7. The method as recited in claim 1, wherein the select bitrate representation of the specific multicast advertisement channel is selected to be consistent with a bitrate of the particular MABR media channel tuned to.

8. An apparatus operative in a multicast adaptive bitrate (MABR) streaming network for targeting advertisements, the apparatus comprising:

an MABR advertisement insertion streamer (MAIS) configured to be initialized with a plurality of multicast source addresses, multicast destination addresses and bitrate information for advertisements channels applicable to MABR media channels on a genre-by-genre basis when the MABR media channels are initially brought up in the MABR streaming network;

an advertisement control module having an interface configured to communicate with a managed ABR multicast back office node for obtaining, when a subscriber device of a premises gateway coupled to the MABR streaming network tunes to a particular MABR media channel, multicast addresses a group of advertisement channels and associated bitrate information based on the subscriber's demographic profile and genre of a particular MABR media channel, wherein the subscriber device is one or a plurality of multicast subscriber devices including multiple set-top boxes (STBs) served via a premises video pipe managed by the premises gateway; and one or more processors coupled to the advertisement control module and a persistent memory having program instructions thereon, the one or more processors configured to execute the program instructions for performing:

after initialization of the MABR streaming network involving the MAIS, monitoring the particular MABR media channel for advertisement insertion markers and advertisement endpoint markers;

responsive to detecting an advertisement insertion marker in the particular MABR media channel, triggering the MAIS to commence streaming of all multicast advertisement channels applicable to the particular MABR media channel to a plurality of subscribers, including a subscriber using the subscriber device of the premises gateway, wherein each of the multicast advertisement channels is received by the premises gateway as a plurality of segmented MABR advertisement streams having different bitrate representations;

joining the subscriber device to a specific multicast advertisement channel having a select bitrate representation based on the subscriber demographic profile, whereby the specific multicast advertisement channel rather than the particular MABR media channel is delivered to the subscriber device, wherein the select bitrate representation for the specific multicast advertisement channel is determined responsive to modeling bandwidth allocation of the premises video pipe based on a channel prioritization process taking into account multicast streams of the multiple subscriber devices of the premises;

when an advertisement endpoint marker or an auto return is reached, discontinuing streaming of the multicast advertisement channels by the MAIS to the plurality of subscribers, including the subscriber using the subscriber device of the premises gateway relative to the particular MABR media channel; and leaving the specific multicast advertisement channel and joining the subscriber device back to the particular MABR media channel having a select bitrate representation, wherein the select bitrate representation for the particular MABR media channel is determined responsive to modeling bandwidth allocation of the premises video pipe based on a channel prioritization process taking into account multicast streams of the multiple subscriber devices of the premises.

9. The apparatus as recited in claim 8, wherein the advertisement insertion markers and the advertisement endpoint markers comprise SCTE/ANSI 35 markers.

10. The apparatus as recited in claim 8, wherein the program instructions operative to join the subscriber device to the specific multicast advertisement channel comprise program instructions for issuing an Internet Group Management Protocol (IGMP) Join message to the multicast address associated with the specific multicast advertisement channel.

11. The apparatus as recited in claim 8, wherein the program instructions further comprise program instructions for issuing an IGMP Leave message to the multicast address associated with the specific multicast advertisement channel.

12. The apparatus as recited in claim 8, wherein the program instructions operative to join the subscriber device to the select bitrate representation of the specific multicast advertisement channel comprise program instructions further operative to select a bitrate that is consistent with a bitrate of the particular MABR media channel tuned to.

13. The apparatus as recited in claim 8, further comprising a multicast stream processing and segment combiner engine operatively coupled to the one or more processors and the advertisement control module.

14. The apparatus as recited in claim 8, wherein the streaming of the applicable advertisement channels by the MAIS is triggered by an MABR encoder receiving an input unsegmented media stream associated with the particular MABR media channel.

15. The apparatus as recited in claim 14, wherein the MABR encoder and the MAIS are configured as a node disposed in an edge distribution network associated with one of a Digital Subscriber Line (DSL) architecture and a Data Over Cable Service Interface Specification (DOCSIS)-compliant Cable Modem Termination System (CMTS) architecture.

* * * * *